US007149726B1

(12) United States Patent
Lingle et al.

(10) Patent No.: US 7,149,726 B1
(45) Date of Patent: Dec. 12, 2006

(54) ONLINE VALUE BEARING ITEM PRINTING

(75) Inventors: Piers Christian Lingle, Los Angeles, CA (US); Craig Leonard Ogg, Long Beach, CA (US); Girish Venkat, Los Angeles, CA (US); Richard Winslow, Culver City, CA (US); Keith Shoji Kiyohara, Santa Monica, CA (US)

(73) Assignee: Stamps.com, Santa Monica, CA (US)

( * ) Notice: Subject to any disclaimer, the term of this patent is extended or adjusted under 35 U.S.C. 154(b) by 669 days.

(21) Appl. No.: 09/585,025

(22) Filed: Jun. 1, 2000

Related U.S. Application Data

(60) Provisional application No. 60/136,924, filed on Jun. 1, 1999, provisional application No. 60/139,153, filed on Jun. 14, 1999, provisional application No. 60/160,491, filed on Oct. 20, 1999.

(51) Int. Cl.
*G07B 17/02* (2006.01)
*G06F 15/00* (2006.01)

(52) U.S. Cl. ...................... 705/411; 715/517; 715/518; 715/521; 715/526; 715/527

(58) Field of Classification Search ................ 709/224; 714/4, 43, 57; 705/1, 401, 405, 408, 410, 705/411, 400, 60; 715/517, 518, 521, 526, 715/527
See application file for complete search history.

(56) References Cited

U.S. PATENT DOCUMENTS 4,447,890 A 5/1984 Duwel et al. ............... 364/900
4,725,718 A 2/1988 Sansone et al. ............. 235/495
4,743,747 A 5/1988 Fougere et al. ............. 235/494
4,757,537 A 7/1988 Edelmann et al.
4,775,246 A 10/1988 Edelmann et al. ............ 380/23
4,802,218 A 1/1989 Wright et al.
4,812,994 A 3/1989 Taylor et al. .......... 364/464.02
4,831,555 A 5/1989 Sansone et al.
4,837,702 A 6/1989 Obrea
4,853,865 A 8/1989 Sansone et al. ........ 364/464.02
4,900,903 A 2/1990 Wright et al.
4,900,904 A 2/1990 Wright et al.

(Continued)

FOREIGN PATENT DOCUMENTS

EP 0 360 225 A2 3/1990

(Continued)

OTHER PUBLICATIONS

USPS Publication No. 25 "Designing Letter Mail"; Aug. 1995.*

(Continued)

*Primary Examiner*—Igor N. Borissov
(74) *Attorney, Agent, or Firm*—Christie, Parker & Hale, LLP.

(57) ABSTRACT

An on-line VBI printing system that includes one or more cryptographic modules and a central database. The cryptographic modules are capable of implementing a variety of required security standards. A client system provides a user friendly GUI for facilitating the interface of the user to the system. The GUI system includes wizards that help the user step-by-step with processes of installation, registration, and printing In one aspect, the invention describes an on-line system for printing a value bearing item (VBI) that includes a client system for interfacing with a user comprising; a GUI for installing software for printing the VBI; a GUI for registering the user in the system; and a GUI for managing the printing of the VBI; and a server system capable of communicating with the client system over a computer network for authorizing the client system to print the VBI.

49 Claims, 65 Drawing Sheets

PRINTER #4 COMPARE SAMPLE

U.S. PATENT DOCUMENTS

| | | | | | |
|---|---|---|---|---|---|
| 4,908,770 | A | | 3/1990 | Breault et al. | |
| 4,933,849 | A | | 6/1990 | Connell et al. | 364/400 |
| 4,935,961 | A | | 6/1990 | Gargiulo et al. | |
| 4,949,381 | A | | 8/1990 | Pastor | 380/51 |
| 4,980,542 | A | | 12/1990 | Jackson et al. | |
| 5,048,085 | A | | 9/1991 | Abraham et al. | |
| 5,058,008 | A | | 10/1991 | Schumacher | 364/401 |
| 5,075,865 | A | | 12/1991 | Kawamura et al. | |
| 5,111,030 | A | | 5/1992 | Brasington et al. | |
| 5,142,577 | A | | 8/1992 | Pastor | 380/21 |
| 5,181,245 | A | | 1/1993 | Jones | |
| 5,241,483 | A | * | 8/1993 | Porret et al. | 700/125 |
| 5,265,221 | A | | 11/1993 | Miller | |
| 5,319,562 | A | | 6/1994 | Whitehouse | |
| 5,325,519 | A | | 6/1994 | Long et al. | |
| 5,341,505 | A | | 8/1994 | Whitehouse | 395/800 |
| 5,377,268 | A | | 12/1994 | Hunter | |
| 5,384,886 | A | * | 1/1995 | Rourke | 715/523 |
| 5,390,251 | A | | 2/1995 | Pastor et al. | |
| 5,448,641 | A | | 9/1995 | Pintsov et al. | 380/51 |
| 5,454,038 | A | | 9/1995 | Cordery et al. | |
| 5,471,925 | A | | 12/1995 | Heinrich et al. | |
| 5,561,795 | A | | 10/1996 | Sarkar | |
| 5,570,465 | A | | 10/1996 | Tsakanikas | 395/114 |
| 5,598,477 | A | | 1/1997 | Berson | |
| 5,600,562 | A | | 2/1997 | Guenther | |
| 5,621,797 | A | | 4/1997 | Rosen | |
| 5,655,023 | A | | 8/1997 | Cordery et al. | |
| 5,659,616 | A | | 8/1997 | Sudia | |
| 5,666,421 | A | | 9/1997 | Pastor et al. | 380/51 |
| 5,668,897 | A | | 9/1997 | Stolfo | |
| 5,671,146 | A | | 9/1997 | Windel et al. | |
| 5,680,629 | A | * | 10/1997 | Slayden et al. | 715/527 |
| 5,684,951 | A | | 11/1997 | Goldman et al. | |
| 5,729,734 | A | | 3/1998 | Parker et al. | |
| 5,742,683 | A | | 4/1998 | Lee et al. | 380/23 |
| 5,768,132 | A | | 6/1998 | Cordery et al. | |
| 5,781,438 | A | | 7/1998 | Lee et al. | 364/464.14 |
| 5,781,634 | A | | 7/1998 | Cordery et al. | |
| 5,793,867 | A | | 8/1998 | Cordery et al. | |
| 5,796,841 | A | | 8/1998 | Cordery et al. | |
| 5,801,944 | A | | 9/1998 | Kara | 364/464.2 |
| 5,812,990 | A | | 9/1998 | Ryan, Jr. et al. | |
| 5,812,991 | A | | 9/1998 | Kara | |
| 5,819,240 | A | | 10/1998 | Kara | |
| 5,822,739 | A | | 10/1998 | Kara | |
| 5,825,893 | A | | 10/1998 | Kara | 380/51 |
| 5,867,578 | A | | 2/1999 | Brickell et al. | |
| 5,871,288 | A | * | 2/1999 | Ryan et al. | 400/103 |
| 5,903,905 | A | * | 5/1999 | Andersen et al. | 715/526 |
| 5,917,924 | A | | 6/1999 | Herbert | |
| 5,918,234 | A | | 6/1999 | Shah et al. | |
| 5,930,796 | A | | 7/1999 | Pierce et al. | 707/100 |
| 5,940,383 | A | | 8/1999 | Willkie | |
| 5,953,427 | A | | 9/1999 | Cordery et al. | 380/51 |
| 5,956,404 | A | | 9/1999 | Schneier et al. | |
| 5,978,484 | A | | 11/1999 | Apperson et al. | |
| 5,983,227 | A | | 11/1999 | Nazem et al. | 707/10 |
| 5,987,441 | A | | 11/1999 | Lee et al. | 705/401 |
| 5,988,897 | A | | 11/1999 | Pierce et al. | 400/61 |
| 6,005,945 | A | | 12/1999 | Whitehouse | 380/51 |
| 6,009,417 | A | | 12/1999 | Brookner et al. | |
| 6,010,156 | A | | 1/2000 | Block | |
| 6,026,385 | A | | 2/2000 | Harvey et al. | 705/408 |
| 6,049,671 | A | * | 4/2000 | Slivka et al. | 717/173 |
| 6,058,384 | A | | 5/2000 | Pierce et al. | |
| 6,061,671 | A | | 5/2000 | Baker et al. | |
| 6,064,993 | A | | 5/2000 | Ryan, Jr. | 705/403 |
| 6,065,117 | A | | 5/2000 | White | |
| 6,070,150 | A | | 5/2000 | Remington et al. | |
| 6,081,810 | A | | 6/2000 | Rosenzweig et al. | |
| 6,098,058 | A | * | 8/2000 | Gravell et al. | 705/410 |
| 6,105,063 | A | | 8/2000 | Hayes, Jr. | |
| 6,134,582 | A | | 10/2000 | Kennedy | |
| 6,151,591 | A | | 11/2000 | Pierce et al. | |
| 6,161,139 | A | | 12/2000 | Win et al. | |
| 6,164,528 | A | | 12/2000 | Hills et al. | |
| 6,223,166 | B1 | | 12/2000 | Win et al. | |
| 6,226,752 | B1 | | 5/2001 | Gupta et al. | |
| 6,233,565 | B1 | * | 5/2001 | Lewis et al. | 705/35 |
| 6,233,568 | B1 | | 5/2001 | Kara | |
| 6,249,777 | B1 | | 6/2001 | Kara et al. | |
| 6,275,824 | B1 | | 8/2001 | O'Flaherty et al. | |
| 6,286,098 | B1 | | 9/2001 | Wenig et al. | |
| 6,307,961 | B1 | * | 10/2001 | Balonon-Rosen et al. | 382/167 |
| 6,324,523 | B1 | | 11/2001 | Killeen, Jr. et al. | |
| 6,341,274 | B1 | | 1/2002 | Leon | |
| 6,353,926 | B1 | * | 3/2002 | Parthesarathy et al. | 717/170 |
| 6,367,013 | B1 | | 4/2002 | Bisbee et al. | |
| 6,381,589 | B1 | | 4/2002 | Leon | |
| 6,385,654 | B1 | | 5/2002 | Tanaka | |
| 6,385,731 | B1 | | 5/2002 | Ananda | |
| 6,408,286 | B1 | | 6/2002 | Heiden | |
| 6,415,983 | B1 | | 7/2002 | Ulvr et al. | |
| 6,424,954 | B1 | | 7/2002 | Leon | |
| 6,427,021 | B1 | | 7/2002 | Fischer et al. | |
| 6,466,921 | B1 | | 10/2002 | Cordery et al. | |
| 6,473,743 | B1 | | 10/2002 | Ryan, Jr. | |
| 6,546,377 | B1 | | 4/2003 | Gravell et al. | |
| 6,567,794 | B1 | | 5/2003 | Cordery et al. | |
| 6,587,880 | B1 | | 7/2003 | Saigo et al. | |
| 6,636,983 | B1 | * | 10/2003 | Levi | 709/224 |
| 6,853,989 | B1 | * | 2/2005 | Allport et al. | 705/401 |
| 2001/0034716 | A1 | | 10/2001 | Goodwin | |
| 2001/0037320 | A1 | | 11/2001 | Allport et al. | |
| 2001/0055388 | A1 | | 12/2001 | Kaliski, Jr. | |
| 2002/0023057 | A1 | | 2/2002 | Goodwin et al. | |
| 2002/0046193 | A1 | | 4/2002 | Bator et al. | |
| 2002/0095383 | A1 | | 7/2002 | Mengin et al. | |
| 2003/0078893 | A1 | | 4/2003 | Shah et al. | |
| 2003/0130954 | A1 | | 7/2003 | Carr et al. | |
| 2005/0114712 | A1 | | 5/2005 | Devine et al. | |

FOREIGN PATENT DOCUMENTS

| | | | | |
|---|---|---|---|---|
| EP | 0 576 113 | A2 | | 12/1993 |
| EP | 0 604 146 | A3 | | 6/1994 |
| EP | 0 604 148 | A3 | | 6/1994 |
| EP | 0 647 925 | A2 | | 4/1995 |
| EP | 0 604 146 | B1 | | 11/1997 |
| EP | 0 840 258 | A2 | | 5/1998 |
| EP | 0 854 448 | A2 | | 7/1998 |
| EP | 0 892 367 | | | 1/1999 |
| EP | 0 927 958 | A2 | | 7/1999 |
| EP | 0 927 963 | A2 | | 7/1999 |
| EP | 0 948 158 | A2 | | 10/1999 |
| GB | 2318486 | A | | 11/1994 |
| WO | WO 94/27258 | A1 | | 11/1994 |
| WO | WO 98/13790 | A1 | | 4/1998 |
| WO | WO98/57302 | | | 12/1998 |
| WO | WO 98/57460 | A1 | | 12/1998 |
| WO | WO 99/18514 | A1 | | 4/1999 |
| WO | WO 00/19382 | A1 | * | 4/2000 |
| WO | WO 00/70503 | A1 | * | 11/2000 |
| WO | WO 01/50227 | A2 | * | 7/2001 |

OTHER PUBLICATIONS

International Preliminary Examination Report, dated Dec. 19, 2001.

Pastor, Jose; CRYPTOPOST™—A Cryptographic Application to Mail Processing; Journal of Cryptology; 1991; 137-146pp.; vol. 3; No. 2; International Association for Cryptologic Research.

The United States Postal Service (USPS) Engineering Center; Information Based Indicia Program (IBIP) Indicium Specification; Jun. 13, 1996; 22pp.

The United States Postal Service (USPS); Information-Based Indicia Program (IBIP): Performance Criteria for Information-Based Indicia and Security Architecture for Closed IBI Postage Metering Systems (PCIBI-C); Jan. 12, 1999; 49pp.

The United States Postal Service (USPS): Information-Based Indicia Program (IBIP); Performance Criteria for Information-Based Indicia and Security Architecture for Open IBI Postage Evidencing Systems (PCIBI-O); Jun. 25, 1999; 76pp.

Tygar, J.D. and Yee, Bennet; Cryptography: It's Not Just For *Electronic* Mail Anymore; School of Computer Science; Mar. 1, 1993; 1-21pp.; Carnegie Mellon University, Pittsburg, PA, USA.

Tygar, J.D. and Yee, Bennet; Dyad: A System for Using Physically Secure Coprocessors; School of Computer Science; May 4, 1991; 1-36pp.; Carnegie Mellon University, Pittsburg, PA, USA.

U.S. Appl. No. 09/688,451 filed Oct. 16, 2000, Auditing Method and System for an On-Line Value-Bearing Item Printing System, 105pp.

U.S. Appl. No. 09/688,452 filed Oct. 16, 2000, "Role Assignments in a Cryptographic Module for Secure Processing of Value-Bearing Items", 105pp.

U.S. Appl. No. 09/688,456 filed Oct. 16, 2000, "Cryptographic Module for Secure Processing of Value- Bearing Items", 109pp.

U.S. Appl. No. 09/690,066 filed Oct. 16, 2000, "Cryptographic Module for Secure Processing of Value-Bearing Items", 121pp.

U.S. Appl. No. 09/690,083 filed Oct. 16, 2000, "Cryptographic Module for Secure Processing of Value-Bearing Items", 109pp.

U.S. Appl. No. 09/690,243 filed Oct. 17, 2000, "Method and Apparatus for On-Line Value-Bearing Item System", 66pp.

U.S. Appl. No. 09/690,796 filed Oct. 17, 2000, "Secure and Recoverable Database for On-Line Value-Bearing Item System", 71pp.

U.S. Appl. No. 09/692,746 filed Oct. 18, 2000, "Method and Apparatus for Digitally Signing an Advertisement Area Next to a Value-Bearing Item", 61pp.

U.S. Appl. No. 09/692,829 filed Oct. 18, 2000, "Postal System Intranet and Commerce Processing for On-Line Value-Bearing System", 179pp.

U.S. Appl. No. 09/788,069 filed Feb. 16, 2001, "On-Line Value-Bearing Indicium Printing Using DSA", 43pp.

U.S. Appl. No. 10/083,236 filed Feb. 26, 2002, "Secured Centralized Public Key Infrastructure", 101pp.

United States Postal Service, "Information Based Indicia Program Postal Security Device Specification," Jun. 13, 1996 (21 sheets).

Ratcliffe, Mitch, Ever feel you're being watched? You will., Digital Media, May 16, 1994, v3 n12 p17(3), Gale Group.

Ratcliffe, Mitch "Ever feel you're being watched? You will." Digital Media; May 16, 1994; v.3, n.12, 4pp.

Fickel, Louise, "Know Your Customer," Leaders for the Next Millennium, CIO Magazine, Aug. 15, 1999, 10pp.

Sagner, James S., "Protecting Organizations from Electronic-Transaction Fraud", Healthcare Financial Management; Westchester; Feb. 1995.

* cited by examiner

WELCOME #1 INTRO. 1

WELCOME #2 SORRY, MUST WAIT

SERVICE #1 PERSONAL INFO

SERVICE #2 ADDRESSES

SERVICE #2a SORRY, BAD ZIP

SERVICE #3 USER NAME/ PASS

SERVICE #4 ENTER KEY WORD

SERVICE #5 USER CAT/COMP. INFO

SERVICE #6 MONTHLY USAGE

SERVICE #7 SELECT PLAN

SERVICE #8 SRV PLAN AGREEMENT

SERVICE #9 PAYMENT INFO NOTHING SELECTED MODE

SERVICE #9a PAYMENT INFO CREDIT CARD SELECTED MODE

SERVICE #9b PAYMENT INFO NOTHING SELECTED MODE

SERVICE #10 PURCHASE POSTAGE

LICENSE #1 VERIFICATION AND WELCOME ML

LICENSE #2 LICENSE ID

LICENSE #3 BUS. QUESTIONS 2

LICENSE #3a AUTHORITY FOR CHECK WRITING

LICENSE #4 SOCIAL SECURITY #

LICENSE #5 OTHER LICENSE ?

LICENSE #6 EVER REVOKED ?

LICENSE #7 SUBMIT

LICENSE #8 SUBMITTING INFORMATION

ERROR DISPLAY

ERROR DIALOG USER NAME

ERROR DIALOG BAD ACH

ERROR DIALOG CREDIT CARD REJECTED

SERVICE #9 VERIFICATION AND WELCOME PT

PRINTER #1 SELECT DEFAULT PRINTER

PRINTER #2 PRINT ONTO

PRINTER #3 INSERT ENVELOPE

PRINTER #4 COMPARE SAMPLE

PRINTER #5 PRINT QA ENV.

PRINTER #6 MAIL QA ENV.

PRINTER #7 WHAT PRINTED ONTO ENV.?

PRINTER #8 TROUBLESHOOT OPTIONS

PRINTER #9 SORRY, NO ENV PRINTING

FINISH #1 CONGRATS

RE-REG. #1 ACCOUNT IN USE

RE-REG. #2 WANT TO RE-REG.?

CHG. OF ADD #1 WELCOME

CHG. OF ADD. #2 ENTER ADDRESS

CHG. OF ADD. #3 SUBMIT

CHG. OF ADD. #4 INFO UPDATED

CHG. OF ADD. #5 WITHDRAW METER

CHG. OF ADD. #6 USER NAME

CHG. OF ADD. #7 LAUNCH REG. WIZARD

ONLINE VALUE BEARING ITEM PRINTING

CROSS-REFERENCE TO RELATED APPLICATIONS

This patent application claims the benefit of the filing date of U.S. Provisional Patent Application Ser. Nos. 60/136,924, filed Jun. 1, 1999 and entitled “INTERNET POSTAGE SYSTEM”, 60/139,153, filed Jun. 14, 1999, and entitled “CLIENT SOFTWARE AND USER INTERFACE FOR INTERNET POSTAGE SYSTEM”, AND 60/160,491, Oct. 20, 1999, and entitled “SECURE AND RECOVERABLE DATABASE FOR ON-LINE POSTAGE SYSTEM”, the entire contents of which are hereby expressly incorporated by reference.

FIELD OF THE INVENTION

The present invention relates to secure printing of value-bearing items (VBI) preferably, postage. More specifically, the invention relates to a graphical user interface (GUI) for printing of VBI in a computer network environment.

BACKGROUND OF THE INVENTION

A significant percentage of the United States Postal Service (USPS) revenue is from metered postage. Metered postage is generated by utilizing postage meters that print a special mark, also known as postal indicia, on mail pieces. Generally, printing postage and any VBI can be carried out by using mechanical meters or computer-based systems.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user’s site. The PSD, in conjunction with the user’s personal computer and printer, functions as the IBIP postage meter. The USPS has published a number of documents describing the PSD specifications, the indicia specifications and other related and relevant information. There are also security standards for printing other types of VBI, such as coupons, tickets, gift certificates, currency, voucher and the like.

A significant drawback of existing hardware-based systems is that a new PSD must be locally provided to each new user, which involves significant cost. Furthermore, if the additional PSD breaks down, service calls must be made to the user location. In light of the drawbacks in hardware-based postage metering systems, a software-based system has been developed that does not require specialized hardware for each user. The software-based system meets the IBIP specifications for a PSD, using a centralized server-based implementation of PSDs utilizing one or more cryptographic modules. The system also includes a database for all users’ information. The software-based system, however, has brought about new challenges.

The software-based system should be able to handle secure communications between users and the database. The system should also be user friendly and be able to provide the user with a step-by-step process for installing the client software, registering with the system, printing the postage value, maintaining and monitoring the user account information, and the like.

Therefore, there is a need for a new method and apparatus for implementation of VBI printing via a user friendly GUI with a variety of selectable options.

SUMMARY OF THE INVENTION

In accordance with one aspect of the present invention, an on-line VBI printing system that includes one or more cryptographic modules and a central database has been designed. The cryptographic modules serve the function of the PSDs and are capable of implementing a variety of required security standards. A client system provides a user friendly GUI for facilitating the interface of the user to the system. The GUI system includes wizards that help the user step-by-step with processes of installation, registration, and printing In one aspect, the invention describes an on-line system for printing a value bearing item (VBI) that includes a client system for interfacing with a user comprising; a GUI for installing software for printing the VBI; a GUI for registering the user in the system; and a GUI for managing the printing of the VBI; and a server system capable of communicating with the client system over a computer network for authorizing the client system to print the VBI.

Other features of the present invention include a GUI for making changes to the user’s information; a GUI for displaying the user information including an account information, wherein the account information includes an amount of credit left in the account; a GUI for specifying an address book so that the system can use the address book to print addresses; and a GUI for entering a password so that the server system can store the entered password and verify the password. In one embodiment, the server system includes an address matching module for verifying an address entered by the user.

In another aspect, the invention describes a method for printing a value bearing item (VBI) over a computer network having a client system and a server system comprising the steps of: displaying a first GUI by the client system for registering a user with the server system over the computer network; establishing communication with the server via the network; entering user information in the first GUI; communicating the entered user information to the server; displaying a second GUI by the client system including printing options for managing the printing of the VBI; selecting one or more printing options from the second GUI; and printing the VBI according to the selected one or more printing options.

BRIEF DESCRIPTION OF THE DRAWINGS

The objects, advantages and features of this invention will become more apparent from a consideration of the following detailed description and the drawings, in which.

DETAILED DESCRIPTION

An exemplary on-line postage system is described in U.S. patent application Ser. No. 09/163,993 filed Sep. 15, 1998, the entire content of which is hereby incorporated by reference herein. The on-line postage system includes an authentication protocol that operates in conjunction with the USPS. The system utilizes on-line postage system software comprising user code that resides on a client system and controller code that resides on a server system. The on-line postage system allows a user to print a postal indicium at home, at the office, or any other desired place in a secure, convenient, inexpensive and fraud-free manner. The system comprises a user system electronically connected to a server system, which in turn is in communication with a USPS system.

Each of the cryptographic modules may be available for use by any user. When a user requests a PSD service, one of the available modules is loaded with data belonging to the user's account and the transaction is performed. When a module is loaded with a user's data, that module becomes the user's PSD. The database record containing each user's PSD data is referred to as the "PSD package". After each PSD transaction is completed, the user's PSD package is updated and returned to a database external to the module. The database becomes an extension of the module's memory and stores not only the items specified by the IBIP for storage inside the PSD, but also the user's personal cryptographic keys and other security relevant data items (SRDI) and status information needed for operating continuity. Movement of this sensitive data between the modules and the database is secured to ensure that PSD packages could not be compromised.

Figure 1:
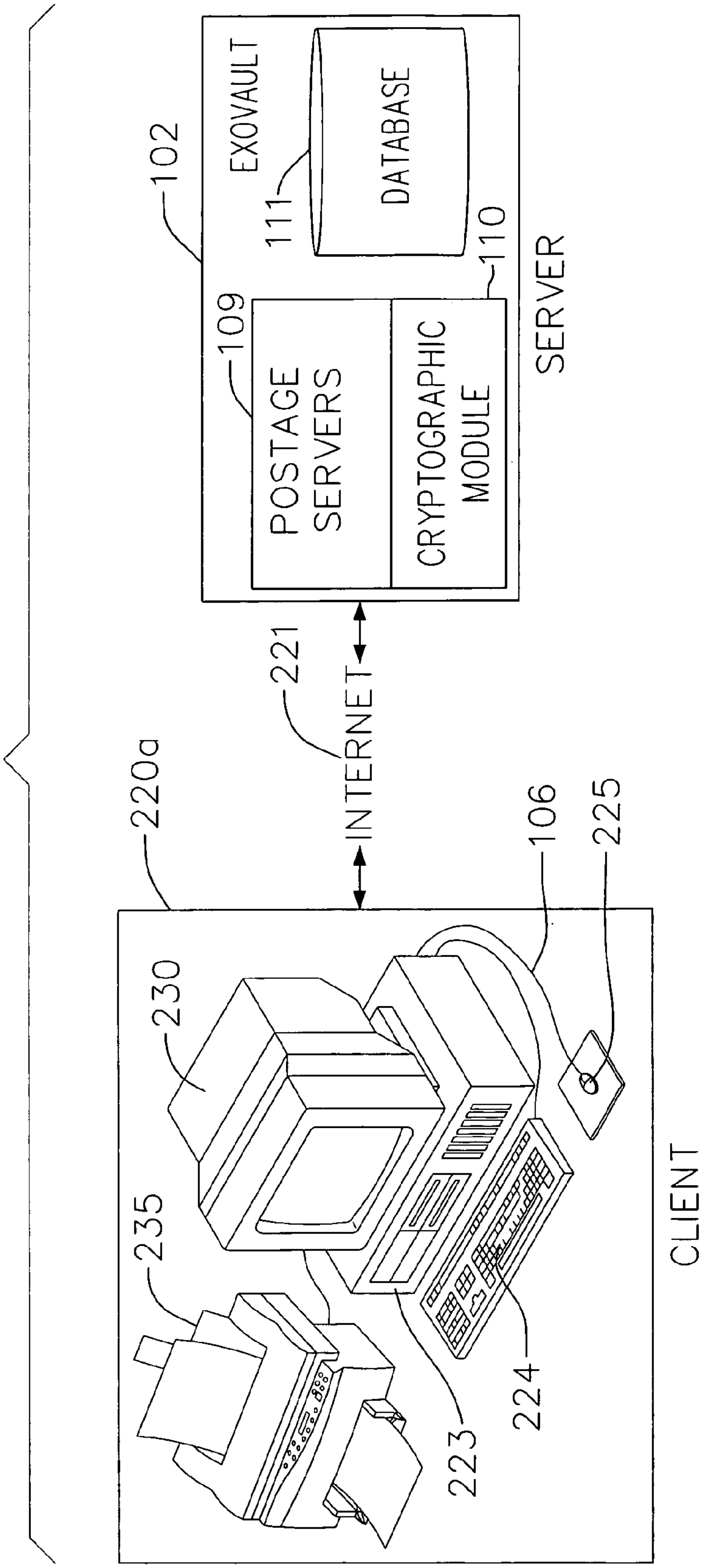
FIG. 1 is an exemplary block diagram for the client/server architecture of one embodiment of the present invention.

In one embodiment, the server system is remotely located in a separate location from the client system. All communications between the client and the server are preferably accomplished via the Internet. FIG. 1 illustrates a remote client system 220*a* connected to a server system 102 via the Internet 221. The client system includes a processor unit 223, a monitor 230, printer port 106, a mouse 225, a printer 235, and a keyboard 224. Server system 102 includes Postage servers 109, Database 130, and cryptographic modules 110.

An increase in the number of servers within the server system 102 will not negatively impact the performance of the system, since the system design allows for scalability. The Server system 102 is designed in such a way that all of the business transactions are processed in the servers and not in the database. By locating the transaction processing in the servers, increases in the number of transactions can be easily handled by adding additional servers. Also, each transaction processed in the servers is stateless, meaning the application does not remember the specific hardware device the last transaction utilized. Because of this stateless transaction design, multiple servers can be added to each appropriate subsystem in order to handle increased loads.

Furthermore, each cryptographic module is a stateless device, meaning that a PSD package can be passed to any device because the application does not rely upon any information about what occurred with the previous PSD package. Therefore, multiple cryptographic modules can also be added to each appropriate subsystem in order to handle increased loads. A PSD package for each cryptographic module is a database record, stored in the server database, that includes information pertaining to one customer's service that would normally be protected inside a cryptographic module. The PSD package includes all data needed to restore the PSD to its last known state when it is next loaded into a cryptographic module. This includes the items that the IBIP specifications require to be stored inside the PSD, information required to return the PSD to a valid state when the record is reloaded from the database, and data needed for record security and administrative purposes.

In one embodiment, the items included in a PSD package include ascending and descending registers (the ascending register "AR" records the amount of postage that is dispensed or printed on each transaction and the descending register "DR" records the value or amount of postage that may be dispensed and decreases from an original or charged amount as postage is printed.), device ID, indicia key certificate serial number, licensing ZIP code, key token for the indicia signing key, the user secrets, key for encrypting user secrets, data and time of last transaction, the last challenge received from the client, the operational state of the PSD, expiration dates for keys, the passphrase repetition list and the like.

As a result, the need for specific PSDs being attached to specific cryptographic modules is eliminated. A Postal Server subsystem provides cryptographic module management services that allow multiple cryptographic modules to exist and function on one server, so additional cryptographic modules can easily be installed on a server. The Postal Sever subsystem is easy to scale by adding more cryptographic modules and using commonly known Internet load-balancing techniques to route inbound requests to the new cryptographic modules.

Referring back to FIG. 1, Postage servers 109 provide indicia creation, account maintenance, and revenue protection functionality for the on-line postage system. The Postage servers 109 include several physical servers in several distinct logical groupings, or services as described below. The individual servers could be located within one facility, or in several facilities, physically separated by great distance but connected by secure communication links.

Cryptographic modules 110 are responsible for creating PSDs and manipulating PSD data to protect sensitive information from disclosure, generating the cryptographic components of the digital indicia, and securely adjusting the user registers. When a user wishes to print VBI, for example, postage or purchase additional VBI or postage value, a user state is instantiated in the PSD implemented within one of the cryptographic modules 110. Database 111 includes all the data accessible on-line for indicia creation, account maintenance, and revenue protection processes. Postage servers 109, Database 130, and cryptographic modules 110 are maintained in a physically secured environment, such as a vault.

Figure 2:
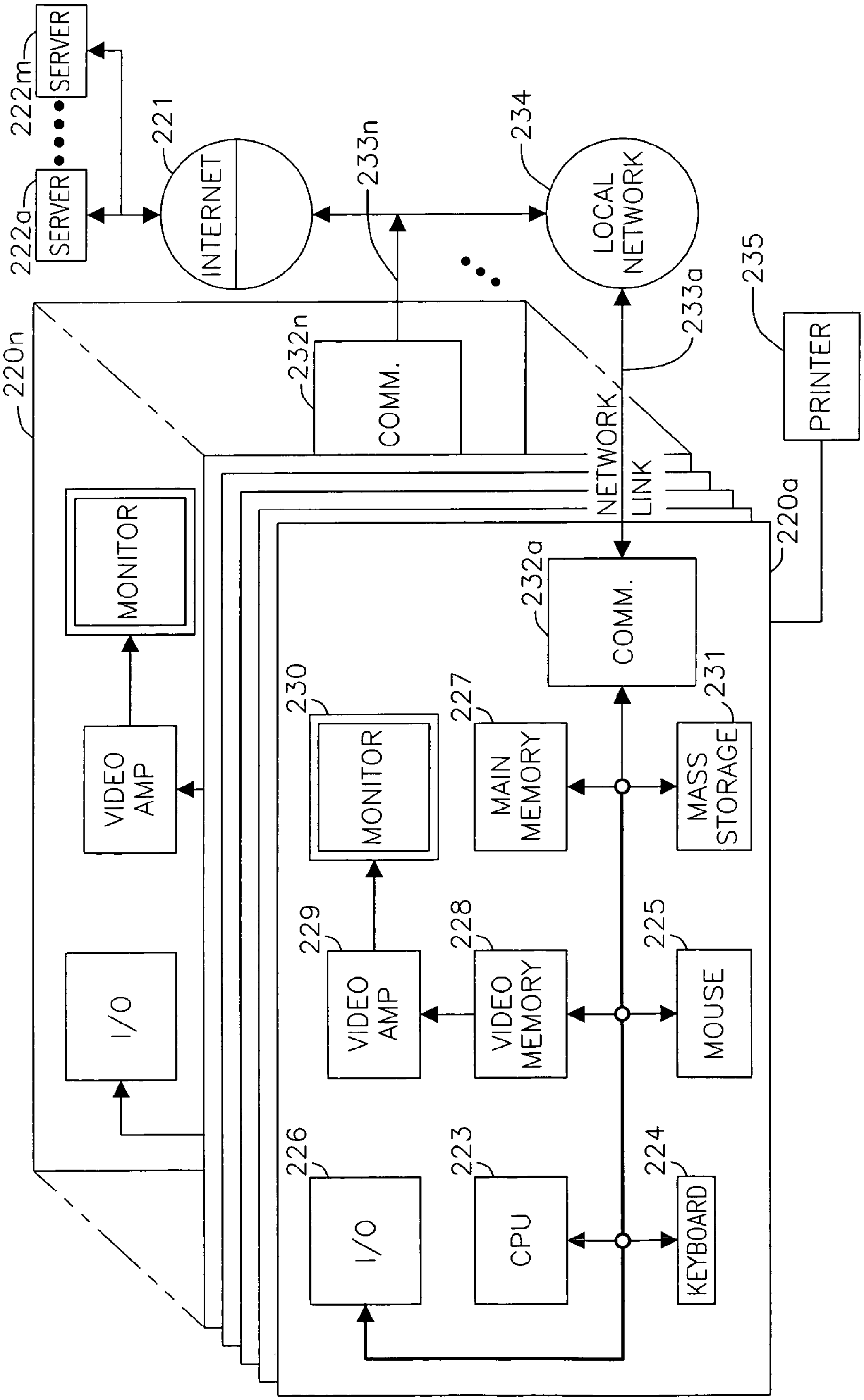
FIG. 2 is an exemplary block diagram of a remote user computer connected to a server via Internet according to one embodiment of the present invention.

FIG. 2 shows a simplified system block diagram of a typical Internet client/server environment used by an on-line postage system in one embodiment of the present invention. PCs 220*a*–220*n* used by the postage purchasers are connected to the Internet 221 through the communication links 233*a*–233*n*. Each PC has access to one or more printers 235. Optionally, as is well understood in the art, a local network 234 may serve as the connection between some of the PCs, such as the PC 220*a* and the Internet 221 or other connections. Servers 222*a*–222*m* are also connected to the Internet 221 through respective communication links. Servers 222*a*–222*m* include information and databases accessible by PCs 220*a*–220*n*. The on-line VBI system of the present invention resides on one or more of Servers 222*a*–222*m*.

In this embodiment, each client system 220*a*–220*m* includes a CPU 223, a keyboard 224, a mouse 225, a mass storage device 231, main computer memory 227, video memory 228, a communication interface 232*a*, and an input/output device 226 coupled and interacting via a communication bus. The data and images to be displayed on the monitor 230 are transferred first from the video memory 228 to the video amplifier 229 and then to the monitor 230. The communication interface 232*a* communicates with the servers 222*a*–222*m* via a network link 233*a*. The network link connects the client system to a local network 234. The local network 234 communicates with the Internet 221.

In one embodiment, a customer, preferably licensed by the USPS and registered with an IBIP vendor (such as Stamps.com), sends a request for authorization to print a desired amount of VBI, such as postage. The server system verifies that the user's account holds sufficient funds to cover the requested amount of postage, and if so, grants the request. The server then sends authorization to the client system. The client system then sends image information for printing of a postal indicium for the granted amount to a printer so that the postal indicium is printed on an envelope or label.

When a client system sends a VBI print request to the Server, the request needs to be authenticated before the client system is allowed to print the VBI, and while the VBI is being printed. The client system sends a password (or passphrase) entered by a user to the Server for verification. If the password fails, a preferably asynchronous dynamic password verification method terminates the session and printing of the VBI is aborted. Also, the Server system communicates with a system located at a certification authority for verification and authentication purposes.

In one embodiment, the information processing components of the on-line postage system include a client system, a postage server system located in a highly secure facility, a USPS system and the Internet as the communication medium among those systems. The information processing equipment communicates over a secured communication line.

Preferably, the security and authenticity of the information communicated among the systems are accomplished on a software level through the built-in features of a Secured Socket Layer (SSL) Internet communication protocol. An encryption hardware module embedded in the server system is also used to secure information as it is processed by the secure system and to ensure authenticity and legitimacy of requests made and granted.

The on-line VBI system does not require any special purpose hardware for the client system. The client system is implemented in the form of software that can be executed on a user computer (client system) allowing the user computer to function as a virtual VBI meter. The software can only be executed for the purpose of printing the VBI indicia when the user computer is in communication with a server computer located, for example, at a VBI meter vendor's facility (server system). The server system is capable of communicating with one or more client systems simultaneously.

In one embodiment of the present invention, the cryptographic modules 110 are FIPS 140-1 certified hardware cards that include firmware to implement PSD functionality in a cryptographically secure way. The cryptographic modules are inserted into any of the servers in the Postal Server Infrastructure. The cryptographic modules are responsible for creating PSDs and manipulating PSD data to generate and verify digitally signed indicia. Since the PSD data is created and signed by a private key known only to the module, the PSD data may be stored externally to the cryptographic modules without compromising security.

The on-line VBI system is based on a client/server architecture. Generally, in a system based on client/server architecture the server system delivers information to the client system. That is, the client system requests the services of a generally larger computer. In one embodiment, the client is a local personal computer and the server is a more powerful group of computers that house the information. The connection from the client to the server is made via a Local Area Network, a phone line or a TCP/IP based WAN on the Internet. A primary reason to set up a client/server network is to allow many clients access to the same applications and files stored on the server system.

In one embodiment, Postage servers 109 include a string of servers connected to the Internet, for example, through a T1 line, protected by a firewall. The firewall permits a client system to communicate with a server system, only if the information packet transmitted by the client system complies with a security policy set by the server system. The firewall not only protects the system from unauthorized users on the Internet, it also separates the Public Network (PUBNET) from the Private Network (PRVNET). This ensures that packets from the Internet will not go to any location but the PUBNET. The string of servers form the different subsystems of the on-line postal system. The services provided by the different subsystems of the on-line postage system are designed to allow flexibility and expansion and reduce specific hardware dependency.

Figure 4:
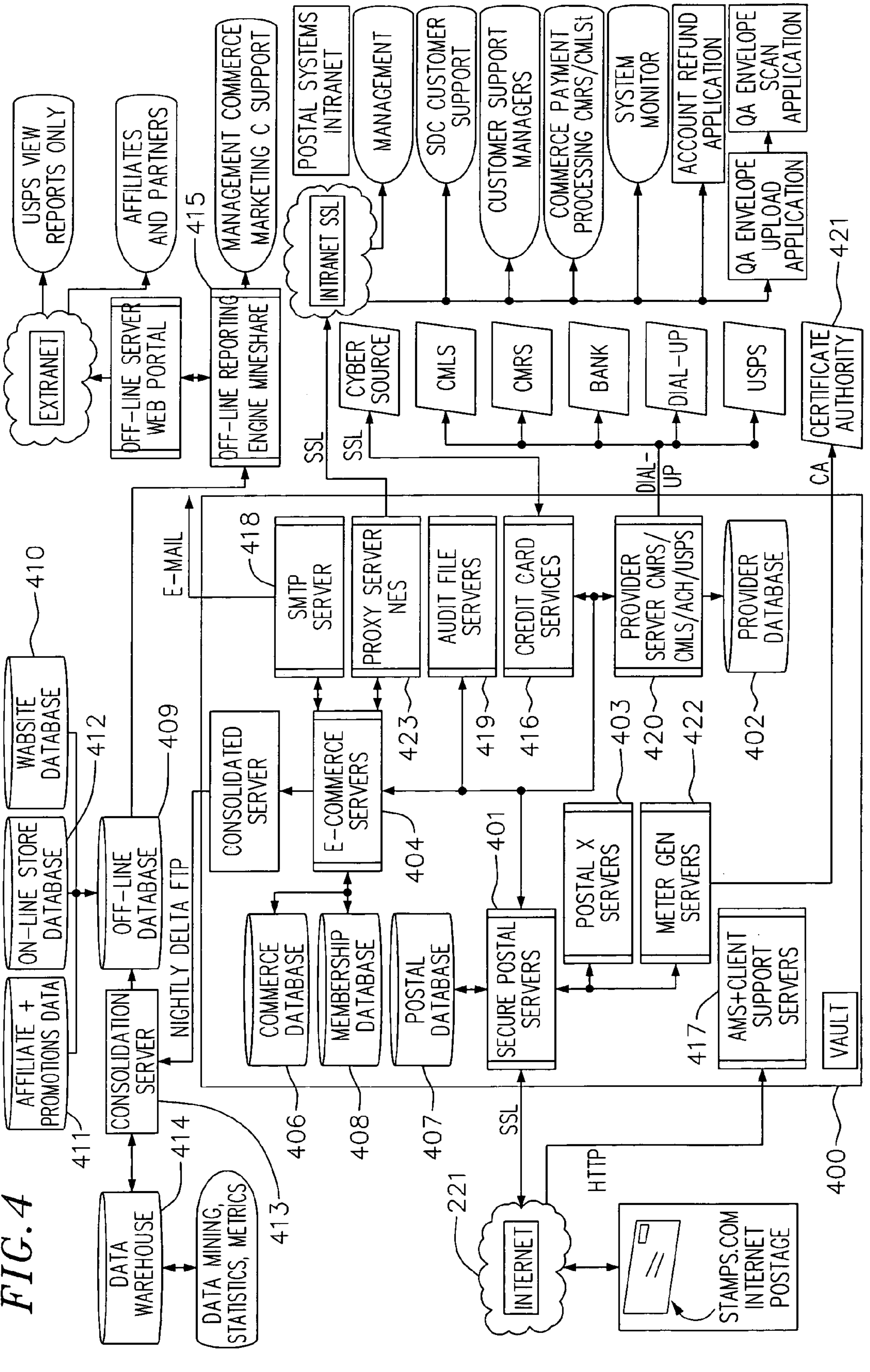
FIG. 4 is an exemplary block diagram of servers, databases, and services according to one embodiment of the present invention.

The Database subsystem is comprised of multiple databases. FIG. 4 illustrates an overview of the on-line VBI system which includes the database subsystems. Database 411 includes the Affiliate DBMS and the Source IDs DBMS. The Affiliate DBMS manages affiliate information (e.g., affiliate's name, phone number, and affiliate's Website information) that is stored on the Affiliate Database. Using the data from this database, marketing and business reports are generated. The Source IDs Database contains information about the incoming links to the vendor's Website (e.g., partners' information, what services the vendor offers, what marketing program is associated with the incoming links, and co-branding information). Using the data from this database, marketing and business reports are generated.

The Online Store Database 412 contains commerce product information, working orders, billing information, password reset table, and other marketing related information. Website database 410 keeps track of user accesses to the vendor website. This database keeps track of user who access the vendor website, users who are downloading information and programs, and the links from which users access the vendor website. After storing these data on the Website Database 410, software tools are used to generate the following information:

Web Site Status
Web Site Reports
Form Results
Download Successes
Signup, Downloads, and Demographic Graphs
Web Server Statistics (Analog)
Web Server Statistics (Web Analyzer)

Offline database 409 manages the VBI (e.g., postal) data except meter information, postal transactions data, financial transactions data (e.g., credit card purchases, free postage issued, bill credits, and bill debits), customer marketing information, commerce product information, meter license information, meter resets, meter history, and meter movement information. Consolidation Server 413 acts as a repository for data, centralizing data for easy transportation outside the vault 400. The Consolidation Server hosts both file and database services, allowing both dumps of activity logs and reports as well as a consolidation point for all database data. The Offline Reporting Engine MineShare Server 415 performs extraction transformation from the holding database that received transaction data from the Consolidated Database (Commerce database 406, Membership database 408, and Postal Database 407). Also, the Offline Reporting Engine MineShare Server handles some administrative tasks. Transaction data in the holding database contains the transaction information about meter licensing information, meter reset information, postage purchase transactions, and credit card transactions. After performing extraction transformation, business logic data are stored on Offline Database 409. Transaction reports are generated using the data on the Offline Database. Transaction reports contain marketing and business information.

The Data Warehouse database 414 includes all customer information, financial transactions, and aggregated information for marketing queries (e.g., how many customers have purchased postage). In one embodiment, commerce Database 406 includes a Payment Database, an E-mail Database, and a Stamp Mart Database. The E-mail DBMS manages access to the contents of e-mail that were sent out to everyone by vendor servers. The Stamp Mart database handles order form processing. The E-commerce Server 404 provides e-commerce related services on a user/group permission basis. It provides commerce-related services such as payment processing, pricing plan support and billing as well as customer care functionality and LDAP membership personalization services. A Credit Card Service is invoked by the E-commerce Server 404 to authorize and capture funds from the customer's credit card account and to transfer them to the vendor's merchant bank. A Billing Service is used to provide bills through e-mail to customers based on selected billing plans An ACH service runs automatically at a configurable time. It retrieves all pending ACH requests and batches them to be sent to bank for postage purchases (i.e. money destined for the USPS), or Chase for fee payments which is destined for the vendor account.

The E-commerce DBMS 406 manages access to the vendor specific Payment, Credit Card, and Email Databases. A Membership DBMS manages access to the LDAP membership directory database 408 that hosts specific customer information and customer membership data. A Postal DBMS manages access to the Postal Database 407 where USPS specific data such as meter and licensing information are stored. A Postal Server 401 provides secure services to the Client, including client authentication, postage purchase, and indicia generation. The Postal Server requires cryptographic modules to perform all functions that involve client authentication, postage purchase, and indicia generation.

Postal Transaction Server 403 provides business logic for postal functions such as device authorization and postage purchase/register manipulation. The Postal Transaction Server requires the cryptographic modules to perform all functions. There are four Client Support Servers. Address Matching Server (AMS) 417 verifies the correct address specified by a user. When the user enters a delivery address or a return address using the Client Software, the user does not need the address matching database on the user's local machine to verify the accuracy of the address. The Client software connects to the vendor's server and uses the central address database obtained from the USPS to verify the accuracy of the address. If the address is incorrect, the client software provides the user with a prioritized list of addresses to match the correct address. These choices are ranked in a user definable order. This information is represented using a plain text format.

The Client Support Servers 417 provides the following services: a Pricing Plan service, an Auto Update service, and a Printer Config service. The Pricing Plan Service provides information on pricing plans and payment methods available to the user. It also provides what credit cards are supported and whether ACH is supported. This information is represented preferably using a plain text format. The Auto Update Service verifies whether the user is running the latest Client Software. If there is newer Client Software, the Auto Update Server downloads the new patches to the user computer. The Client Support Database has tables for the client software update information. This information is represented using a plain text format. Before the user tries to print postage, the user sends his or her printer driver information over the Internet in plain text. A Printer Config Service looks up the printer driver information in the Printer Driver Database to determine whether the printer driver is supported or not.

When the user tries to configure the printer, the user prints a test envelope to test whether the postage printing is working properly or not. This testing envelope information is sent over the Internet in plain text and is stored in the Client Support Database.

MeterGen server 422 makes calls into the cryptographic module to create sufficient meters to ensure that the vendor can meet customer acquisition demands. SMTP Server 418 communicates with other SMTP servers, and it is used to forward e-mail to users. Gatekeeper Server works as a proxy server by handling the security and authentication validation for the smart card users to access customer and administration information that reside in the vault. The Proxy Server 423 uses the Netscape™ Enterprise SSL library to provide a secure connection to the vault 400. Audit File Server 419 acts as a repository for module transaction logs. The Audit File Server verifies the audit logs that are digitally signed. The audit logs are verified in real time as they are being created. Postal Server writes audit logs to a shared hard drive on the Audit File Server. After these logs are verified, the Audit File Server preferably moves them from the shared hard drive to a hard drive that is not shared by any of the vendor servers.

Provider Server provides reporting and external communication functionality including the following services. CMLS Service forwards license applications and it processes responses from CMLS. The CMLS Service uses cryptographic functions provided by the Stamps.com Crypt library to decrypt the user's SSN/Tax ID/Employee ID. CMRS Service reports meter movement and resetting to the USPS Computerized Meter Resetting infrastructure. ACH Service is responsible for submitting ACH postage purchase requests to the USPS lockbox account at the bank. The CMLS Service uses cryptographic functions to decrypt the user's ACH account number. After decrypting ACH account information, the ACH is encrypted using the vendor's script library. Then, the encrypted ACH file is e-mailed to the Commerce Group by the SMTP server. When the Commerce Group receives this encrypted e-mail, the vendor's Decrypt utility application is used to decrypt the ACH e-mail. After verifying the ACH information, the Commerce Group sends the ACH information through an encrypted device first and then uses a modem to upload the ACH information to a proper bank. The Certificate Authority issues certificates for all IBIP meters. The certificates are basically used to provide authentication for indicia produced by their respective meters.

The following are the steps describing the certificate authorization process:

MeterGen asks the module to create a meter package,

The module returns a package and the meter's public key,

MeterGen creates a certificate request with the public key, signs the request with a USPS-issued smartcard, and submits the request to the USPS Certificate Authority, The Certificate Authority verifies the request came from the vendor then, it creates a new certificate and returns it to MeterGen, MeterGen verifies the certificate using the USPS Certificate Authority's certificate (e.g., to ensure it wasn't forged) and stores the certificate information in the package. The package is now ready to be associated with a customer.

The Postal Server subsystem 401 manages client and remote administration access to server functionality, authenticates clients and allows clients to establish a secure connection to the on-line postage system. The Postal Server subsystem also manages access to USPS specific data such as PSD information and a user's license information. The Postal Server subsystem queries the Postal portion of the Database subsystem for the necessary information to complete the task. The query travels through the firewall to the Postal portion of the Database subsystem. The Postal Server subsystem is the subsystem in the Public Network that has access to the Database subsystem.

In one embodiment of the present invention, Postal Server 401 is a standalone server process that provides secure connections to both the clients and the server administration utilities, providing both client authentication and connection management functionality to the system. Postal Server 401 also houses postal-specific services that require high levels of security, such as purchasing postage or printing indicia. Postal Server 401 is comprised of at least one server, and the number of servers increases when more clients need to be authenticated, are purchasing postage or are printing postage indicia.

The growth in the number of servers of the Postal Server will not impact the performance of the system since the system design allows for scalability. The Postal Server is designed in such a way that all of the business logic is processed in the servers and not in the database. By locating the transaction processing in the servers, increases in the number of transactions can be easily handled by adding additional servers. Also, since each transaction is stateless (the application does not remember the specific hardware device the last transaction utilized), multiple machines can be added to each subsystem in order to handle increased loads. In one embodiment, load balancing hardware and software techniques are used to distribute traffic among the multiple servers.

Figure 3:
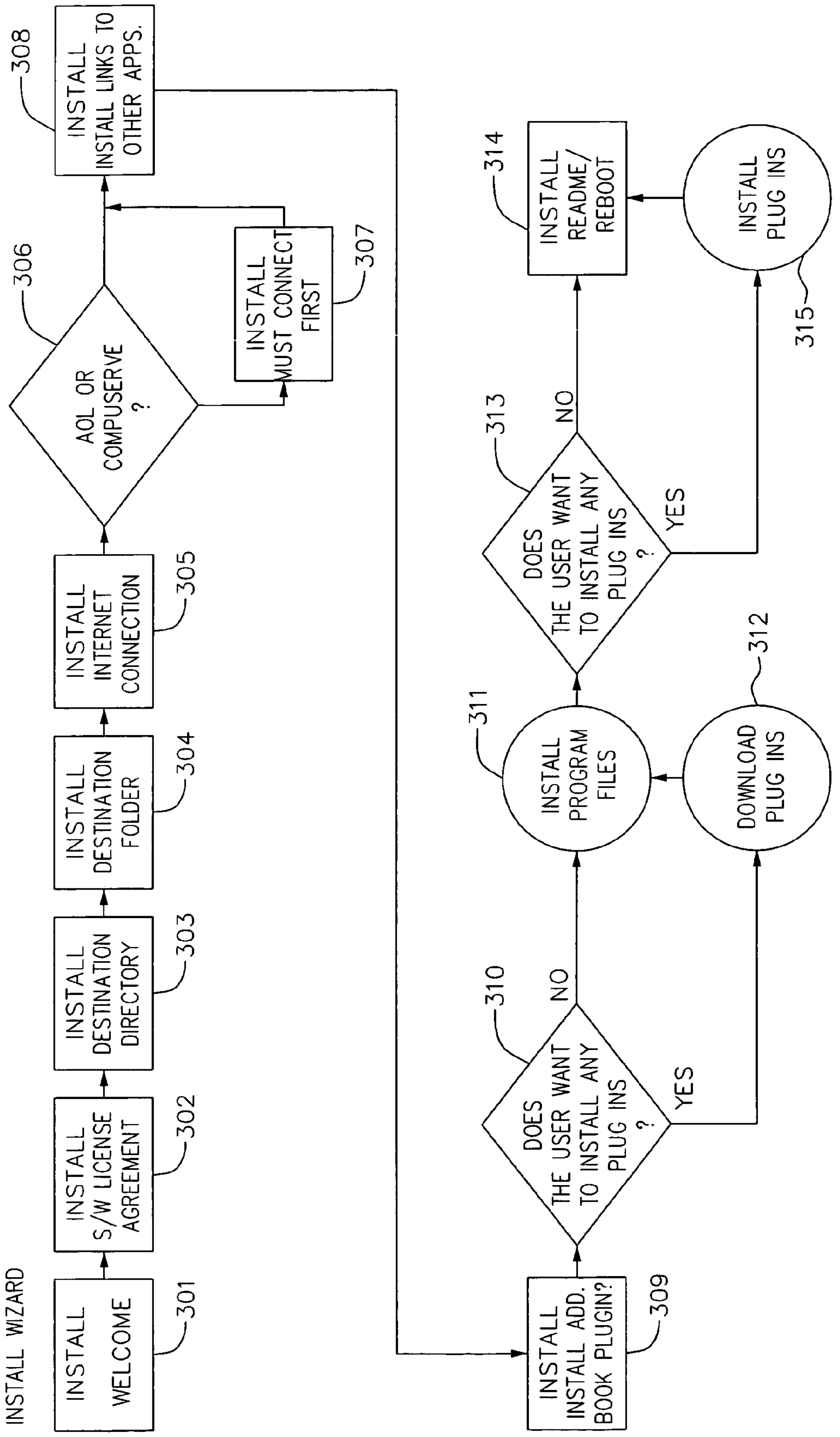
FIG. 3 is an exemplary flow diagram of an installation wizard.

The client software includes GUI and wizards for software installation, user registration, printing of VBI, account information access, payment, and the like. An installation wizard helps the user to install the client software. FIG. 3 is an exemplary flow for the installation routine. In blocks 301–305, the user agrees to the software license agreement and selects a destination directory and folder for the installation software. In blocks 306–307, the user selects the appropriate ISP and connects to Internet. Links to other application software and address book are installed in blocks 308 and 309, respectively. Any desired plugin software is downloaded and installed in blocks 312 and 315. In block 311, the program files care installed and in block 314 the Readme is installed and the user computer is re-booted. The install wizard supports an Auto Update before the software is installed. Specifically, the install wizard checks the server for a newer version of the client software before installing the software. If a newer version is available, then the install wizard notifies the user that a newer version is available on the server, and prompts the user whether or not the file is downloaded. If a newer version is not available, then the install wizard proceeds.

Figure 5A:
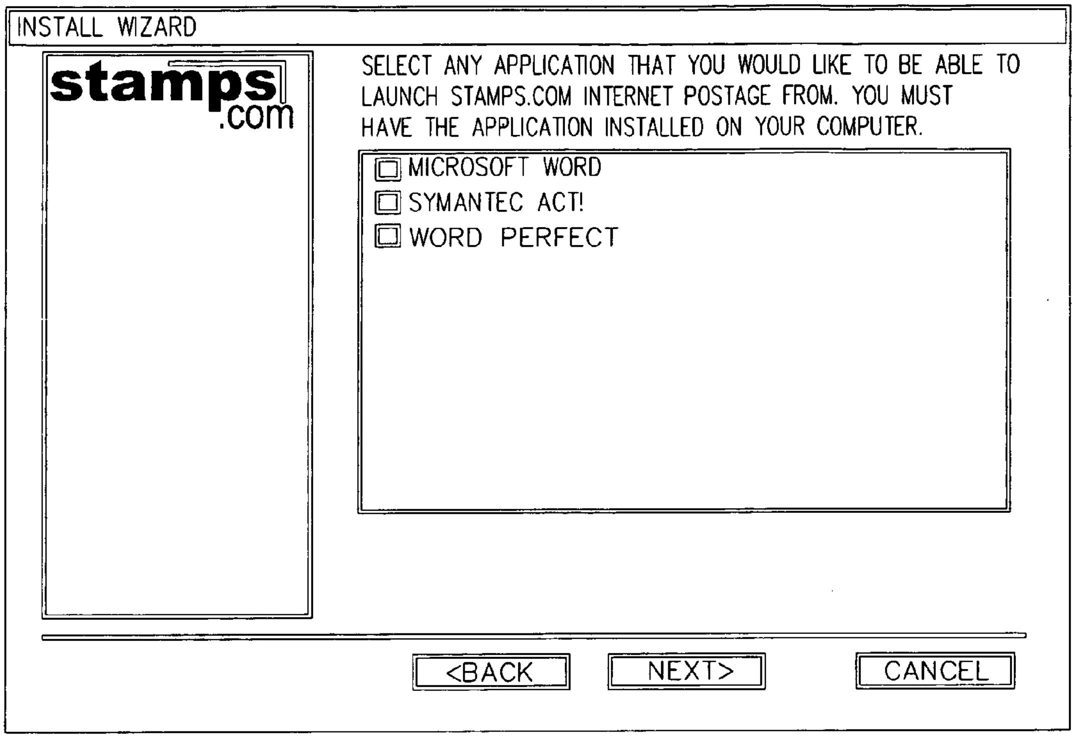
FIGS. 5A–5B are exemplary interfaces for application plugins.
Figure 5B:
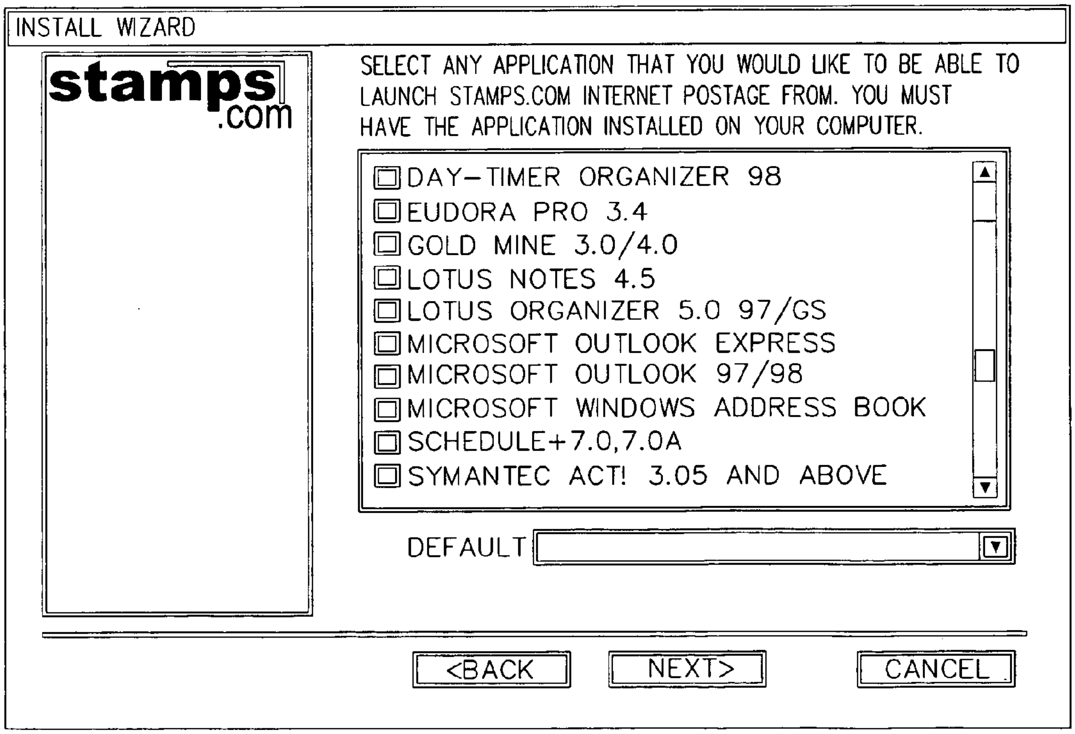

The install routine supports the installation of third party applications, including MS Word™, and Word Perfect™. The plugins for these applications are preferably included in the download file. The install wizard preferably prompts the users which of these, if any, they would like to install. An exemplary interface is shown in FIG. 5A. Address book plugins help the user select an appropriate plugin to support the function of an address book. The Install Address Book plugins are not part of the standard download file in the preferred embodiment. Rather, each plugin is its own file that resides on the web. The install wizard preferably prompts the user which, if any of the plugins is installed. If multiple selections are made, the user is prompted for a default address book. The interface for this function is shown in FIG. 5B. This list is dynamic so that the Address Book plugins can be added or subtracted without requiring a full client update.

The installation routine also supports OEM branding. Specifically, the install wizard is such that the elements described in OEM branding are stored in a resource file, so that the install routine itself preferably does not need to be changed —rather the resource file is changed. The installation routine or the Getting Started wizard also supports the OEM branding requirements. Specifically, a cookie is read and its contents are uploaded to the server.

Figure 6A:
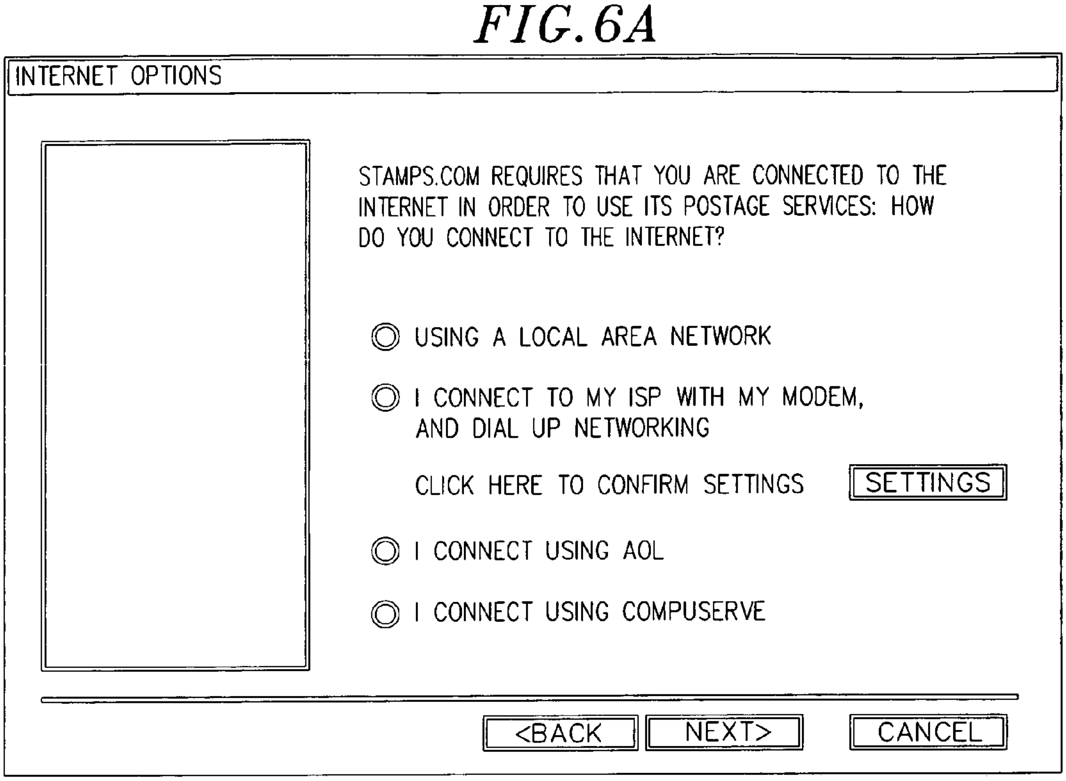
FIGS. 6A–6E are exemplary interfaces for Internet connection options.
Figure 6B:
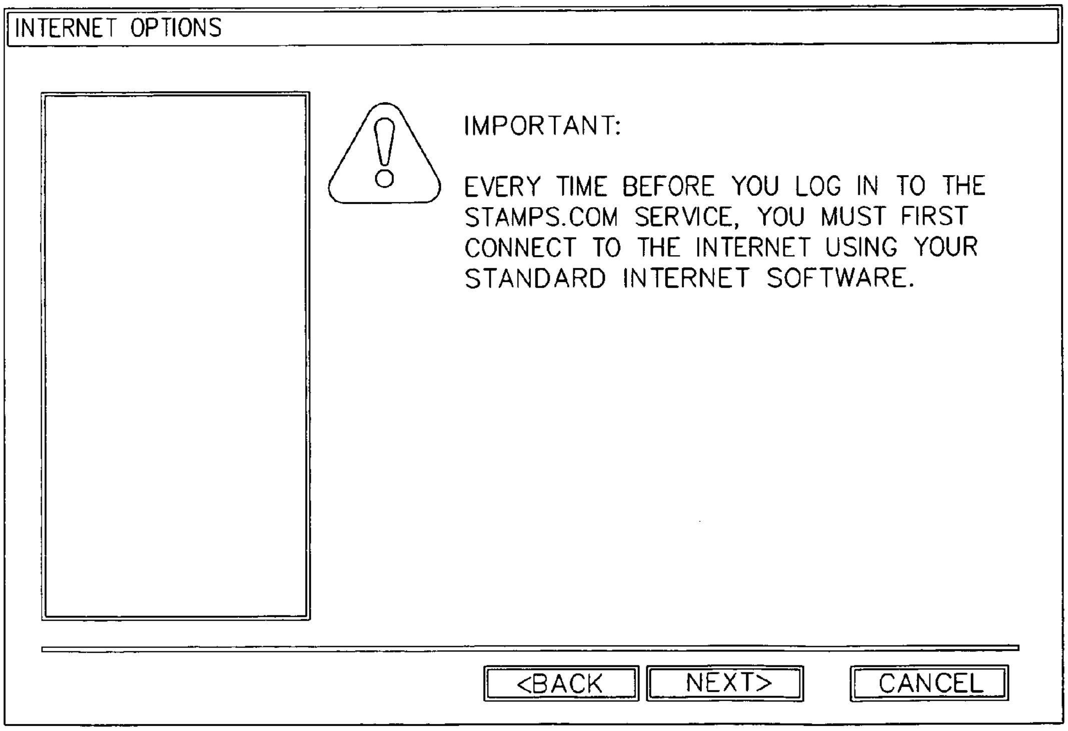
Figure 6C:
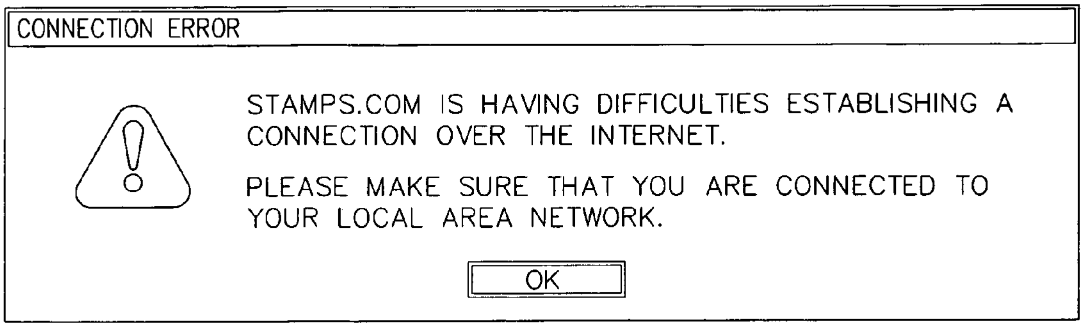
Figure 6D:
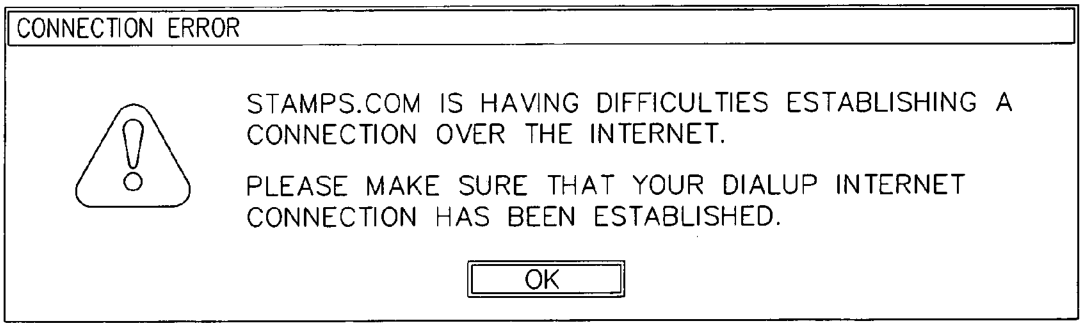
Figure 6E:
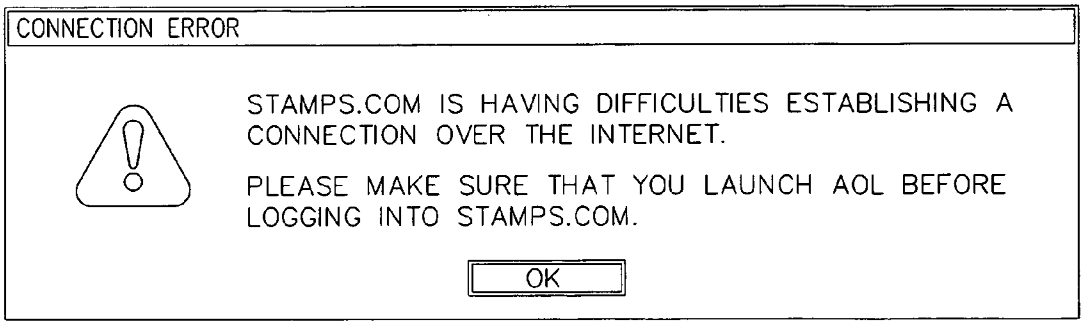

FIGS. 6A–6E are exemplary interfaces for the Internet connections. As shown in FIG. 6A, once the "I connect with my modem . . . " radio button is selected, the "Click here to confirm settings text" and "Settings . . . " button become available. When "I connect using AOL" is chosen, then an additional wizard screen is seen by the user as shown in FIG. 6B . . . . If "I connect using CompUServe is chosen, an additional wizard screen is seen by the user as shown in FIG. 6B.

When the user first attempts to log in, and a connection cannot be established, an error message appears based upon which connection method the user has chosen. In one embodiment, if the user chose to connect by a local area network, the error message shown in FIG. 6C appears. if the user chose to connect by a dial up networking connection, the error message shown in FIG. 6D appears. if the user chose to connect using AOL, the error message shown in FIG. 6E appears.

Figure 7A:
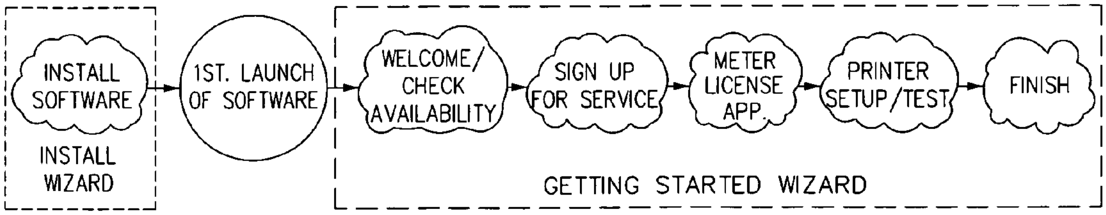
FIGS. 7A–7C are exemplary process flow diagrams for a getting started wizard.

Before a user can begin to print postage, a significant number of tasks are preferably first completed. These steps are combined into a wizard that launches after the customer installs the client software. The preferred goal is to provide a single, streamlined interface that removes any interruptions once the user completes the wizard. The overall flow of the user experience in getting started with the software is shown in FIG. 7A. The Getting Started wizard includes five main components, a Welcome component is responsible for welcoming the user (customer), and determining whether or not the user should proceed through the complete Getting Started wizard at this time. A Sign up for Service group of screens leads the customer through signing up for a service plan. A Registration wizard group of screens handles the meter license application, and can also be accessed through the client application through the Options screen. A Print Setup group of screens take the user through printer verification and printing a quality assurance (QA) envelope. This component of the Getting Started wizard includes several independent wizards which can be accessed through the client software. The Finish portion of the Getting Started wizard congratulates the user and launches the client software. Preferably, the Getting Started wizard is comprised of multiple components to facilitate their reuse as individual wizards within the client software.

Typically, the volume of screens that make up the Getting Started wizard are significant. In order to prevent the user form being overwhelmed with the process, preferably the system constantly gives the customer a sense as to where they are in the process. To satisfy this goal, the software utilizes a "Follow the Yellow Brick Road" interface, which constantly updates the users on their progress in the wizard. The left side graphic area is used to indicate which of these stages that the user is currently in. In one embodiment, the stage is indicated using text, with the current stage being highlighted. Using text rather than graphics helps minimize the download size.

Each screen of the Getting Started wizard preferably has a Help button which links to a portion of the Help file that pertains to that screen. Whenever a combo box is used in this wizard, by default no item is selected, and the prompt "select one" preferably appears to the user. Preferably, every screen in the Getting Started wizard has a Cancel button on it. The functionality of these buttons is consistent throughout the wizard. The various functions that are executed when a user selects the Cancel button are described below.

Figure 7B:
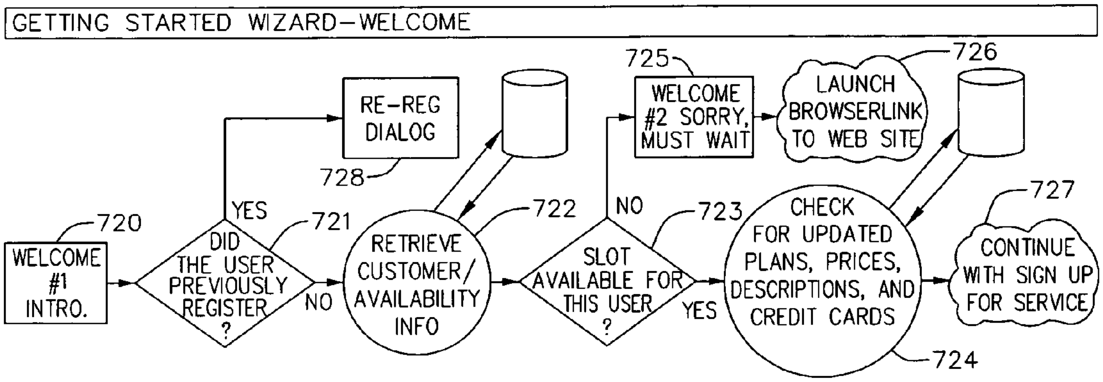
Figure 7D:
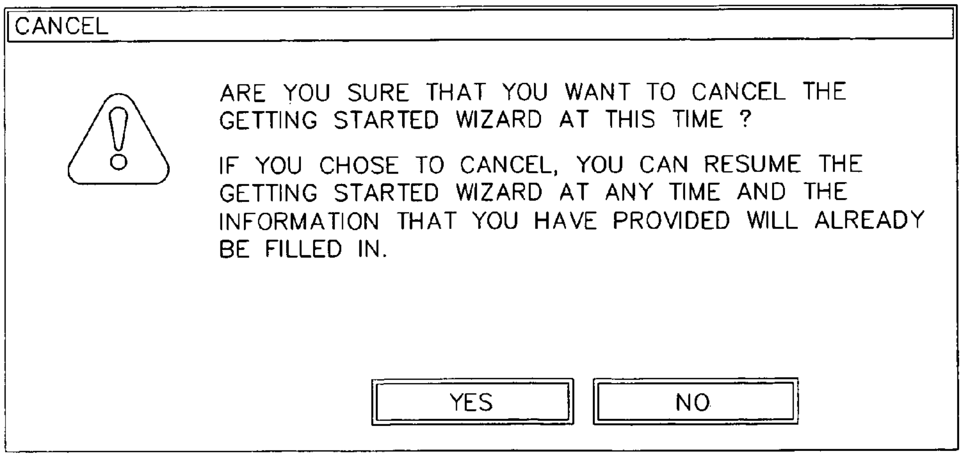
FIG. 7D is an exemplary dialog box for allowing a user to cancel a getting started wizard.

The Verification Prompt is a standard prompt that verifies the user indeed would like to cancel the wizard. This is accomplished through a standard dialog box as shown in FIG. 7D. A Save Data button is also provided. When the user selects the Cancel button, all of the data that the user has input is saved locally. If the user starts the Getting Started wizard at a later time, all of the information that was previously entered is filled into the appropriate screen in the wizard. Using an upload Data button, the client preferably uploads the following data to a log on one of the servers; Customer email, the screen that the user catcalled on (resource ID), and the source (OEM partner, affiliate, etc.). When the Getting Started wizard first attempts to establish an Internet connection and experiences an error in connecting, error messages appear depending upon the connection method chosen by the user.

The Welcome portion of the Getting Started wizard provides two functions. First, it welcomes the user to the process and gives the user an idea of what is involved in the process. Second, it determines whether or not a user should complete the Getting started wizard at this time. There are two reasons why a user is kept from completing the Getting Started wizard, as shown in FIG. 7B. The first is if the user has previously completed the Getting Started wizard, shown by block 721. The second is when the provider's service is over booked and there is no opening available for the user, as shown by block 723. When this portion of the Getting Started wizard has begun, the Follow the Yellow brick Road text t reads "Start". The logical flow of the Sign up for Service component is shown in FIG. 7B.

Figure 8A:
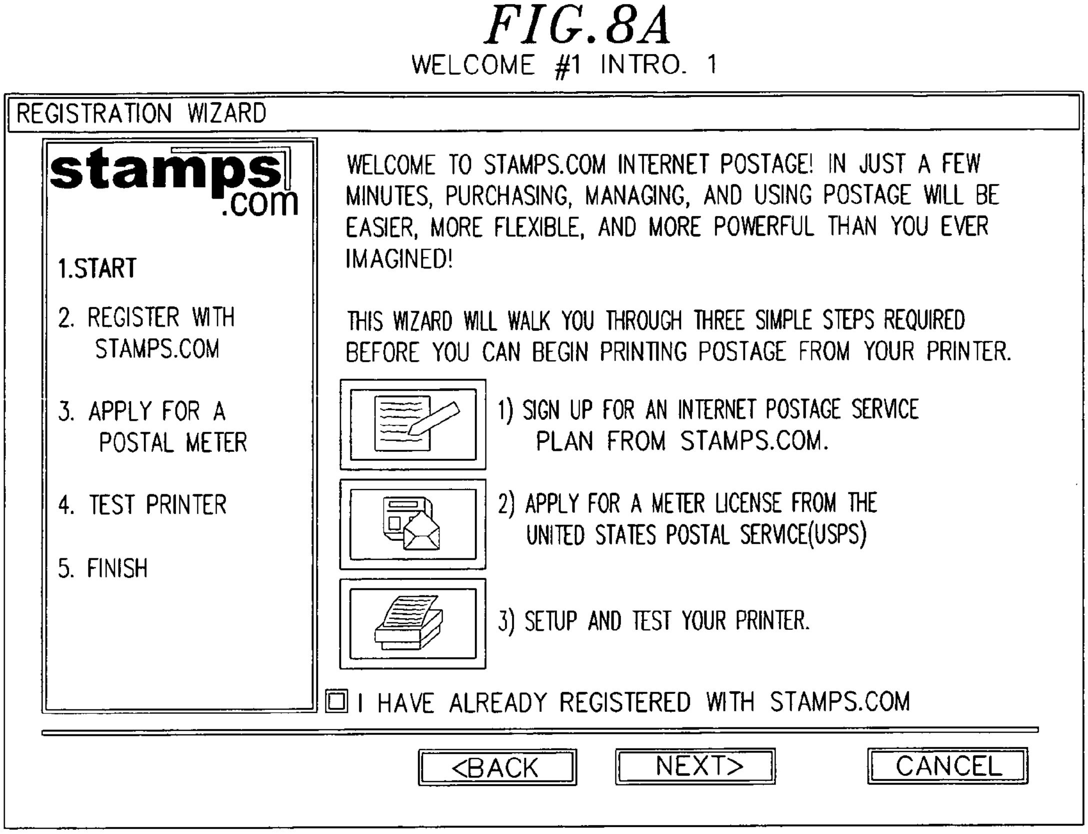
FIGS. 8A–8B are exemplary interfaces for registration.

The Welcome Screen #1 720, in FIG. 7B, lists three major steps that the customer should complete in order to finish the wizard. As shown in FIG. 8A, the screen includes a smaller version of each screen group graphic to help the customers recognize each screen group as they come to it. The "Welcome" step of the "Follow the Yellow-brick Road" list is highlighted to show the customers that they are on the Welcome screen. A check box allows a user to skip the Registration and Print Configuration wizard. If the user selects the check box, the wizard closes and the "rereg" dialog box appears. The default state for the check box is unselected.

Figure 8B:
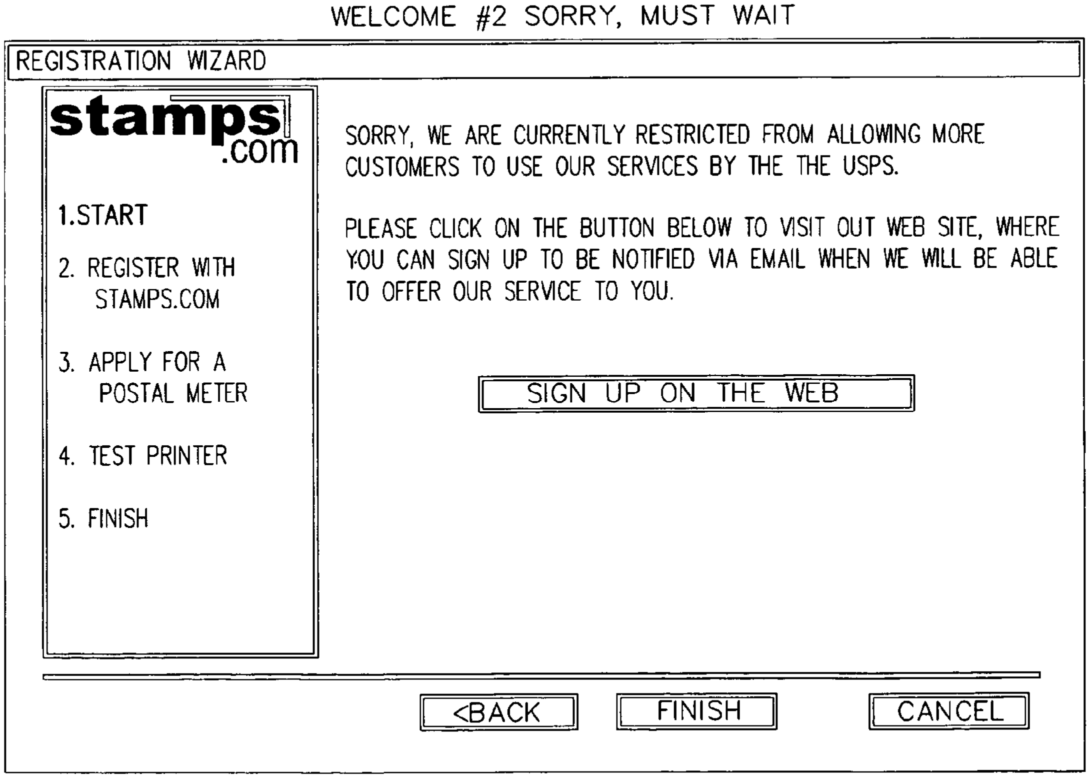

If there is no slot available for the user, the Welcome Screen #2 725, in FIG. 7B, appears to the user in the event that the user cannot be signed up the user at that time. A URL link button links the user to the web site on the page where the user can pre-register, as shown in FIG. 8B. By preregistering, the user will later be notified when a slot is available.

At this point in the Getting Started wizard, the client preferably downloads information from the server for use throughout the remainder of the wizard. Specifically, the information that is downloaded includes Service Plan Information such as Plan Name, Plan ID, Text file describing all of the plans, Contract for the plan (text file), Min purchase amount, Max purchase amount, Purchase Upfront (y/n), URL link to full description (common web link for all plans), Preferred Service Plan; and Payment Information including Payment types accepted, and Preferred payment type.

Figure 7C:
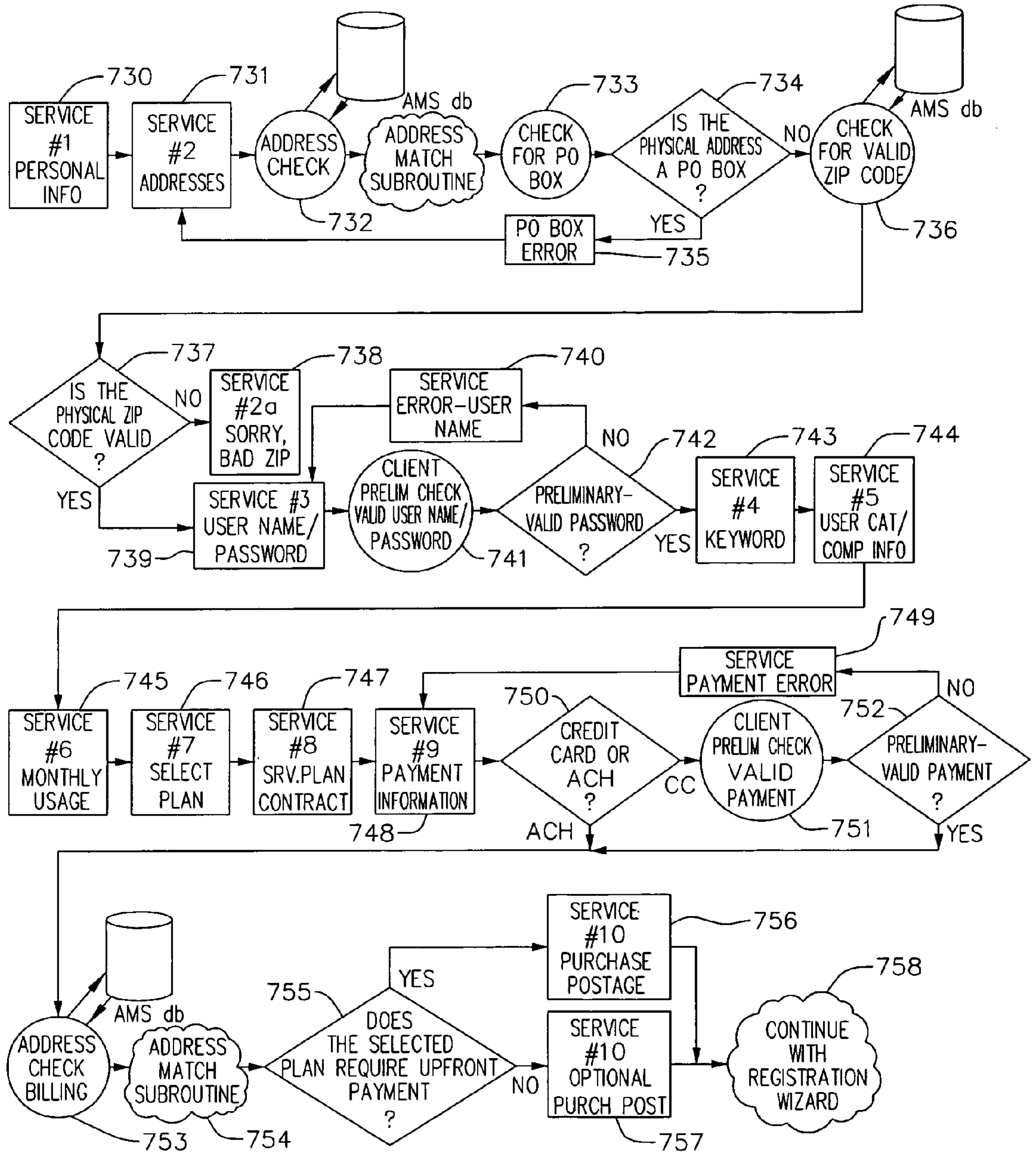

The Sign up for Service component of the Getting Started wizard extracts all of the information required to sign up the user for service with the provider. When this portion of the Getting Started wizard has begun, the "Follow the Yellow Brick Road" text is changed to "Register with Provider" (e.g., Stamps.com). The logical flow of the Sign up for Service component is shown in FIG. 7C.

Figure 9A:
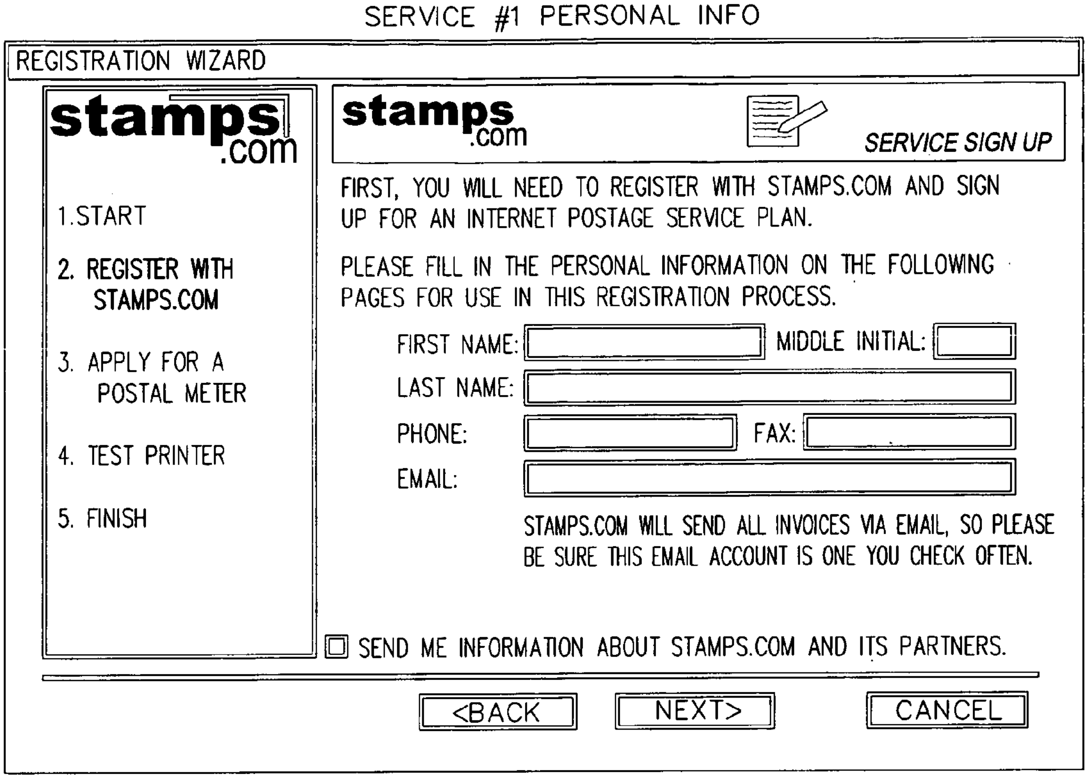
FIGS. 9A–9N are exemplary interfaces for registration and receiving user information.

Service Screen #1 (block 730 of FIG. 7C) is shown in FIG. 9A. The "Send me information . . . " checkbox is checked by default. Selection of this check box provides a database entry that designates that the provider and its partners have the right to solicit the user with marketing programs. The "Next>" button is not enabled until all required information is filled in. Required information for this screen includes the First Name, Last Name, Phone, and Email.

Figure 9B:
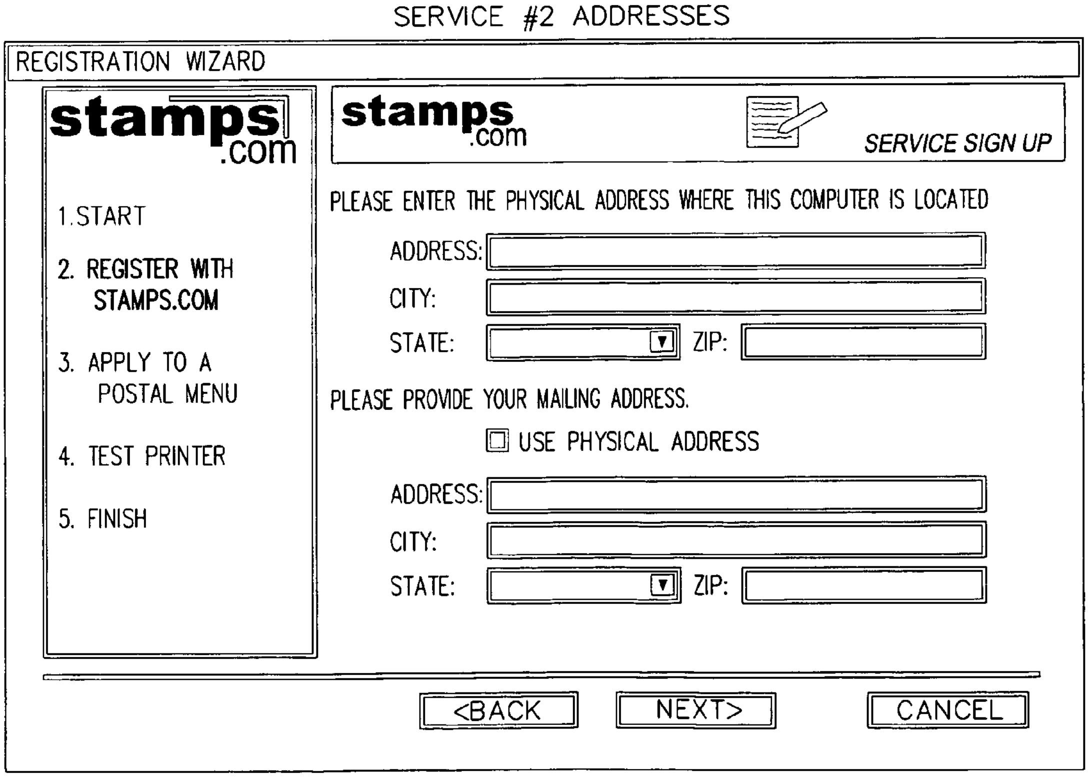

Service Screen #2 (block 731 of FIG. 7C) is depicted in FIG. 9B. The fields in the upper portion of the screen allow the user to enter the physical location of the user computer. The lower portion of the screen allows the user to enter mailing address information in one of two ways. If the user selects the "Use physical address" check box, the values stored for the mailing address are made to be the same as those of the physical address, and the "Next>" button becomes enabled. Otherwise, the mailing address fields are enabled for user input. The "Next>" button is not enabled until all required fields are filled in. After the user selects "Next>", an AMS check on the address is performed, as shown by block 732 of FIG. 7C. The client checks for a PO Box in the physical address fields, as shown by block 733 of FIG. 7C. In blocks 734 and 735, if a P.O. Box is provided, an error message preferably indicates that a P.O. Box is not acceptable.

Figure 9C:
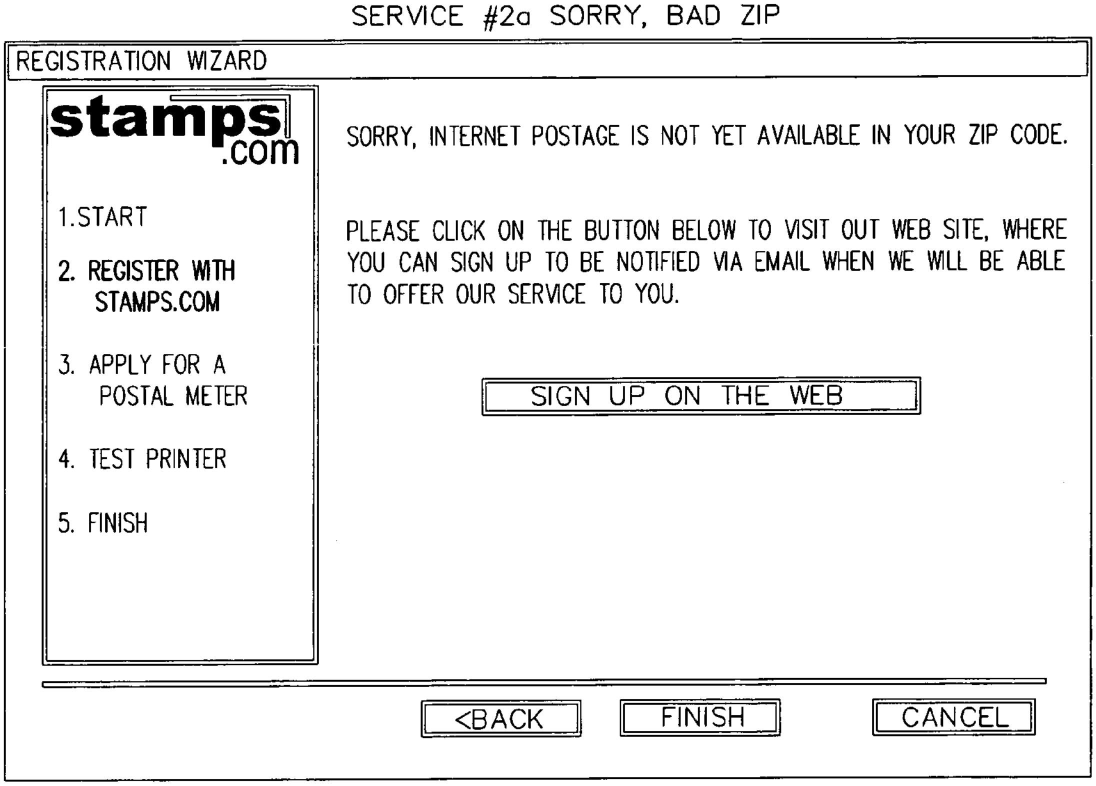

After service screen #2 is completed, in block 736, an AMS check on the addresses is run. Also, a check is made as to determine whether the zip code that the user provides is currently the one that is supported, as shown in block 737. If it is determined that the physical zip code is one that is supported, the user continues with service screen #3 in block 739. If the zip code is NOT one that is supported, Service Screen #2*a* appears to notify the user that the user is unable to sign up at this time, as depicted in block 738. An exemplary interface for Service Screen #2*a* is shown in FIG. 9C. A URL link button links the user to the provider's site on the page where the user can pre-register. By pre-registering, the user is notified later when a slot is available within the zip code for the physical address that is provided.

Figure 9D:
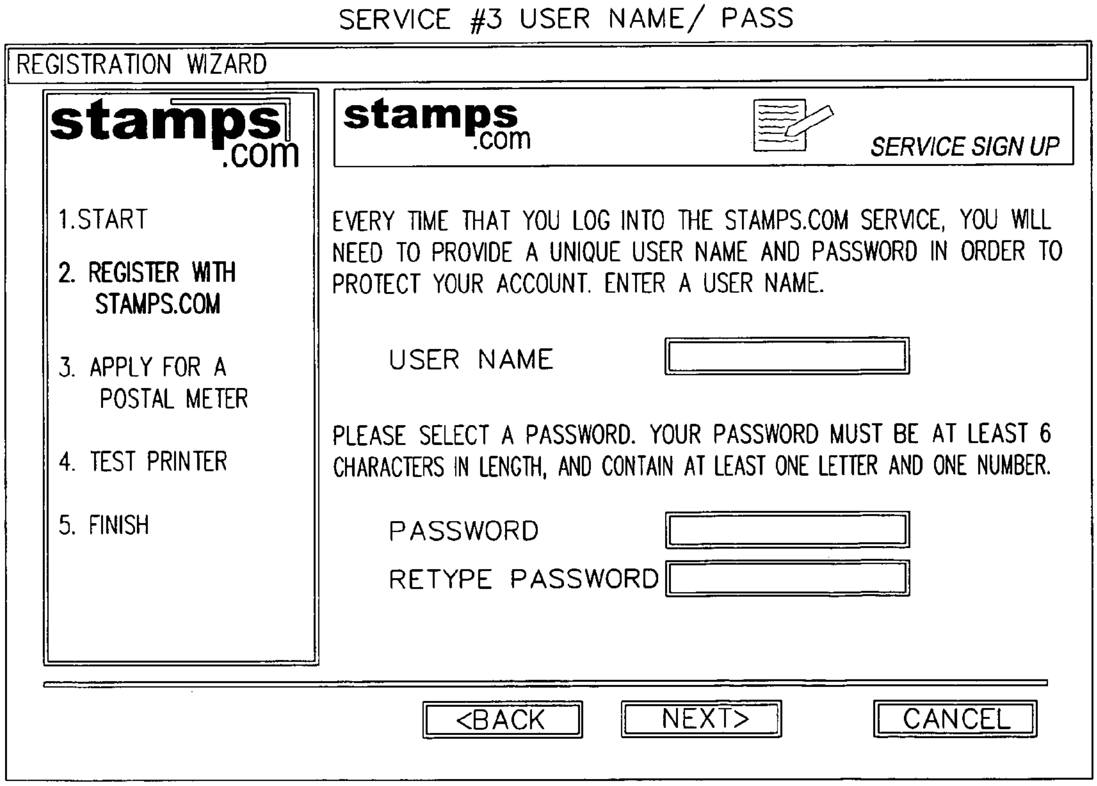
Figure 9E:
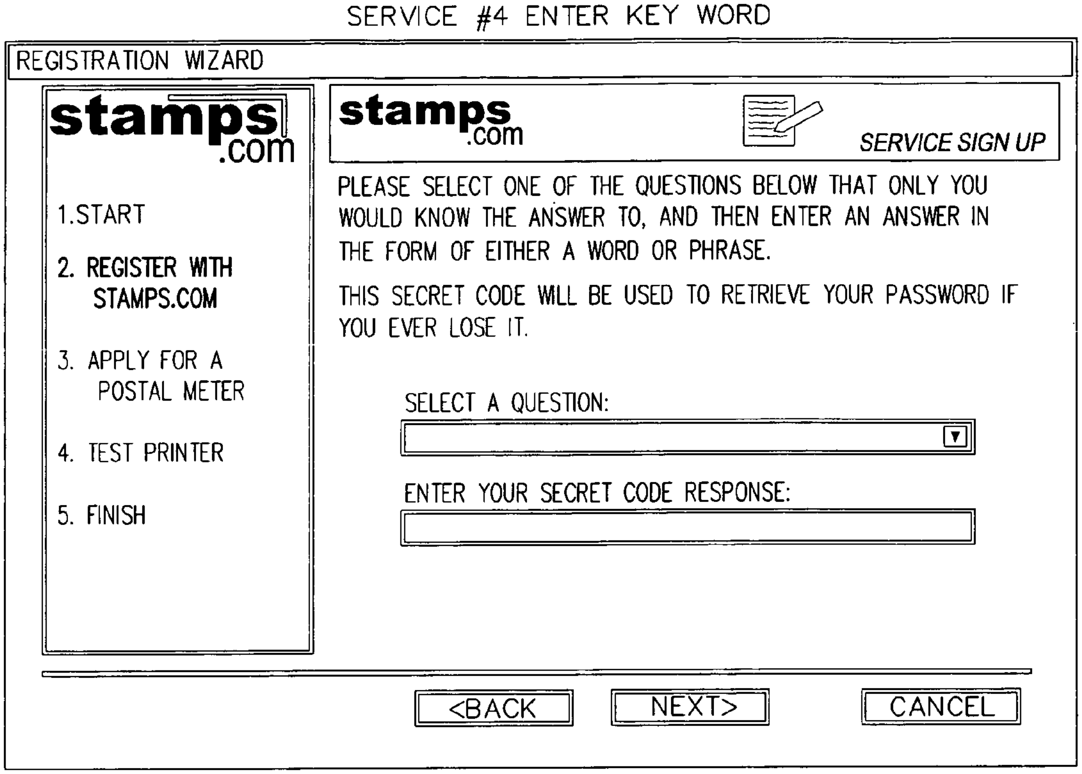

In block 739, the user enters "user name" and "password." An exemplary interface for Service Screen #3 is shown in FIG. 9D. The password preferably comprises at least 6 characters, with at least 1 alpha character and 1 numeric character. The "Next>" button is not enabled until all the information has been filled in. In block 743, Service Screen #4 captures information that either Customer Service or the client software can use to verify a customer's identity in the event that the customer loses his/her password. An exemplary interface for Service Screen #4 is shown in FIG. 9E. The key word, or "secret code" is the answer that the user gives to a question selected by the user. The default questions that the user may select from include;

What is your mother's maiden name?

What is your favorite pets name?

What is your favorite vacation spot?

What is your place of birth?

After selecting a question, the user can enter a response into an edit field. The "Next>" button is not enabled until after the information is filled in.

Figure 9F:
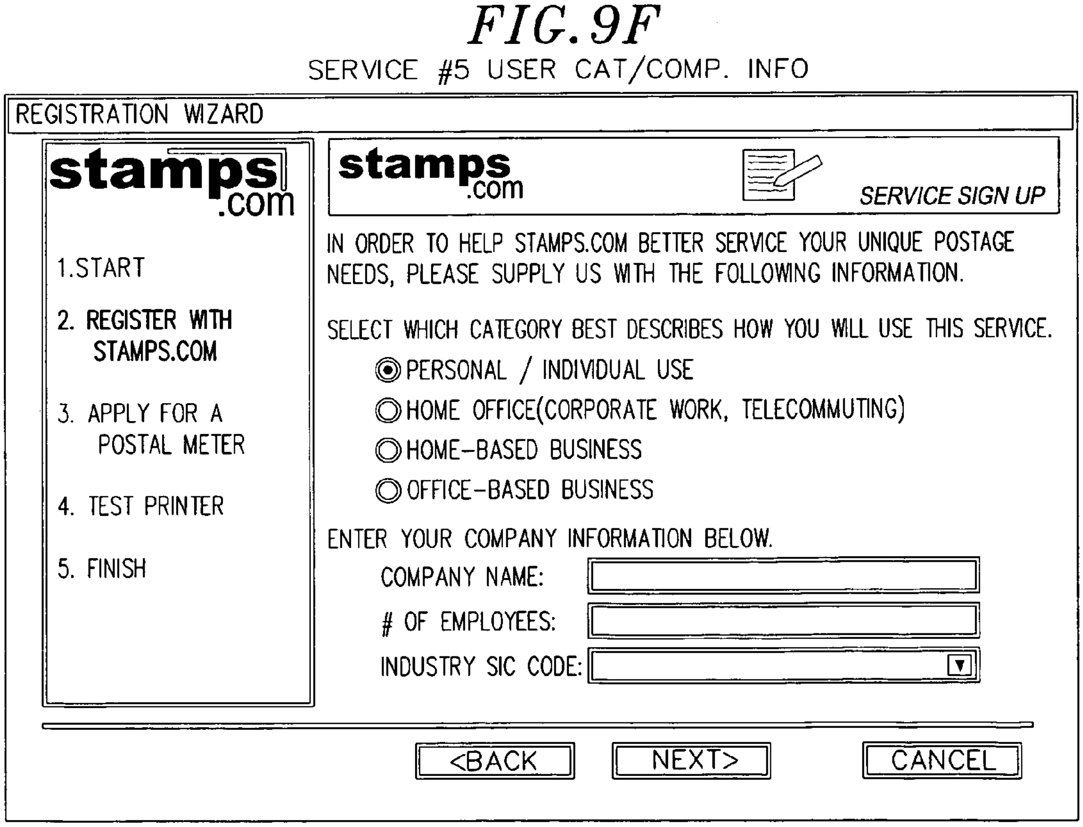

In block 744, in Service Screen #5, the users specify how they will use the account. Preferably, none of the radio buttons are selected on open. An exemplary interface for Service Screen #5 is shown in FIG. 9F. The company information fields and text are grayed-out and disabled until the user selects one of the three business radio buttons. The "Next>" button is not enabled until the user selects the "Personal/Individual" radio button or until the required business fields are populated if the user selects one of the business radio buttons. In addition to storing the user's response for use by the provider, the user's input is interpreted in order to pre-fill portions of the meter license. Specifically, if the user selects the first radio button, "Personal/Individual Use", the user is categorized as a "personal" user for the meter license application. If any of the other three radio buttons are selected, the user is categorized as a business user for the meter license. If the user selects one of the business categories, the data input into the business fields is stored both for use by the provider and for insertion into the meter license application.

Figure 9G:
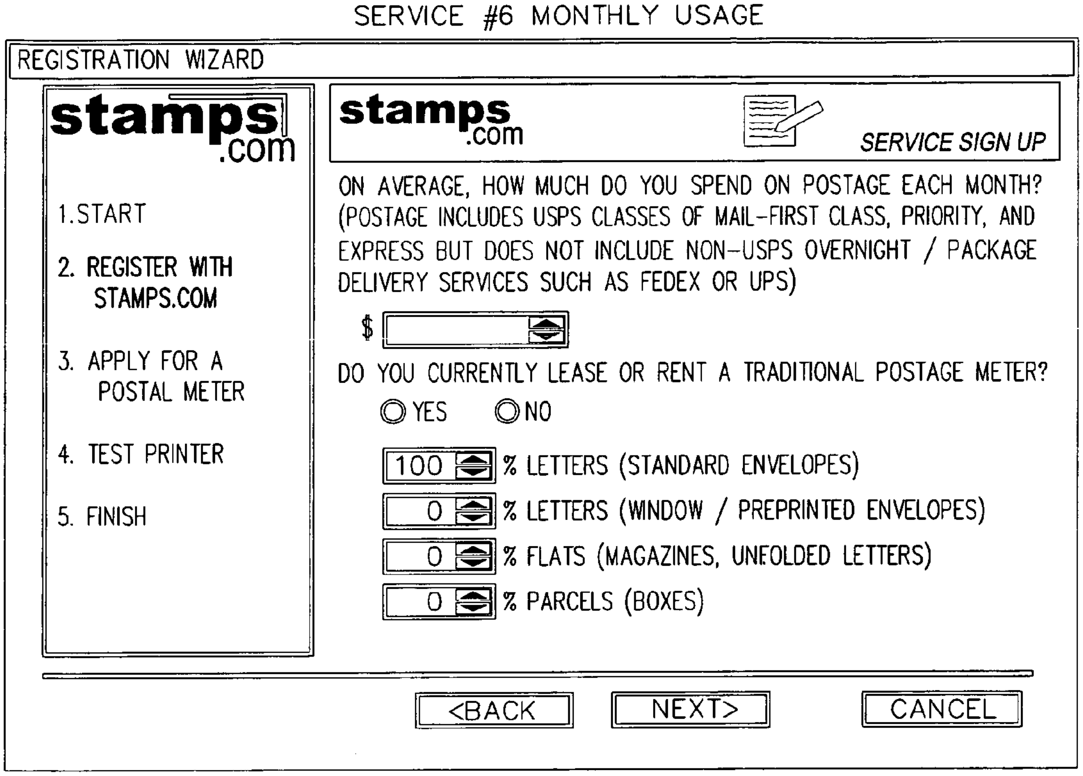

Service Screen #6, in block 745, provides several types of information all related to the user's postage usage habits, for use both by the provider and the USPS. In this screen, as depicted in FIG. 9G, the user specifies their mail volume using a spinner box and the letter category is split into window and standard envelopes. In addition, a question is asked with yes or no radio button response options (Do you currently lease or rent a traditional postage meter?). The "Next>" button is preferably not enabled until the user has selected a value in each box. The mail volume box is blank by default. Each of the four percentage boxes preferably has a 0 in it. When the user hits the "Next>" button, verify that the percentage boxes add up to 100%. When storing the percentages for use in the USPS meter license application, the first two percentages (letters—standard envelopes and letters—windowed/pre printed) are added together to create the value for the USPS "letters" category. The other two percentages map equally to their USPS counterparts.

Figure 9H:
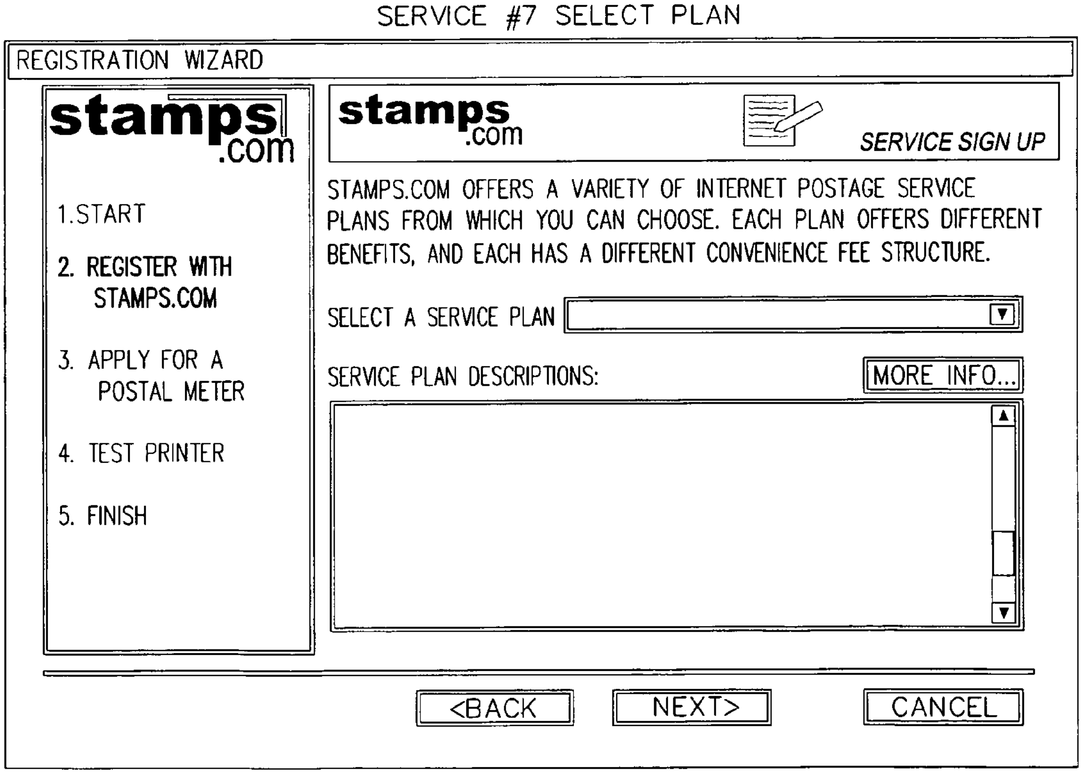

Service Screen #7 (block 746) allows the user to select a service plan from the provider. The following information is preferably downloaded at the beginning of the registration wizard: Service Plan names, a URL to a page on the provider's web site that describes the service plans in detail, and text files describing each service plan. FIG. 9H depicts an exemplary interface for this screen. The drop down box preferably displays all available plans at the time. No plans are selected by default, and the prompt "Select One" appears. At this time, a text file that briefly describes all of the plans currently available is displayed in a scrollable text window below. Once the user selects a plan, the text file below is changed to display a text file that describes only that plan. If a preferred service plan is defined, this plan is the first one to appear on the drop down list (still none of the plans selected by default). A URL link takes the user to provider's web site for details on the plans. The "Next>" button is disabled until the user selects a plan.

Figure 9I:
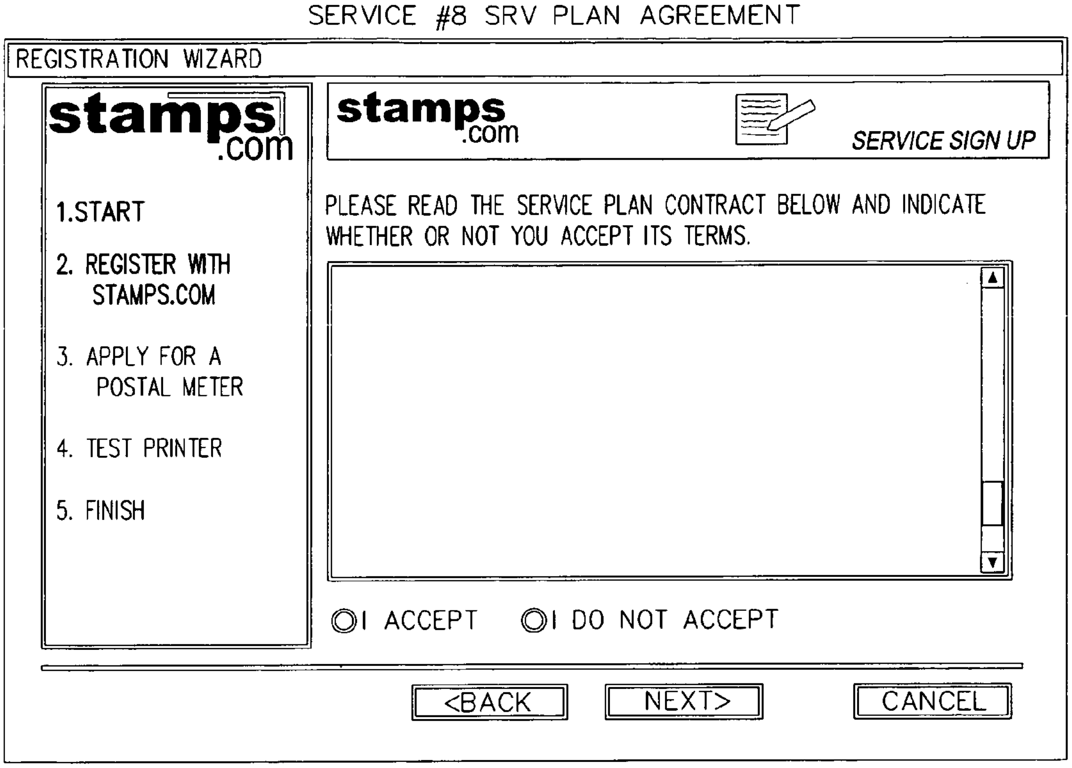
Figure 9J:
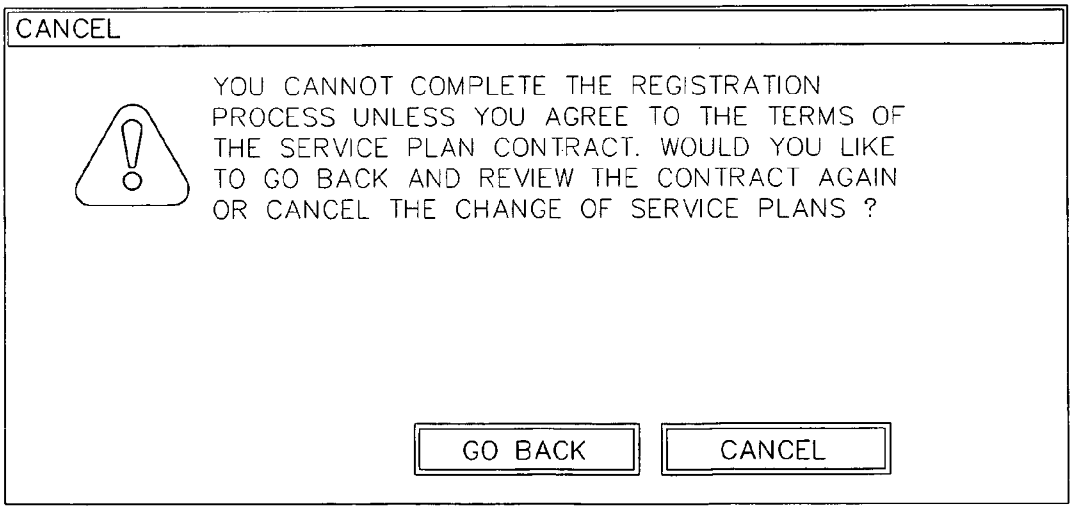

As illustrated in block 747, Service Screen #8 displays the service contract for the service plan that the user selected on the previous screen. This contract is a text file, which is downloaded at the beginning of the registration wizard. As shown in FIG. 9I, neither of the two radio buttons are selected by default, and the "Next>" button is disabled until the user selects one of the choices. If the user selects "I Accept", the wizard will continue. If the user selects "I do NOT accept", a message box should appear as described below. This wizard screen should still remain open in the background behind this dialog box. If the user selects "I do NOT Accept on Screen #8 of FIG. 9I, a dialog box, shown in FIG. 9J, appears indicating that the user must accept the terms in order to sign up with the provider. If the user selects "Go Back", this dialog Box closes, and the user is brought back to screen #8 of the wizard. If the user selects "Cancel", the Getting Started is canceled.

Figure 9K:
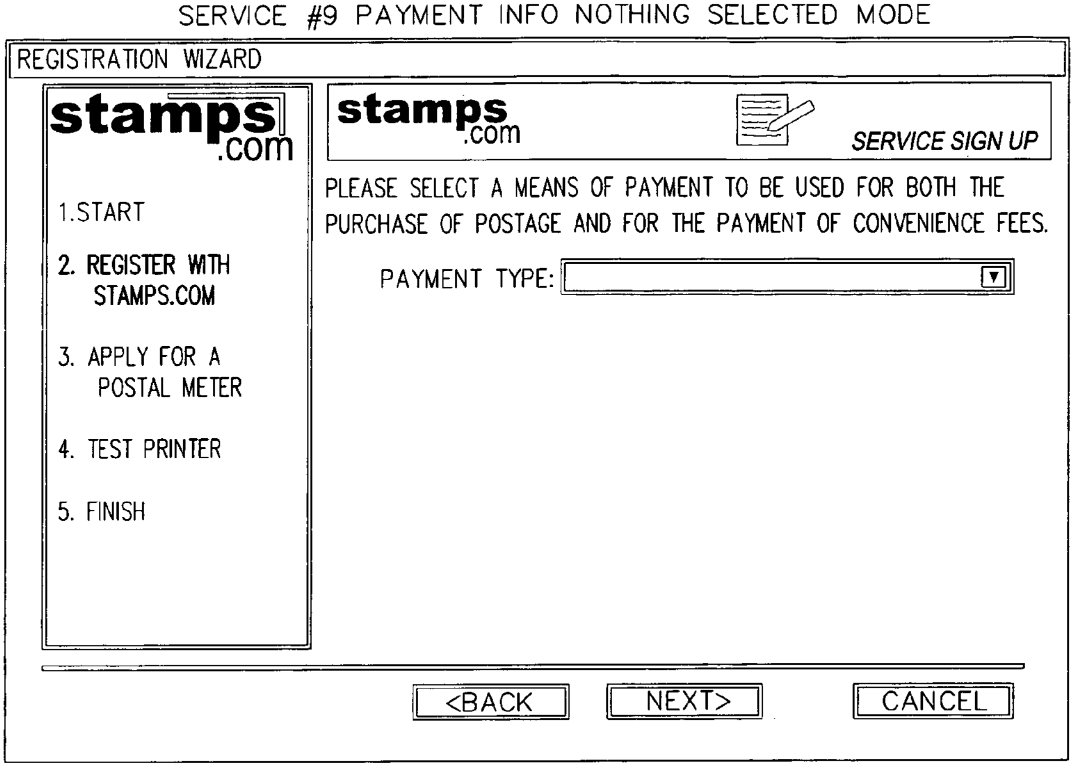

Service Screen #9, depicted in FIG. 9K, is built dynamically, depending upon a user's response to the payment type prompt. The payment type field is empty by default. The values available for this field are preferably downloaded when the registration wizard begins. The "Next>" button is disabled before AND after a value is selected for the payment type. The "Next>" button remains disabled until the screen dynamically builds, and all of the fields are completed by the user. If a preferred payment method is defined, this method of payment is the first one to appear on the drop down list (still none of the payment method types are selected by default).

Figure 9L:
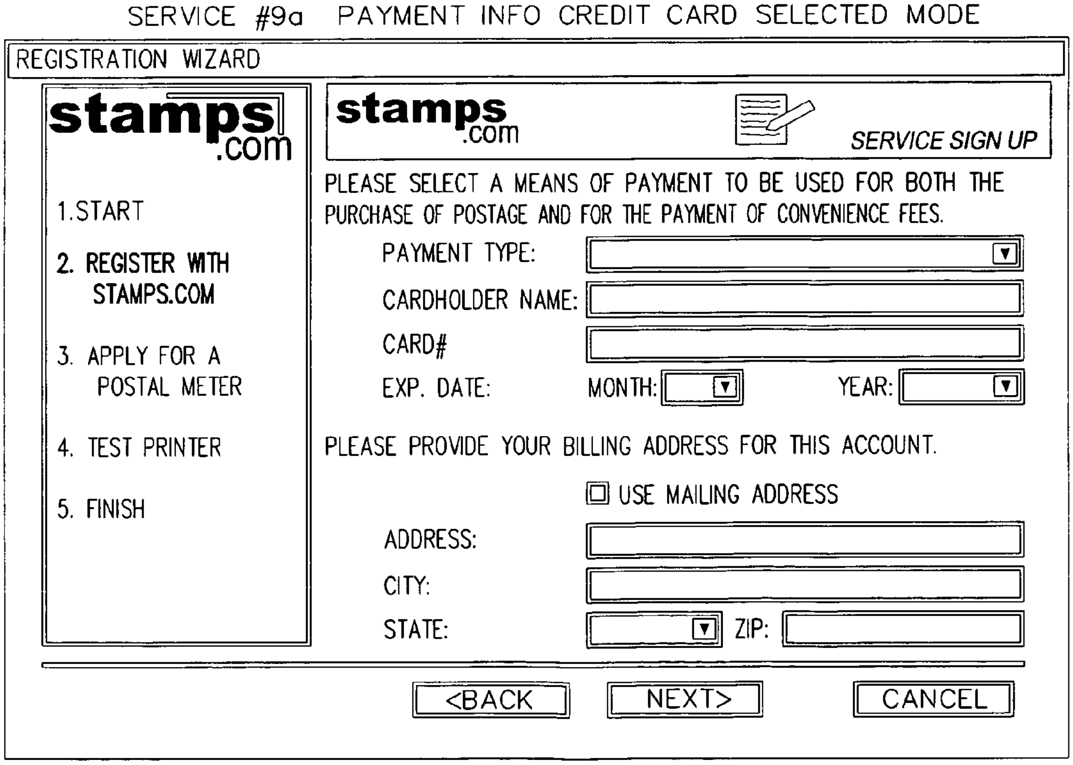

If a credit card is selected as the method of payment in decision block 750, the fields shown in the screen of FIG. 9L appear. The cardholder name and card number are both edit boxes. The expiration date is entered using two combo boxes. The prompt for the billing address allows the user to either enter an address manually, or copy the address given on service screen #2 as a mailing address. If the user selects the "Use Mailing Address" check box, the mailing address information is copied into the billing address fields, and these fields are disabled. All fields preferably should be filled in before the user can proceed. After the user selects "Next>", an AMS check on the address is performed, as shown in block 753.

Figure 9M:
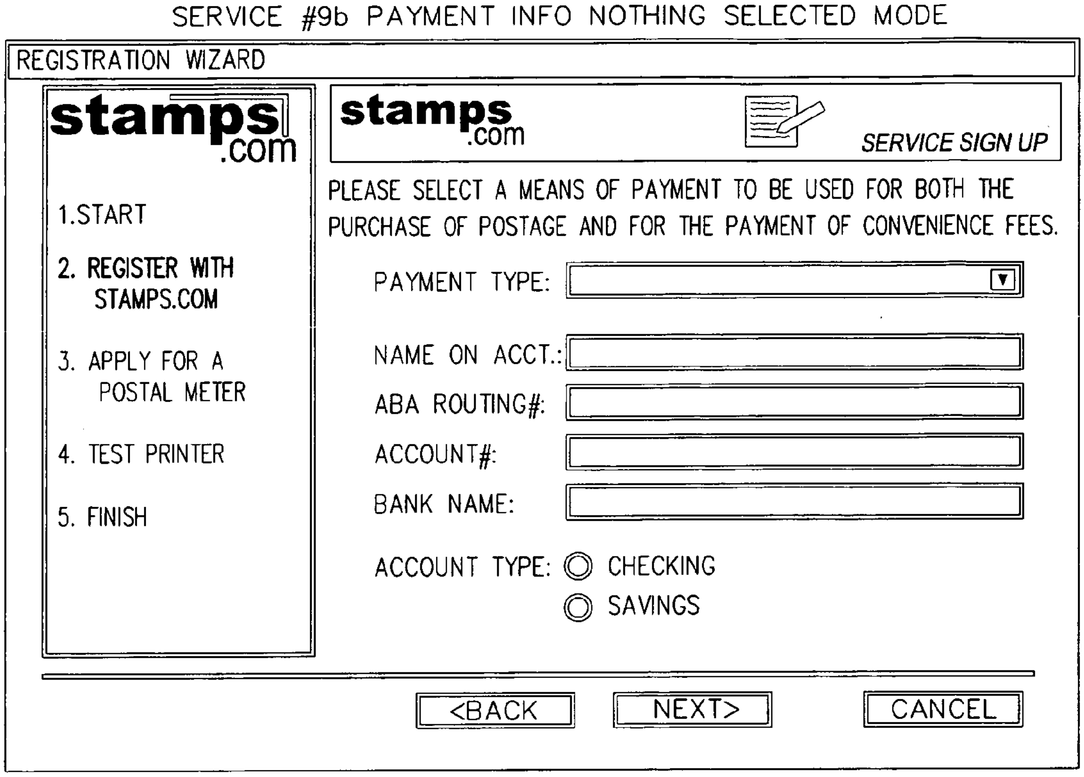
Figure 9N:
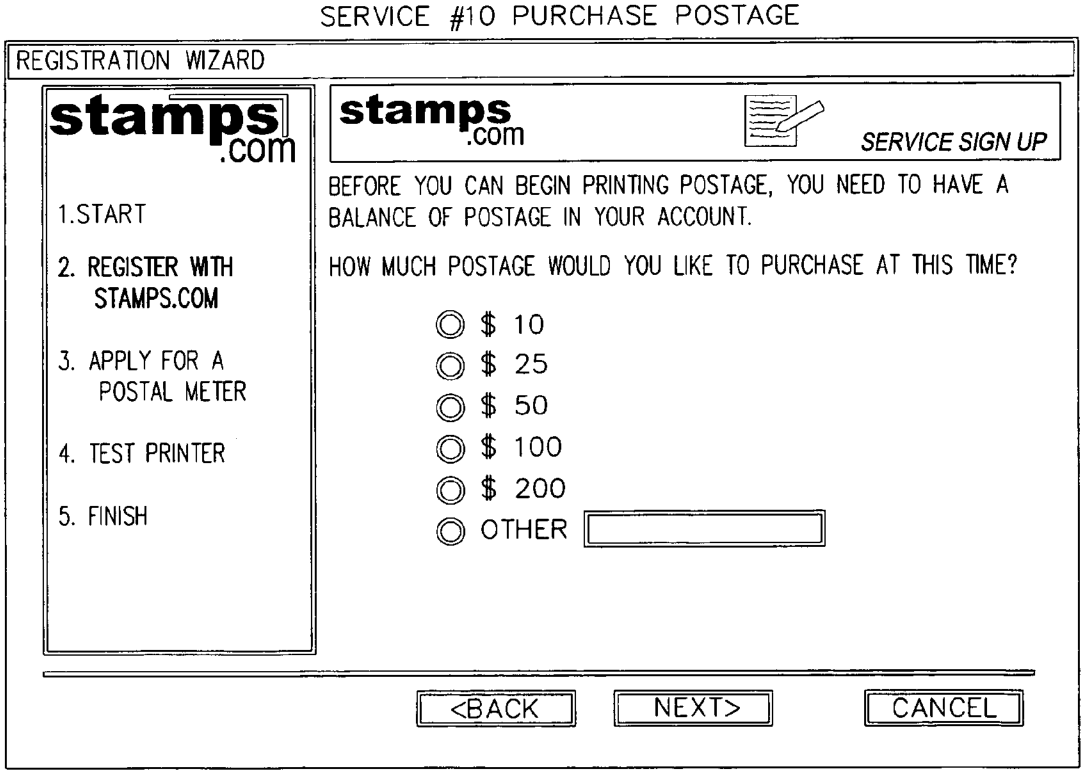

If ACH method of payment is selected in decision block 750, the fields shown in screen of FIG. 9M appear. All fields preferably should be filled in before the user can proceed. Service Screen #10, in block 756 or 757, allows the user to purchase postage. The order is accepted at this time, but is not processed until the meter license has gone through. At the beginning of the registration wizard, the maximum and minimum purchase amounts associated with a service plan are downloaded. As shown in FIG. 9N, the user can enter a purchase in one of two ways: by selecting a pre-defined amount or by entering an amount into an edit box. In one embodiment, the pre-defined values of the radio buttons are $10, $25, $50, $100, and $200. If any of these values are lower than the minimum purchase amount associated with the plan that the user has selected, then the associated radio button(s) is disabled. Similarly, if any of the pre-defined values are higher than the maximum purchase amount allowed by the plan that the user selected, then the associated radio button(s) is disabled. The Purchase Postage control allows the user to enter in both dollars and cents values. Preferably, none of the radio buttons are selected by default. If the selected plan offers free postage without requiring a purchase, the "Next>" button is always available. Otherwise, the "Next>" button is disabled until a purchase amount is selected. If the service plan selected by the user does not require the immediate purchase of postage, an additional radio button should appear which allows the user to select a value of "none."

Figure 10A:
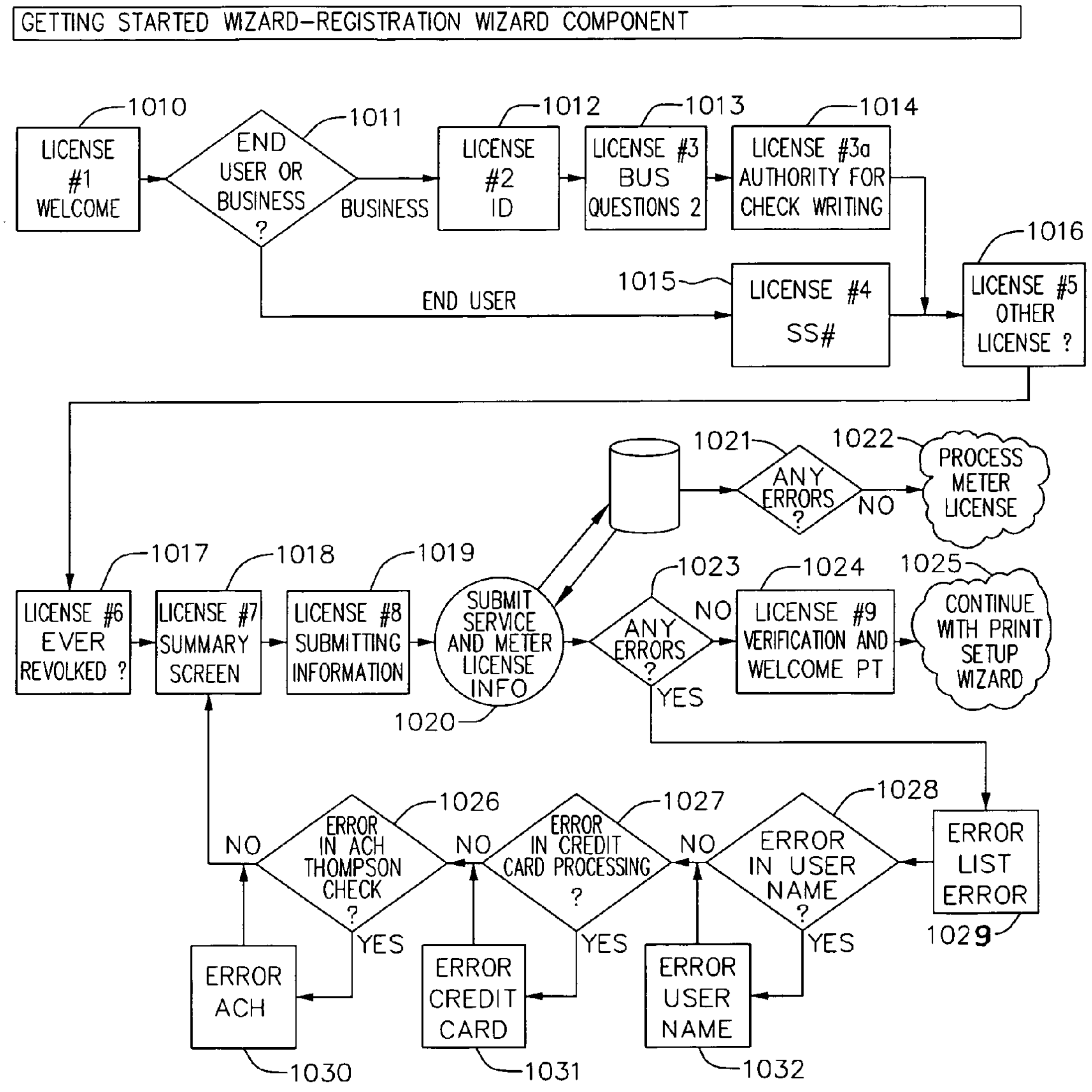
FIG. 10A is an exemplary process flow diagram for a registration wizard.
Figure 10B:
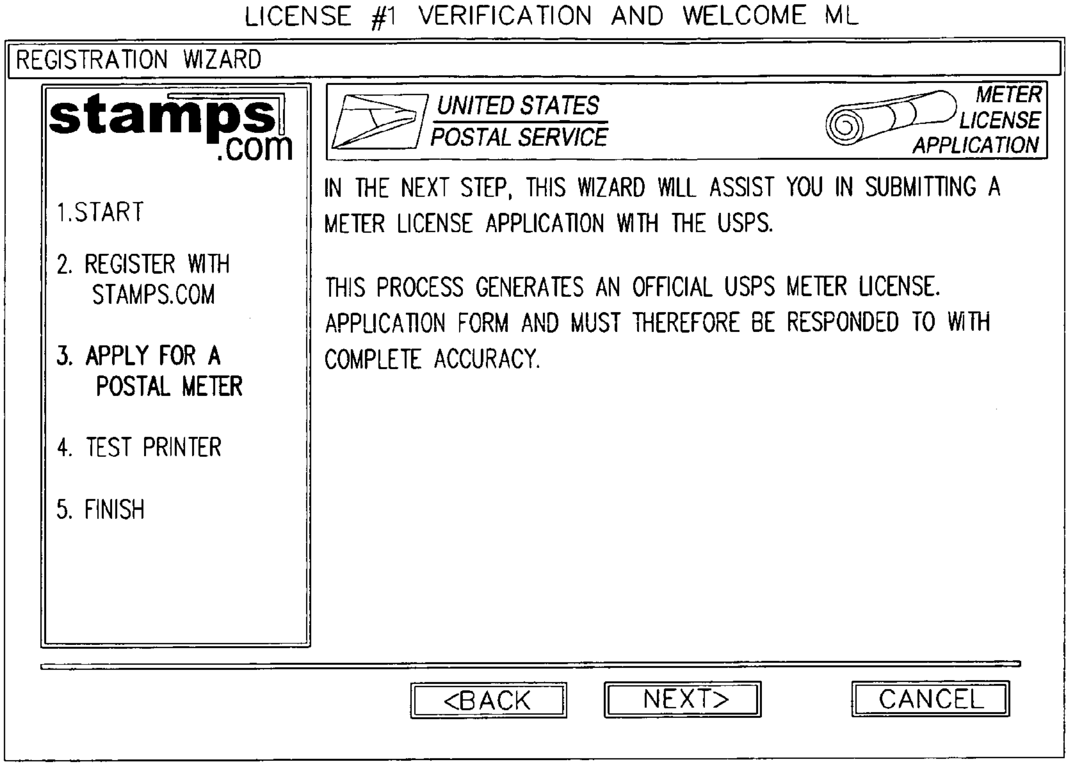
FIGS. 10B–10O are exemplary interfaces for a registration wizard.

As described above, the Registration Wizard is capable of gathering all of the information that is required by the USPS for a Meter License Application. The information that is extracted in this wizard is used to generate a USPS 3601A form. FIG. 10A is an exemplary flow of the Registration wizard component of the Getting Started wizard. When this portion of the Getting Started wizard has begun, the Follow the Yellow Brick Road text is changed to "Apply for a Postage Meter". In block 1010, License Screen #1 serves the purpose of letting the user know that he/she is entering the portion of the wizard where the meter license is filled out. The follow the Yellow Brick Road text will change to meter License application., as shown in FIG. 10B.

Figure 10C:
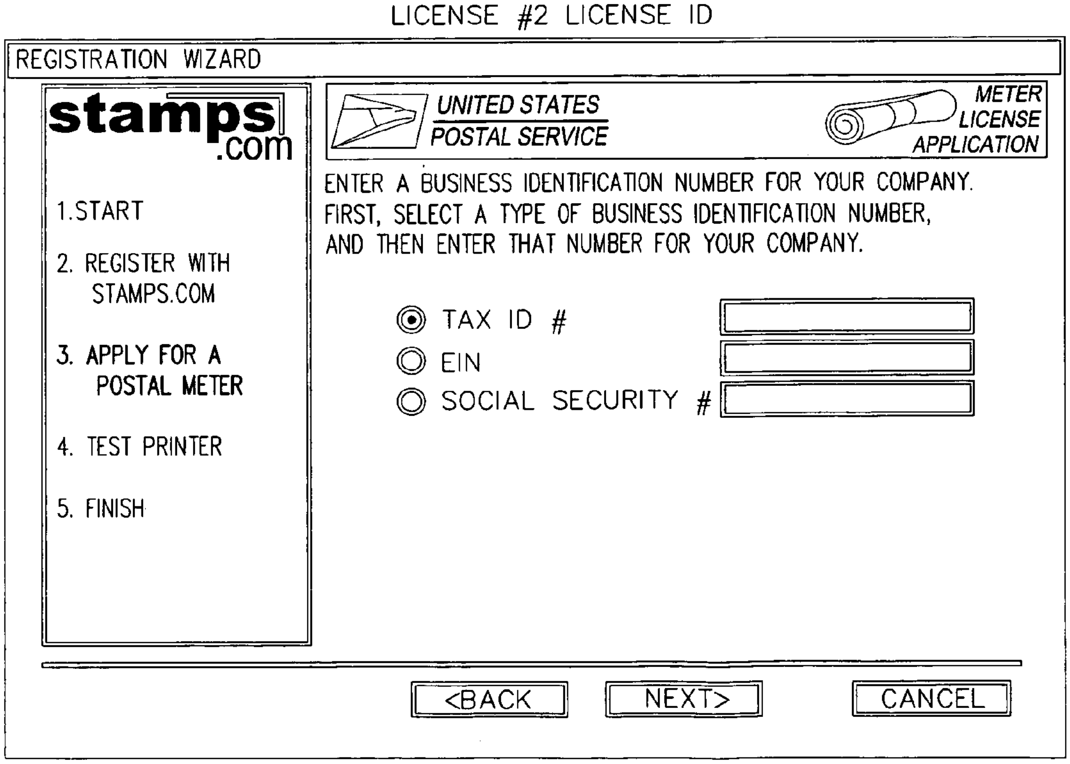
Figure 10D:
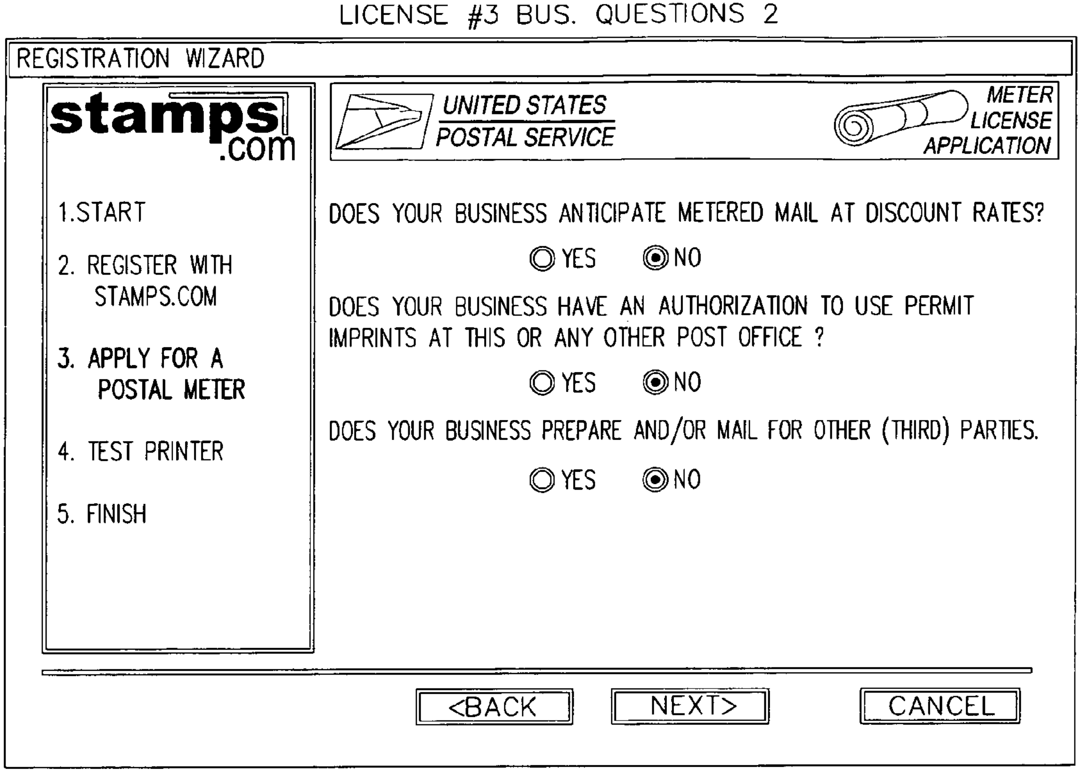

In block 1011, the user determines wether they are a business or and end user. In License Screen #2 (block 1012), the user specifies which identification number they wish to use. None of the radio buttons are selected on open, as shown in FIG. 10C. The "Next." button as well as the Tax ID#, EIN, and SSN fields are grayed-out and disabled. When the user selects a radio button, it enables the corresponding field. When the user begins to enter data in a field, it enables the "Next>" button. License Screen #3 (block 1013) is for the user to answer some business related questions, as depicted in FIG. 10D. The "Next>" button is not enabled until the questions are answered.

Figure 10E:
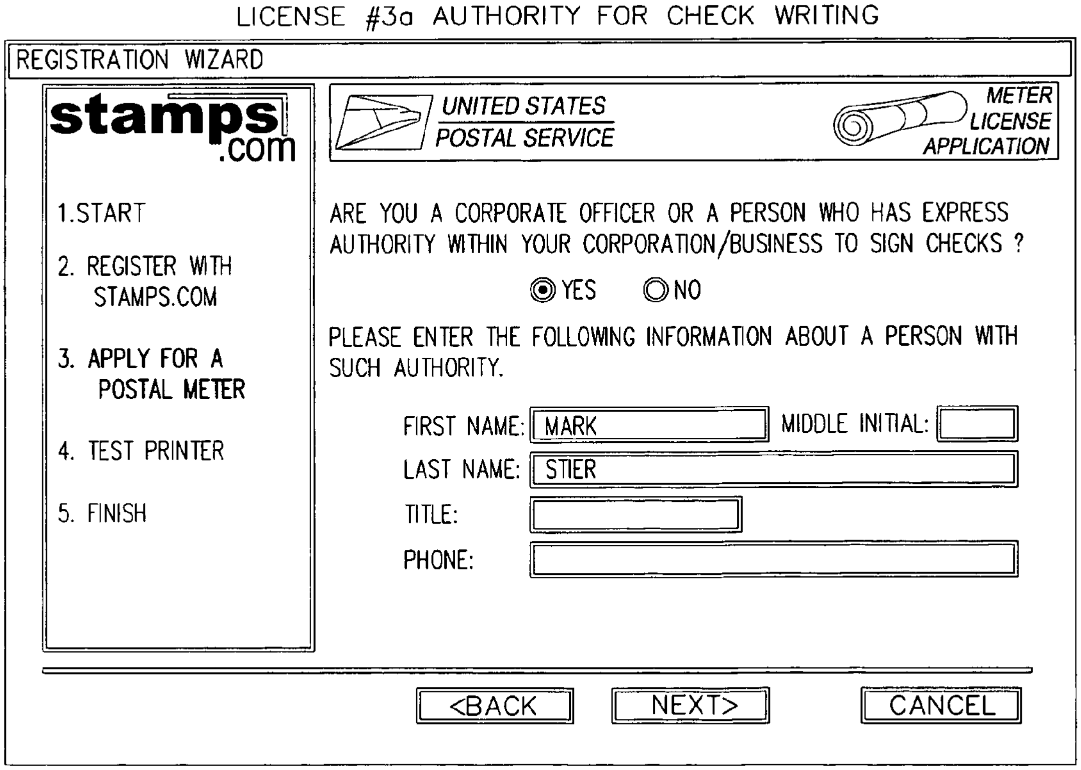
Figure 10F:
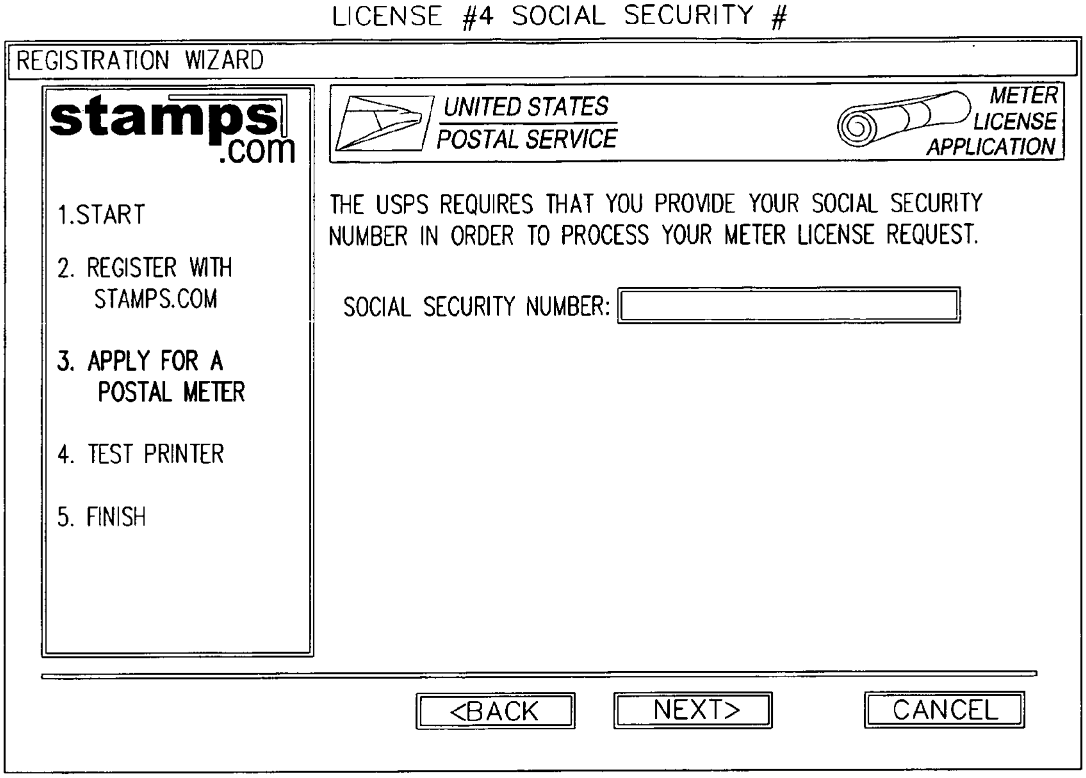
Figure 10G:
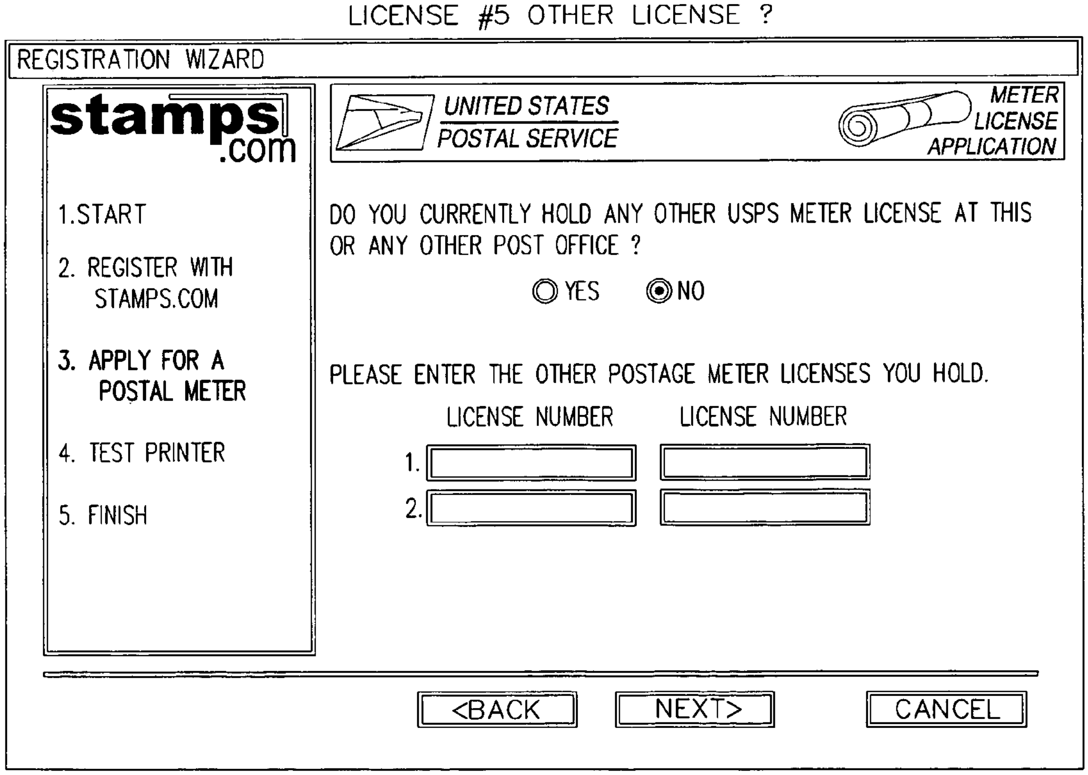

License Screen #**3*a* (block 101*a*) only appears to business users. As illustrated in FIG. 10E, neither of the radio buttons are selected by default, and the edit fields and the Next button are preferably unavailable when the user first sees this screen. If the user selects "Yes", the Next button becomes available. If the user selects "No", the edit fields become available. Once all of the required fields have been completed, the Next button becomes available. License Screen #4 (block 1015) of FIG. 10F includes a field in which the user enters a Social Security #. The "Next>" button is not enabled until the field is filled in with a nine digit number. In License Screen #5 (block 1016) of FIG. 10**G, neither radio button is selected by default. The "Next>" button is initially disabled. If the user selects the "No" radio button, the "Next>" button becomes available. If the user selects the "Yes" radio button, the "Next>" button is not enabled until at least one set of license and finance numbers have been entered.

Figure 10H:
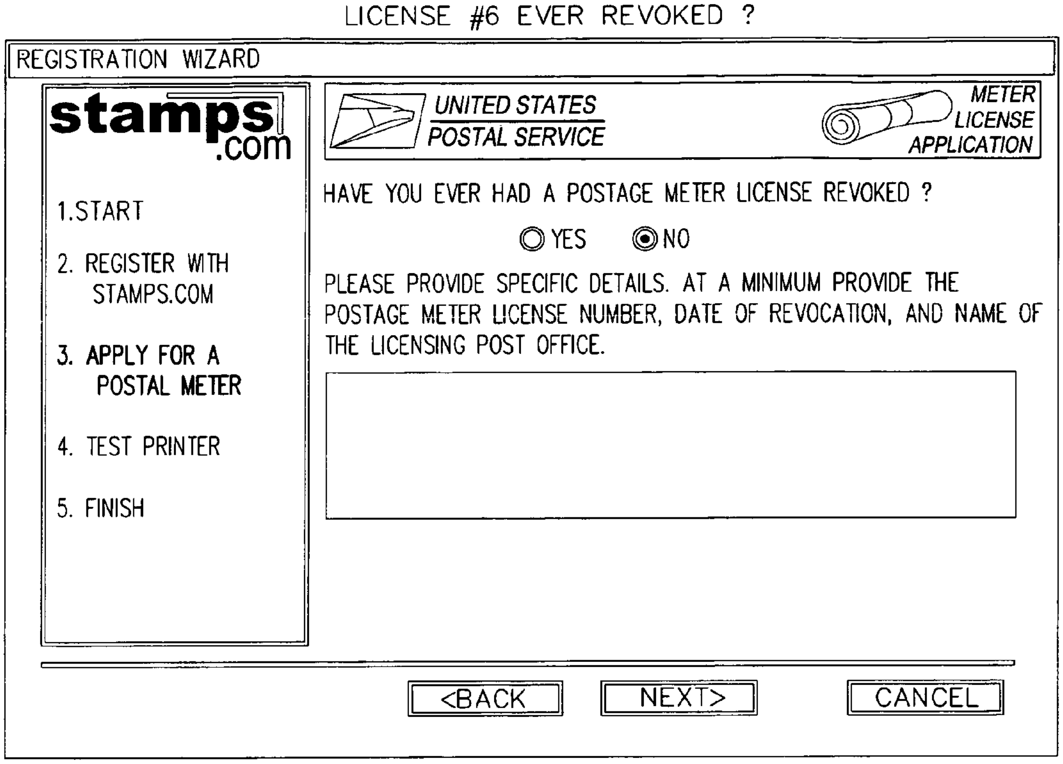
Figure 10I:
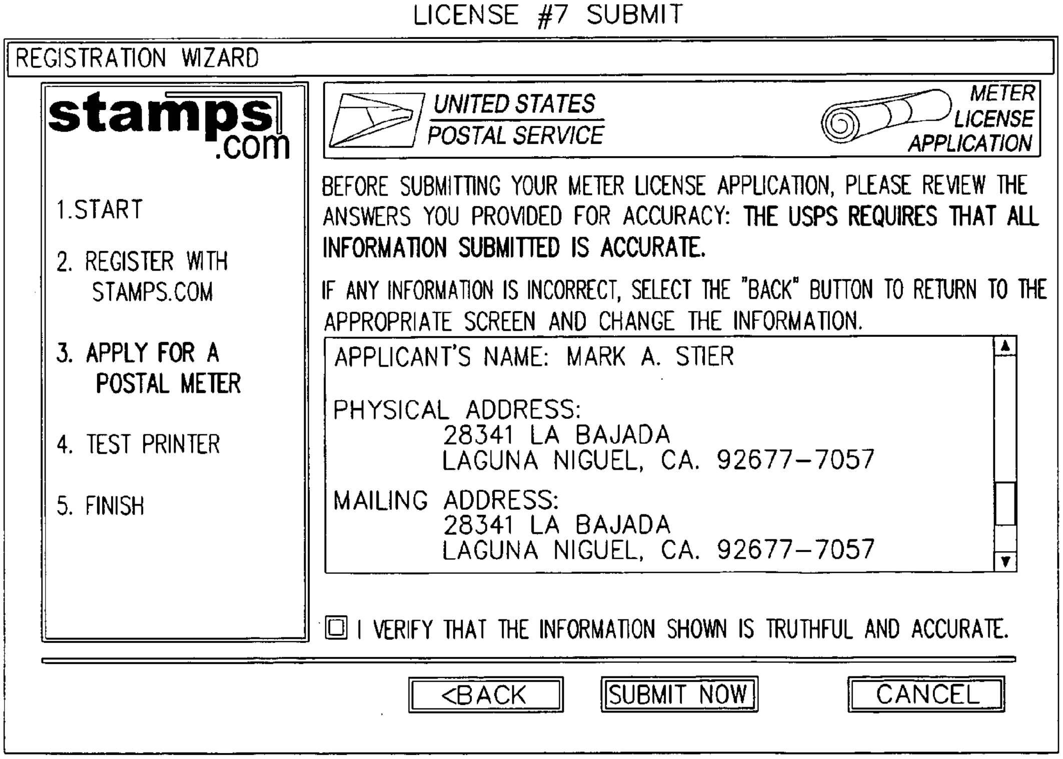

FIG. 10H is an exemplary interface for License Screen #6 of block 1017. In this screen, neither radio button is enabled by default. The "Next>" button is enabled if the user selects the "No" radio button or once the revoked reason field is populated if the user selects the "Yes" button. FIG. 10I is an exemplary interface for License Screen #7 of block 1018. In this screen, a check box is used to verify the accuracy of the information. Once the check box is selected, the "Next>" button is enabled and the information is submitted to the server. If the user does not select the checkbox, the only options are to go back and make changes or cancel the Getting Started wizard. In addition to the information that was gathered during the wizard, the following information need also be submitted; OEM #, Tracking #, 3$^{rd}$ Party Applications installed, and the Address Books that were installed.

Figure 10J:
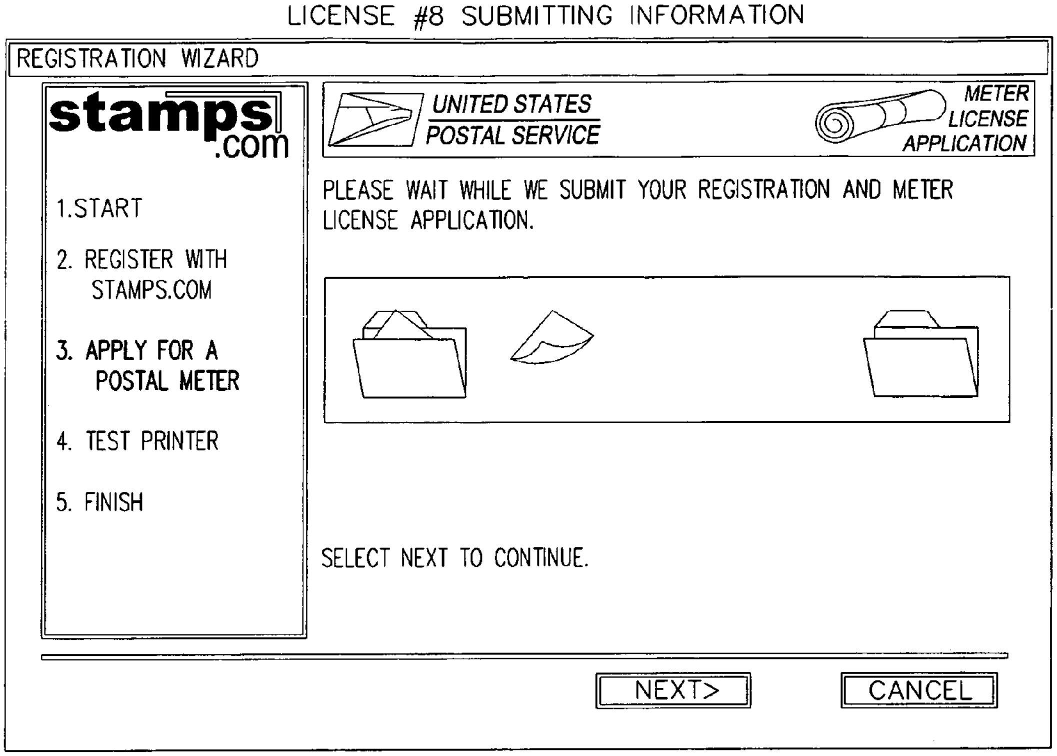
Figure 10K:
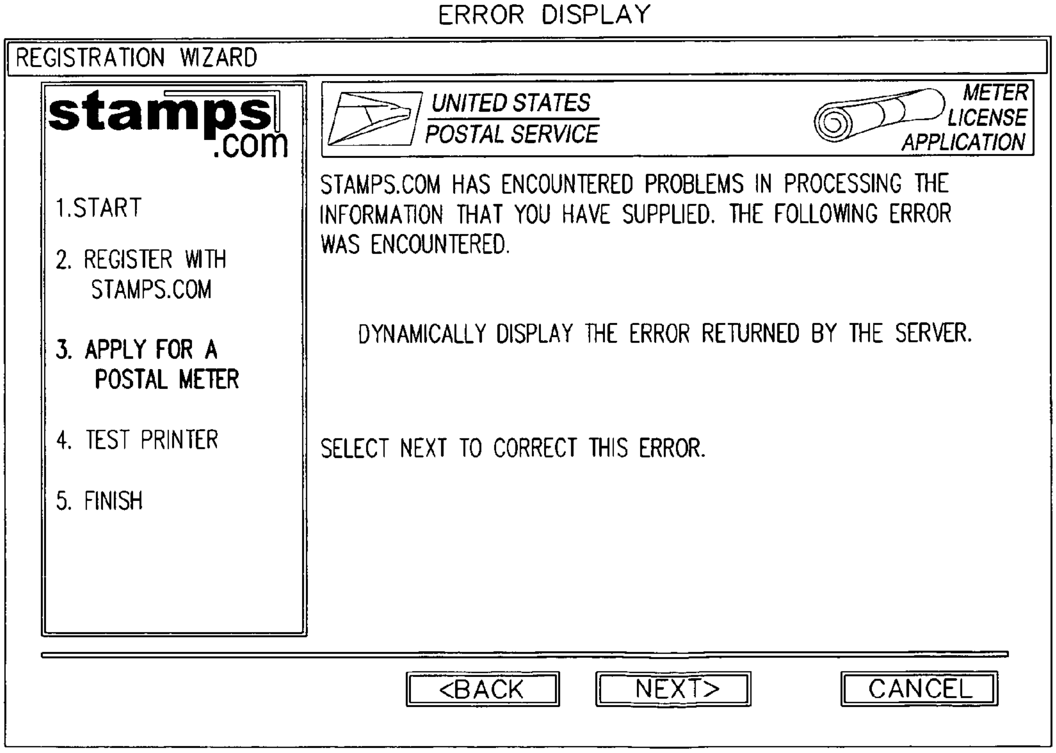

An exemplary interface for License Screen #8 (block 1019) is illustrated in FIG. 10J. This screen serves the purpose of providing a status to the user while all of the information that has been provided in the wizard, including payment information, is uploaded. In addition to uploading the information that has been extracted as part of the Getting Started wizard, the OEM tracking ID is uploaded as well. For OEM partners, the ID is in a registry key. Initially, the "Next>" button on this screen is disabled, and only the text in the upper portion of the screen appears. Once the communication with the server is completed, the text "Select Next to continue" appears, and the "Next>" button becomes available.

In blocks 1021 and 1023, the information entered by the user is checked for any potential errors and the errors are reported to the user. Once the information has been submitted, the server is able to communicate if any of three errors occur with the information that the user has provided. These errors include a non unique user name, bad ACH information, and rejected credit card payment. If any of these errors occur, a wizard screen appears that dynamically displays the error that is returned from the server. When the user selects "Next>", the appropriate wizard screen shown in FIG. 10K appears and allows the user to resubmit information. Preferably, the User cannot continue until the error is corrected. After correcting the error, the wizard returns to the submit screen. If an additional error is found, this routine is repeated.

Figure 10L:
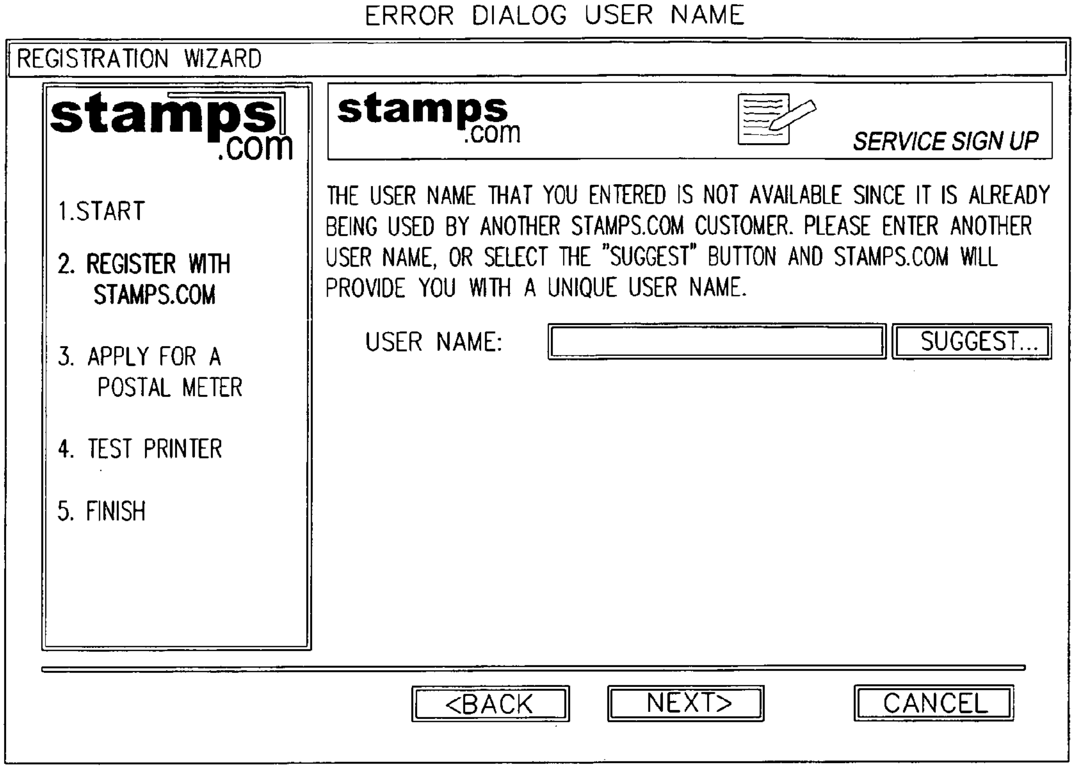
Figure 10M:
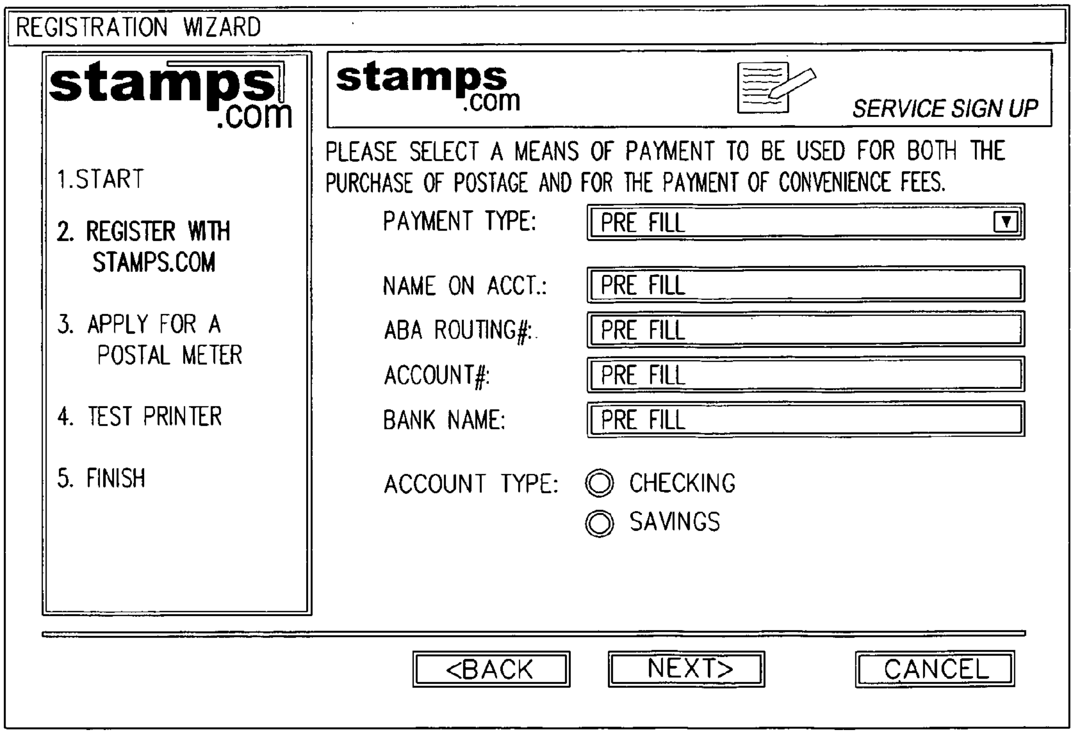

In block 1028, if the user submits a non unique user name, the dialog box of FIG. 10L appears. This dialog box preferably has the same functionality of the user name wizard screen, except that the lower portion (the password portion) is not displayed, the suggest button appears, and the text changes as shown. If the user selects the Suggest button, the client populates the user name field with the suggestion that is sent down from the server. In block 1026, if the ACH check indicates that there is a problem with the ACH information, the dialog box depicted in FIG. 10M appears. This dialog is preferably the same as the select payment screen of the wizard, with one exception; the Payment Type is pre-filled with the selection "ACH" and as a result the ACH fields will be available. These fields are preferably pre-populated.

Figure 10N:
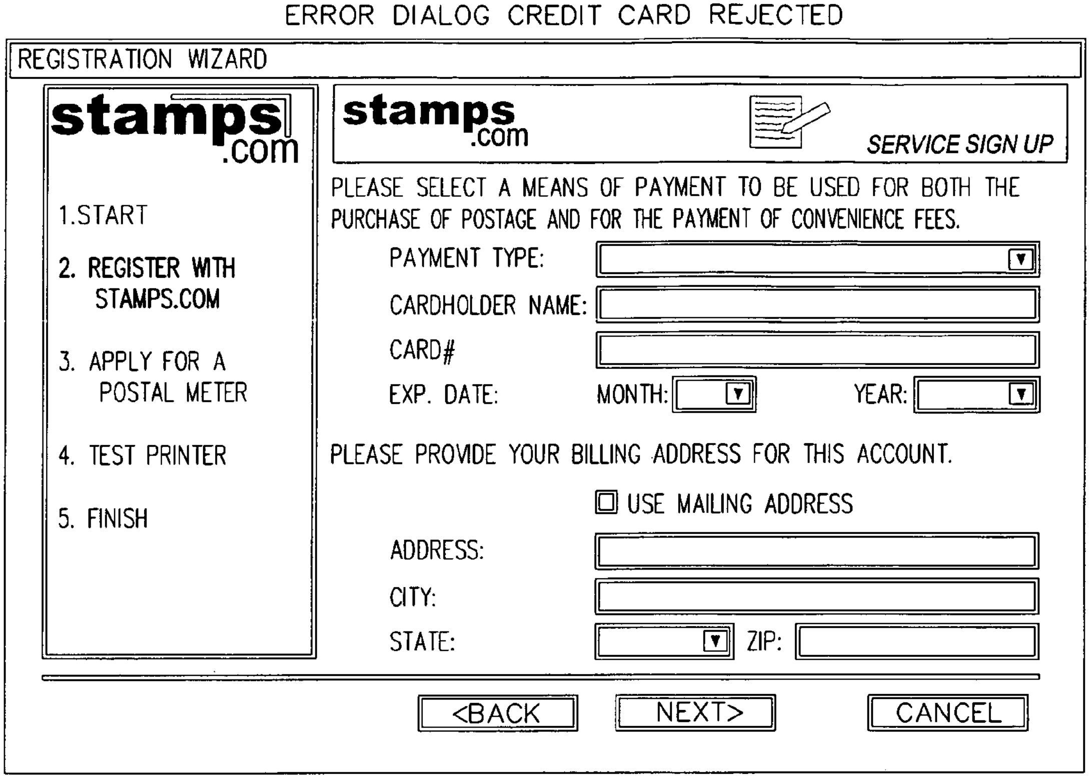
Figure 10O:
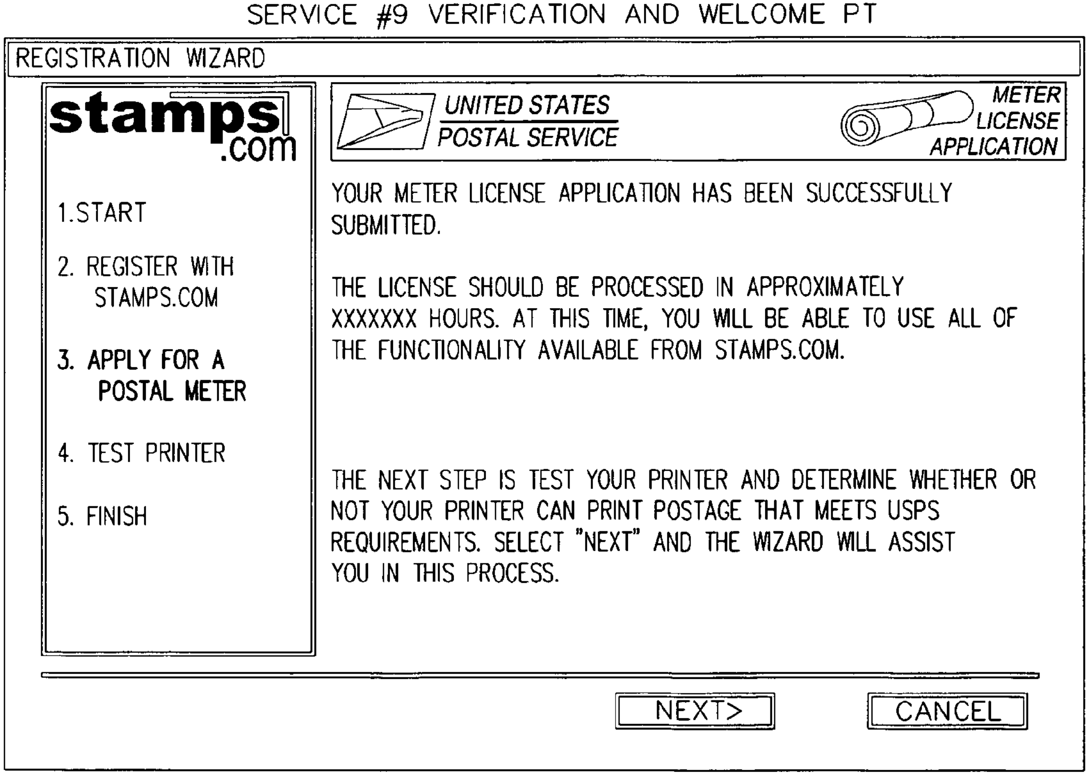

In block 1027, if a reject on a credit card process is received, the dialog box shown in FIG. 10N appears. This dialog is preferably the same as the select payment screen of the wizard, however, the Payment Type is pre-filled with the original credit card selection, with all of the associated fields pre-filled. In block 1024, the License Screen # 9, illustrated in FIG. 100, serves the purpose of letting the user know that the meter license portion has been completed, and that the Print Configuration will be next. In addition, this screen dynamically lets the user know what the expected wait time is in the second paragraph based upon a "license approval delay variable" that is downloaded from the server. If the license approval delay variable is "0" (i.e. instant approval) then the second paragraph is not displayed. If the license approval delay has a value other than 0, the second paragraph is displayed and dynamically inputs the delay amount as shown below. The variable number that is provided by the server is in hours. Once this verification is completed the user may proceed to Print Setup wizard, as shown in block 1025.

Figure 11A:
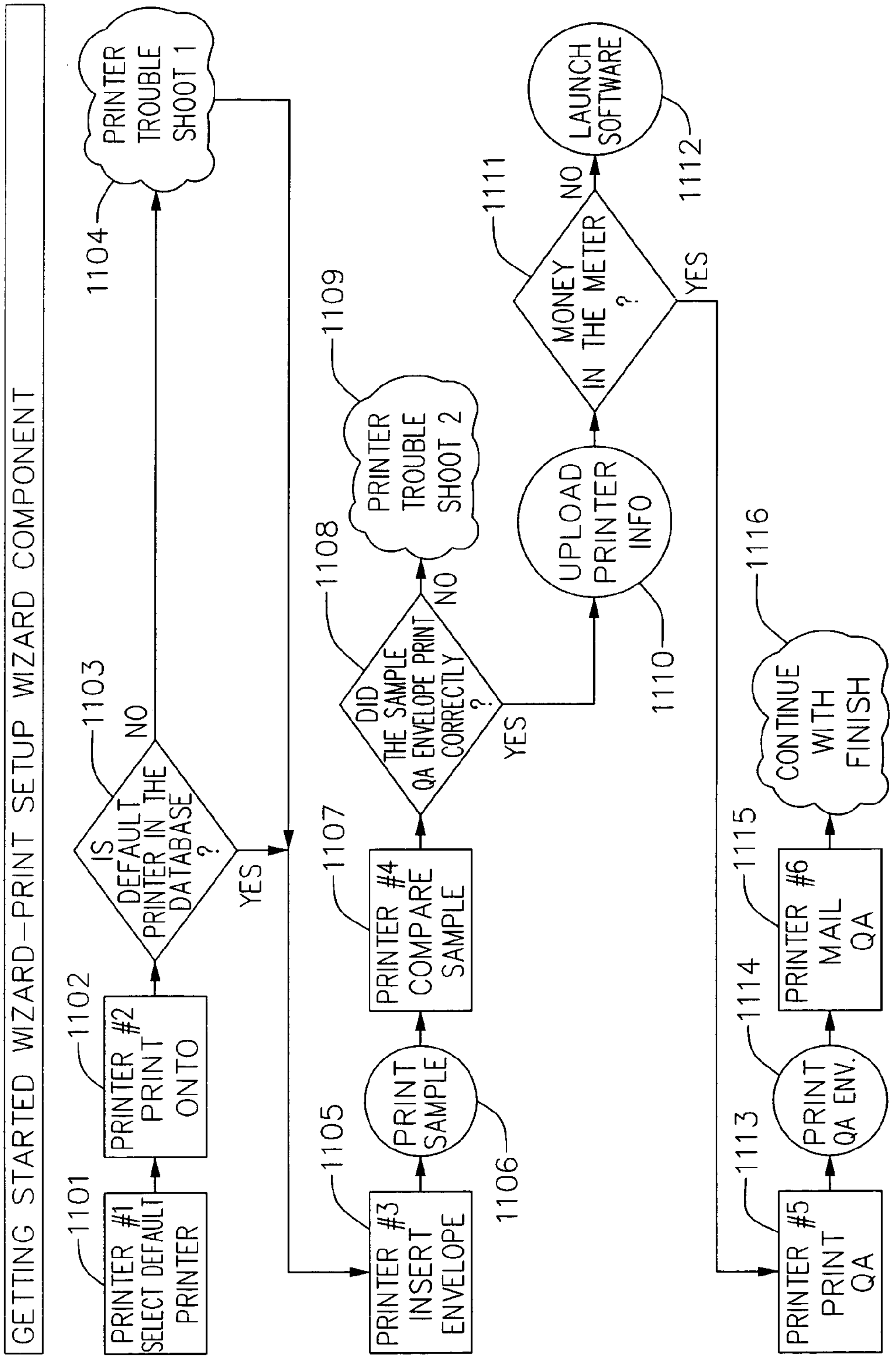
FIGS. 11A–11B are exemplary process flow diagrams for a print wizard.

The Print Setup portion of the Getting Started wizard includes several wizard components, which can be broken out and used individually in the client software. These wizards are brought together into the Print Setup portion of the Getting Started wizard to provide all of the printing oriented checks and tasks that a user should complete before starting with the software. These include: Print Verification, Print QA envelope, and Determine top, center, or bottom envelope feed (if necessary). When this portion of the Getting Started wizard has begun, the Follow the Yellow Brick Road text is changed to "Test Printer". An exemplary flow of the Print Setup component is shown in FIG. 11A.

In block 1101, Print Setup Screen #1 is used to select default printer. This screen, shown in FIG. 11C, prepares the user for testing on the user's printer. A drop down box displays all of the printers that are installed on the user's system, and allows them to select the default printer to be used. When a user selects a printer, this printer is considered as being selected for the print jobs that are performed during this section of the wizard. In addition, this default selection is incorporated into the standard Print Prepare dialog box, and is therefore the printer chosen until the user selects otherwise. None of the printers is selected by default, and the "Next>" button preferably is not available until the user selects a printer.

Figure 11B:
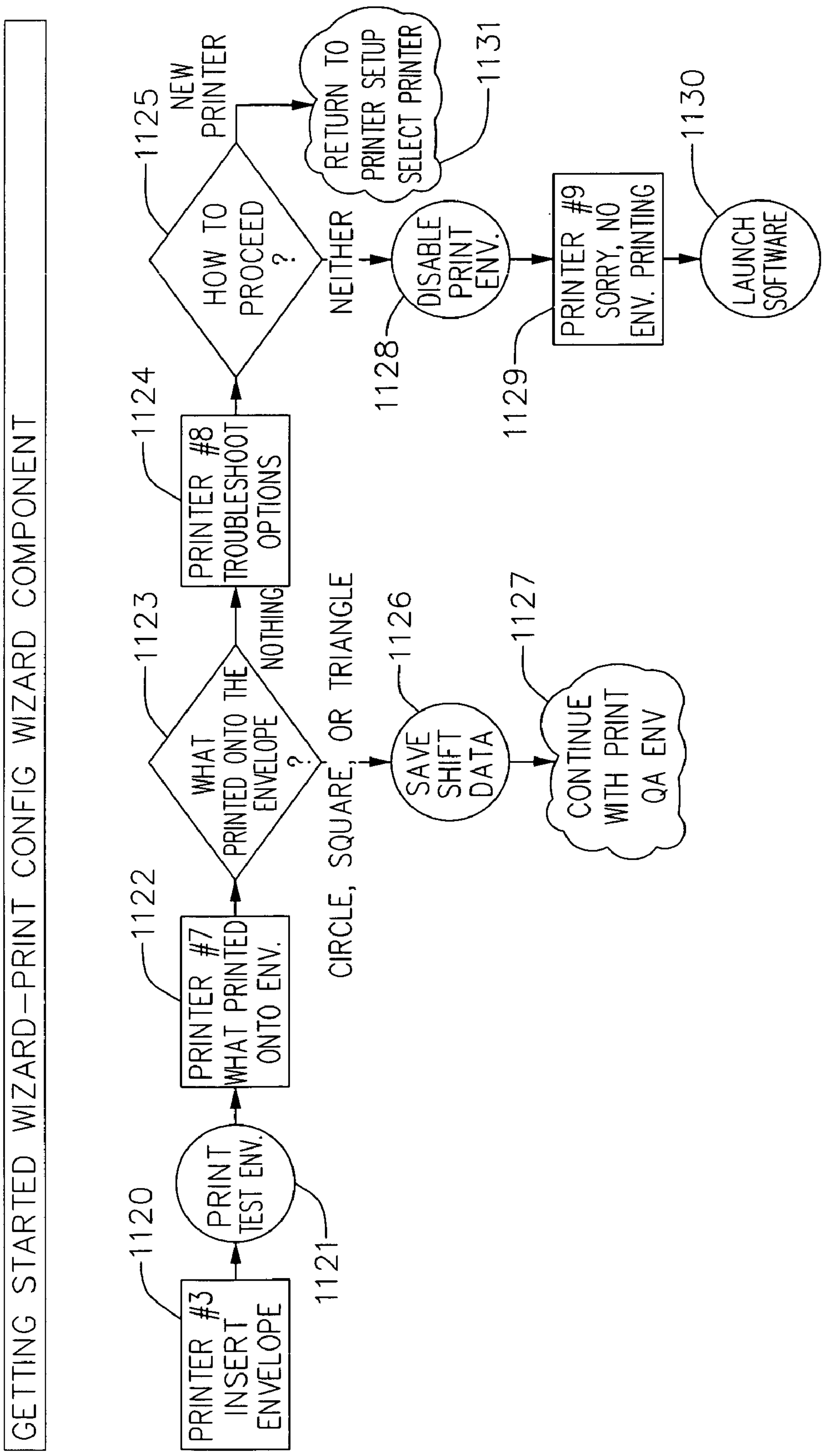
Figure 11C:
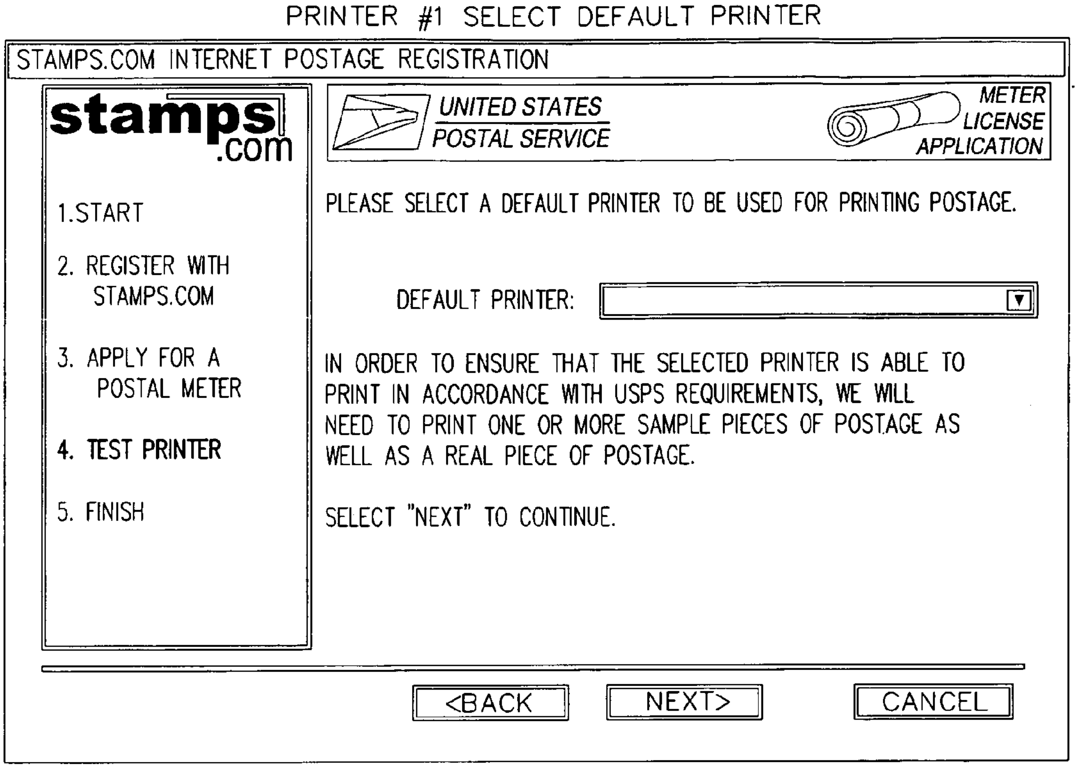
FIGS. 11C–11L are exemplary interfaces for a printing wizard.
Figure 11D:
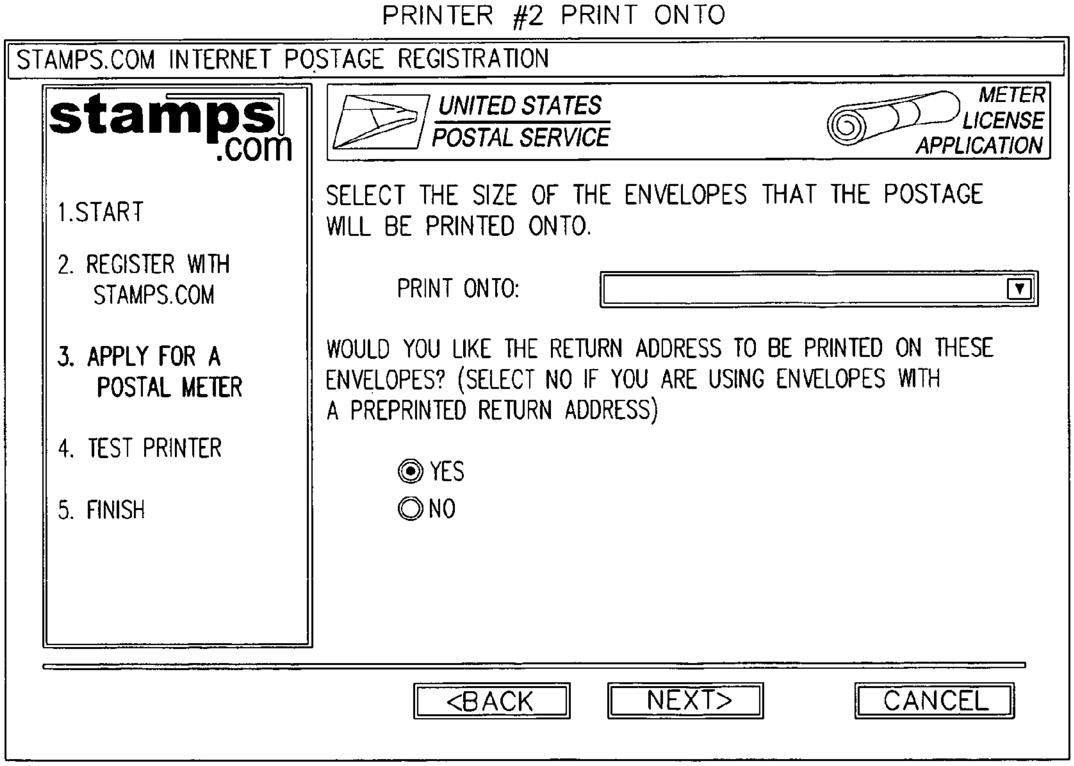

In block 1102, Print Setup Screen #2, shown in FIG. 11D, allows the user to select two bits of information that are required before the print testing functions can be undertaken. The first is a drop down box, which allows users to select a envelope size to be used throughout the tests. These tests do not allow a user to use labels, so only the envelope options appear. The second bit of information is whether or not the user wants to omit the return address or not. The user prompt is preferably different here than in the Print Options dialog. In this case, if the user selects, "yes", the return address is printed. If the user selects "no", the return address should not be printed. The answers to both of these items are stored and used for all testing undertaken within this portion of the wizard. The information that is gathered here is also used to populate the corresponding fields within the Print Postage and Print Options dialog boxes when the user first launched these screens. Neither the envelope sizes, nor the radio buttons contain values by default. Furthermore, the "Next>" button is preferably not available until the user selects an envelope size and answers the yes/no question.

Figure 11E:
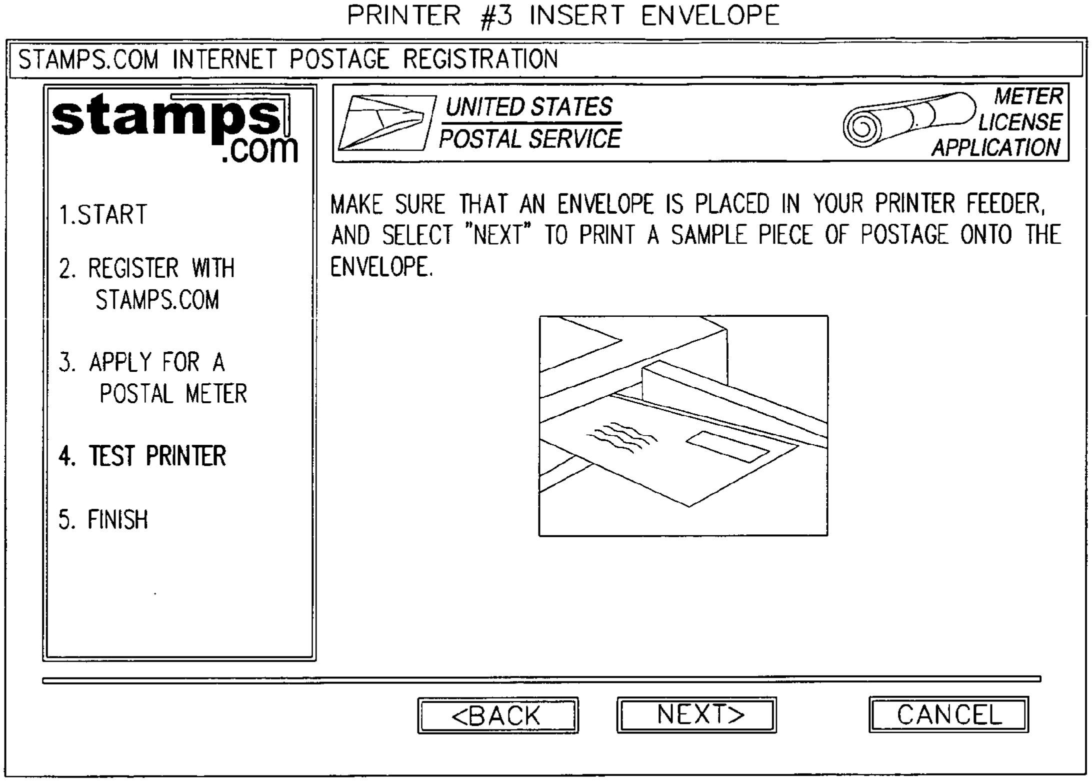
Figure 11F:
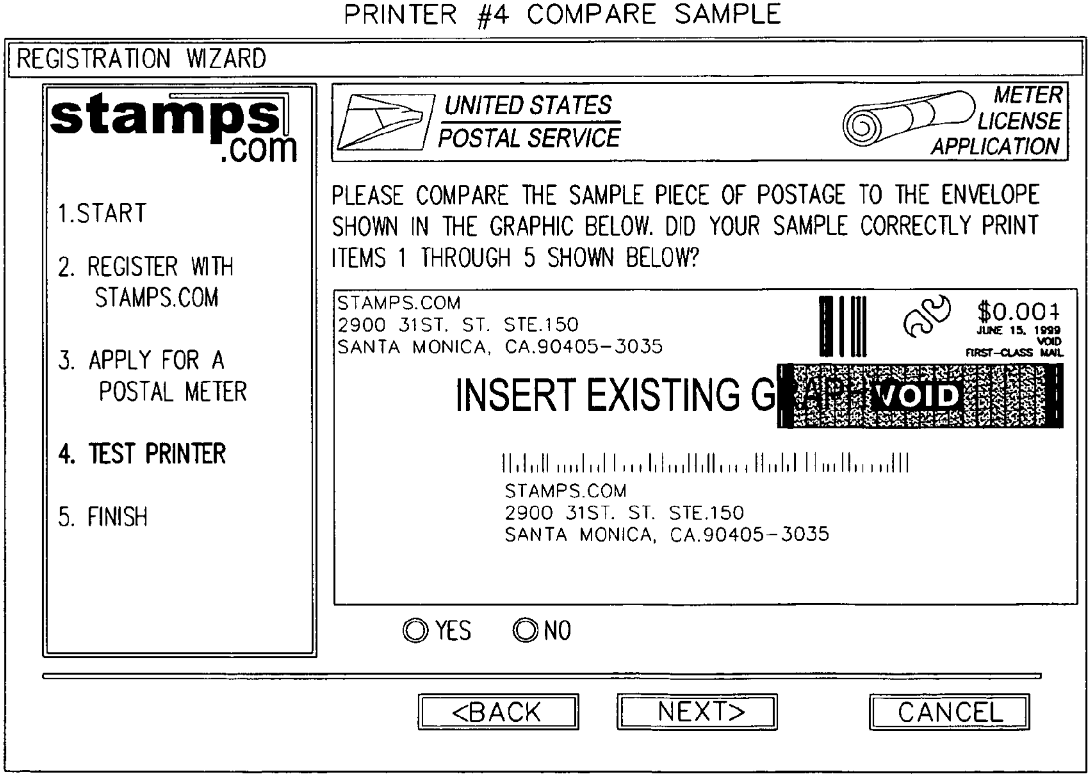

In block 1103, it is determined wether the default printer information is in the printer database. If the printer information is not in the database, a printer troubleshooting routine is performed, as shown in block 1104. If the printer information is in the database, printer Screen #3, depicted in FIG. 11E, appears. This screen serves the function of notifying the user that postage is about to be printed, and making the user aware that an envelope must be loaded into the feeder. A graphic of an envelope being placed into a printer is preferably used to help re-enforce the action to the user. This screen is used multiple times during the Printer Setup portion of the Getting Started wizard. See the flow diagram for further details. The "Next>" button is available immediately. Once the "Next>" button has been selected, a sample QA envelope is printed, as shown in block 1106. In block 1107, the sample is compared with a sample shown in Printer Screen #4 of FIG. 11F. In this screen, neither of the radio buttons is selected by default, and the "Next>" button is not available until the user selects one. In block 1108, if the samples do not compare, printer troubleshoot 2 is activated to perform the troubleshooting task, as illustrated in block 1109. If the samples compare correctly, the printer information is uploaded and the money in the meter is checked, as shown in blocks 1110 and 1111 respectively.

Figure 11G:
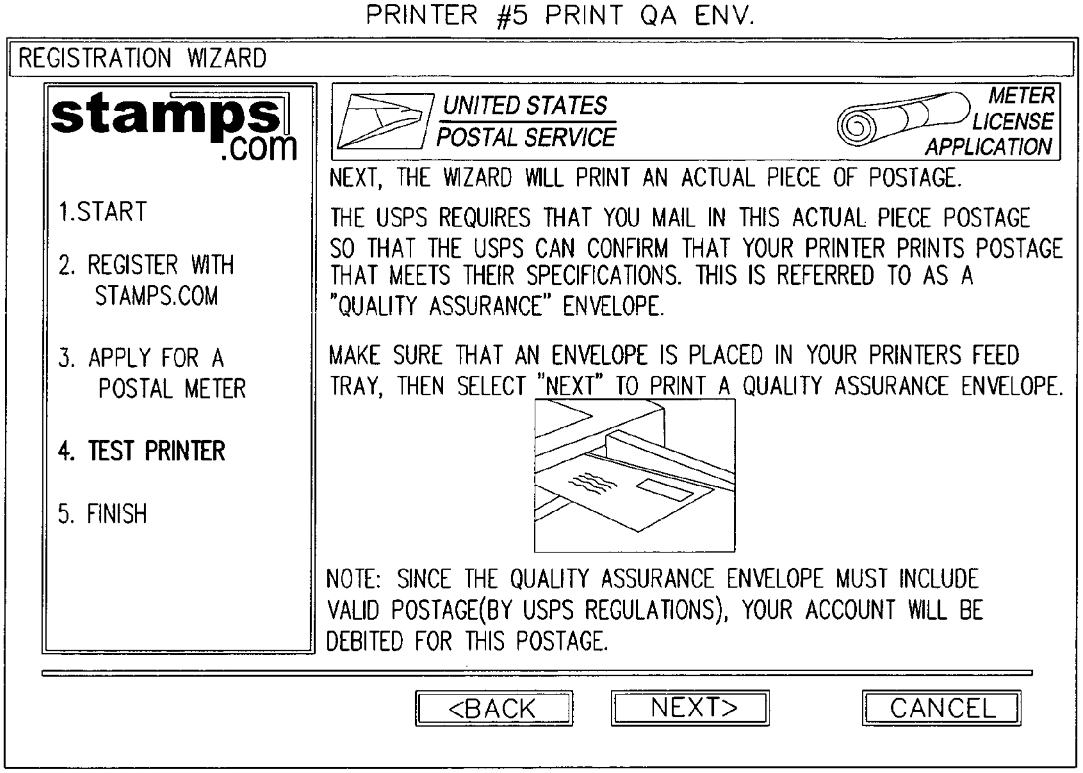

Similar to Printer Screen #3, Printer Screen #4 serves the function of educating the user about QA envelopes, notifying the user that postage is about to be printed, and making the user aware that an envelope needs to be loaded into the feeder. A graphic of an envelope being placed into a printer is used to help re-enforce the action to the user. This section of the wizard, illustrated in FIG. 11G, only appears if there is money in the user's meter (this requires instant meter approval), as shown in blocks 1111 and 1112. The "Next>" button is available immediately. Once the "Next>" button has been selected, a QA envelope is printed in block 1114.

Figure 11H:
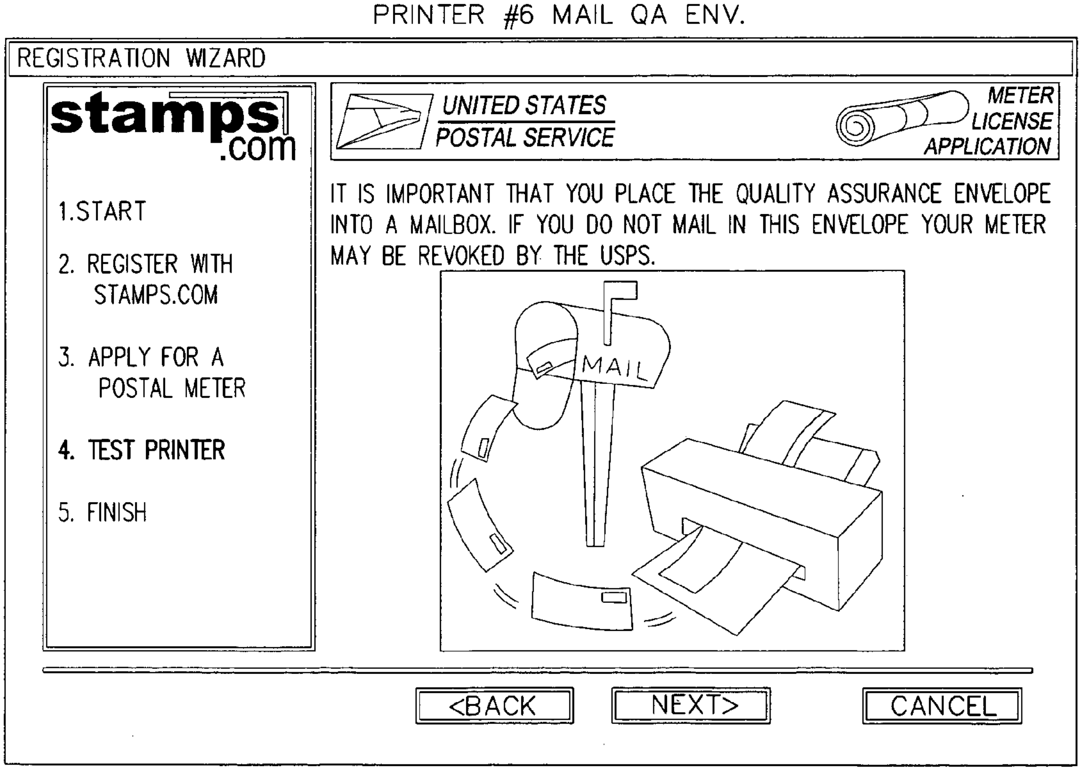

Next, in block 1115, Printer Screen #6, shown in FIG. 11H, appears. This screen's primary function is to educate the user that the QA envelope should be sent in immediately, or the user's meter license may be revoked. A graphic of an envelope being placed into a mail box is used to help re-enforce the action to the user. The "Next>" button is available immediately.

Figure 11I:
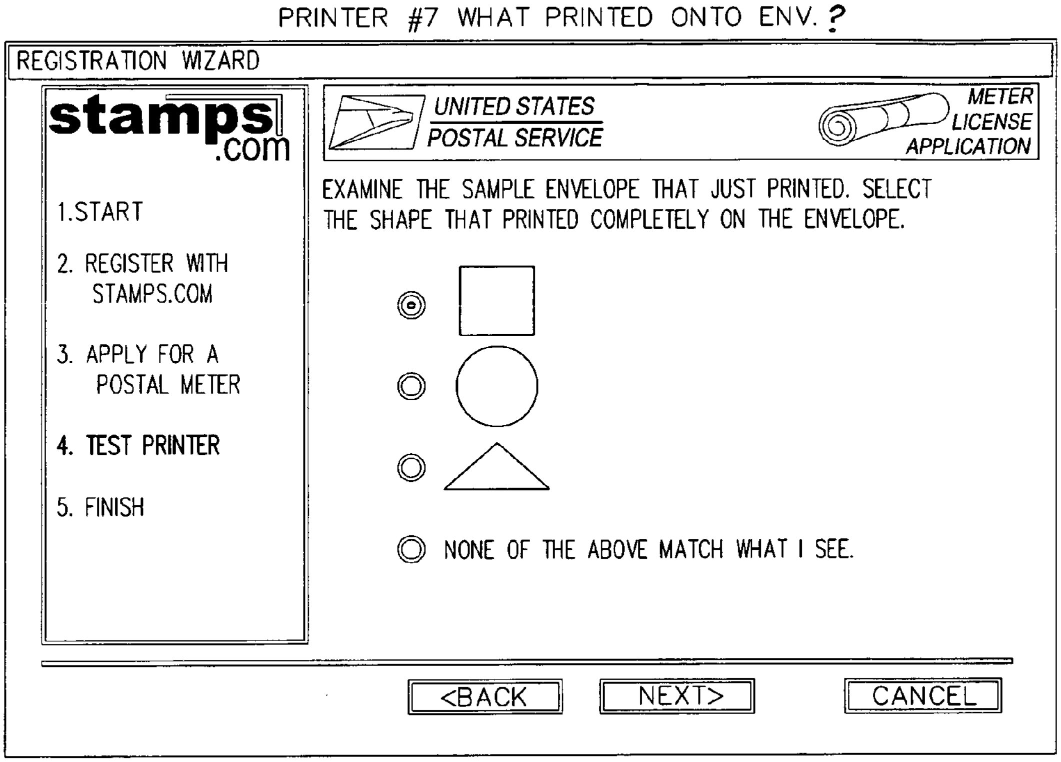

In the event that the user's printer is not in the printer database, the Print Configuration wizard is initiated. An exemplary flow for the Print Configuration wizard is shown in FIG. 11B. The first screen in this wizard is Printer Setup screen #3 (see FIG. 1E), which prompts the user to place an envelope in the printer feed tray. Once the user selects "Next>", a pattern including a circle, a square, and a triangle is printed. Only one of these shapes completely prints onto the envelope fed through the printer, so based upon which shape appears to the user, the system can ascertain if the printer feeds envelopes from the top, center, or bottom. The Printer Screen #7, shown in FIG. 11I, provides a means by which users can tell the client which of the shapes appear on the envelope. This is done through a series of radio buttons. None of the radio buttons is selected by default, and the "Next>" button is not available until the user selects one of the options. If the user selects either the circle, square, or triangle, the appropriate offset is made, the information is sent to the server, and the user continues with screen #8 as shown in block 1126 and 1127.

Figure 11J:
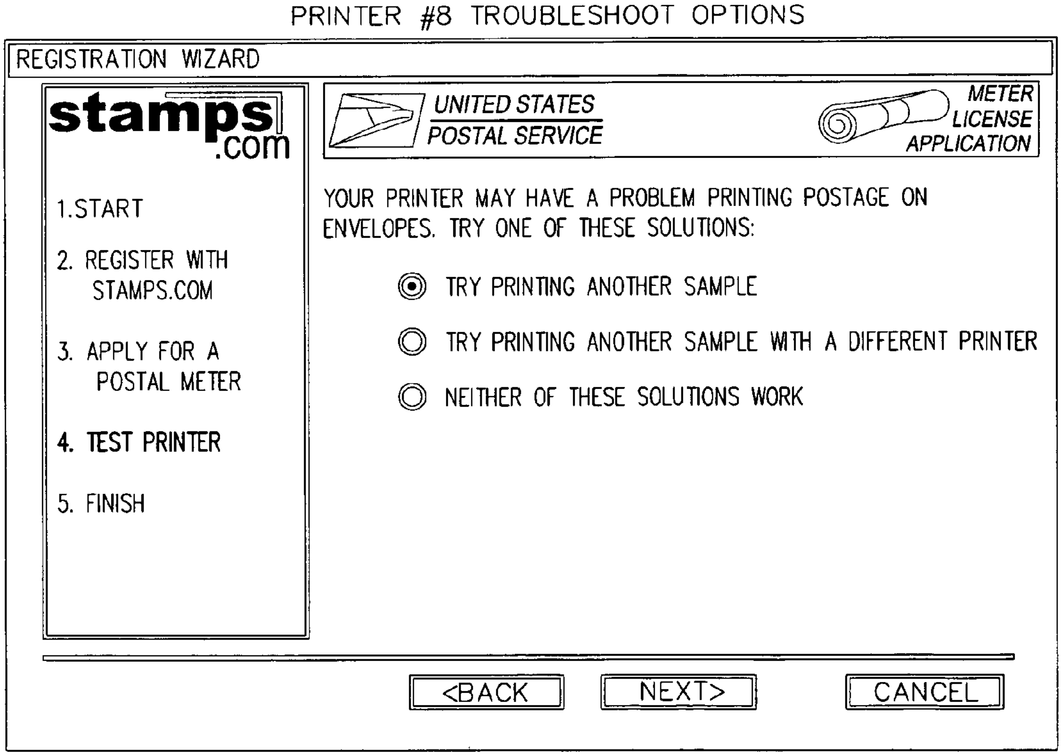

In block 1123, if the user selects "none of the above match what I see" on screen # 7, Printer Screen #8, shown in FIG. 11J, appears to ask the user which option the user would like to pursue at this time. Three radio buttons provide the options. If the user selects the Try printing another sample option, another shape design is sent to the printer, so that the comparison process can be undertaken again. Selecting the Try printing another sample to a different printer option links the user back to screen #1 of the Print Setup, allowing the user to select another printer and start the process again. Selecting the Neither of these solutions work option indicates that the system cannot determine a feed offset and therefore cannot print envelopes using the user's printer. When "Next>" is selected, the message on screen #9 conveys this to the user. None of the radio buttons is selected by default, and the "Next>" button is not available until the user selects one of the options.

Figure 11K:
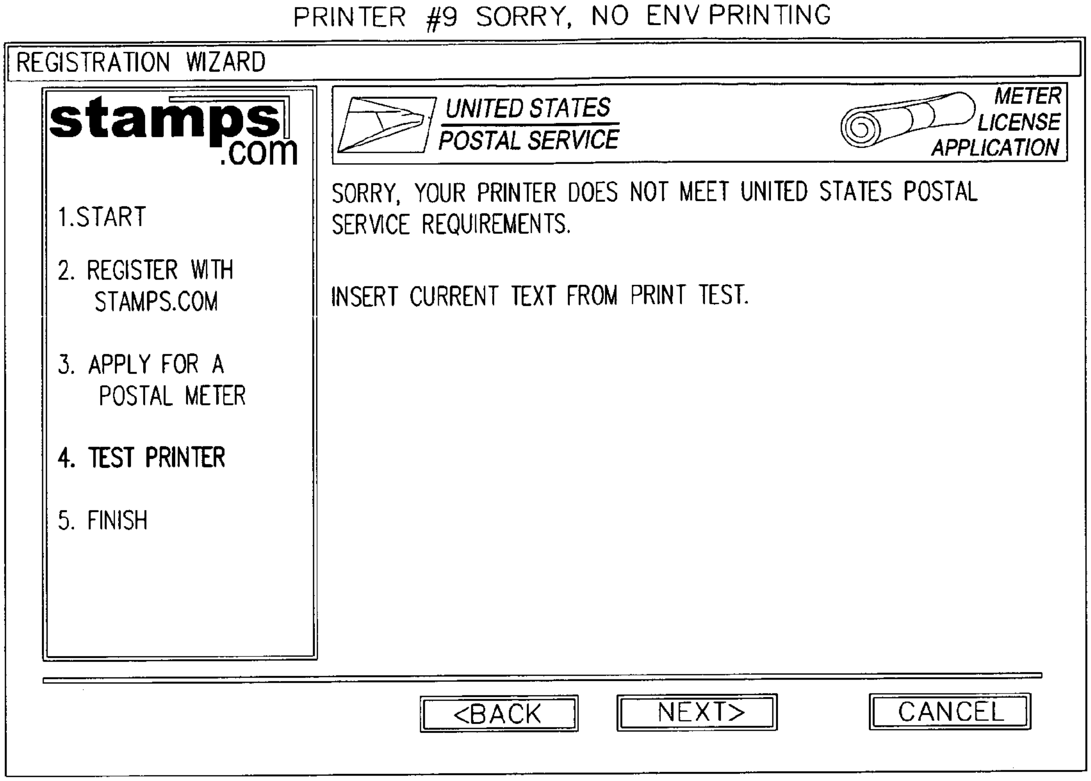
Figure 11L:
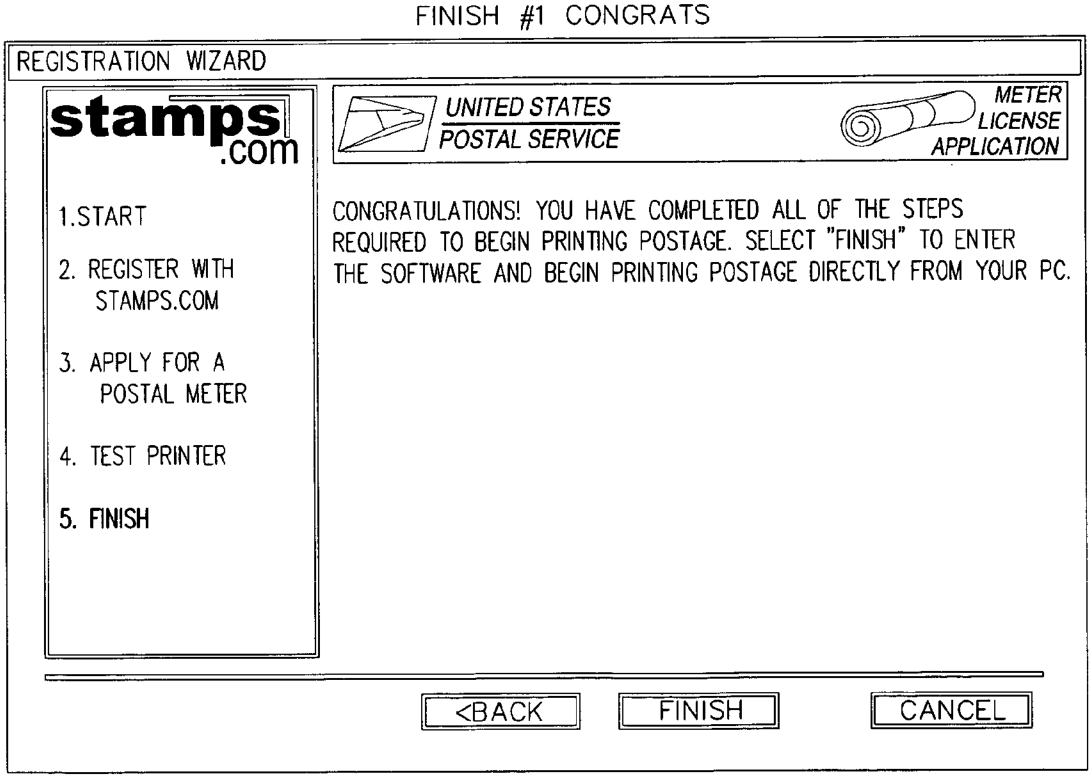

If the user selects "neither of these solutions work" on screen # 8, print envelope is disabled and Printer Screen #9, shown in FIG. 11K, appears to ask the user to let the user know that he/she is not able to print postage onto envelopes, only onto labels (see blocks 1128 and 1129). The "Next>" button is available immediately. Once selected, the client preferably disables printing to envelopes. A Finish portion of the Getting Started congratulates the user for completing the wizard, and launches the client. When this portion of the Getting Started wizard has begun, the Follow the Yellow Brick Road text is changed to "Finish". An exemplary interface for Finish screen #1 is illustrated in FIG. 11L. The "Finish" button is preferably available immediately. Once the "Finish" button has been selected, the user is ready to launch the client software.

Figure 12A:
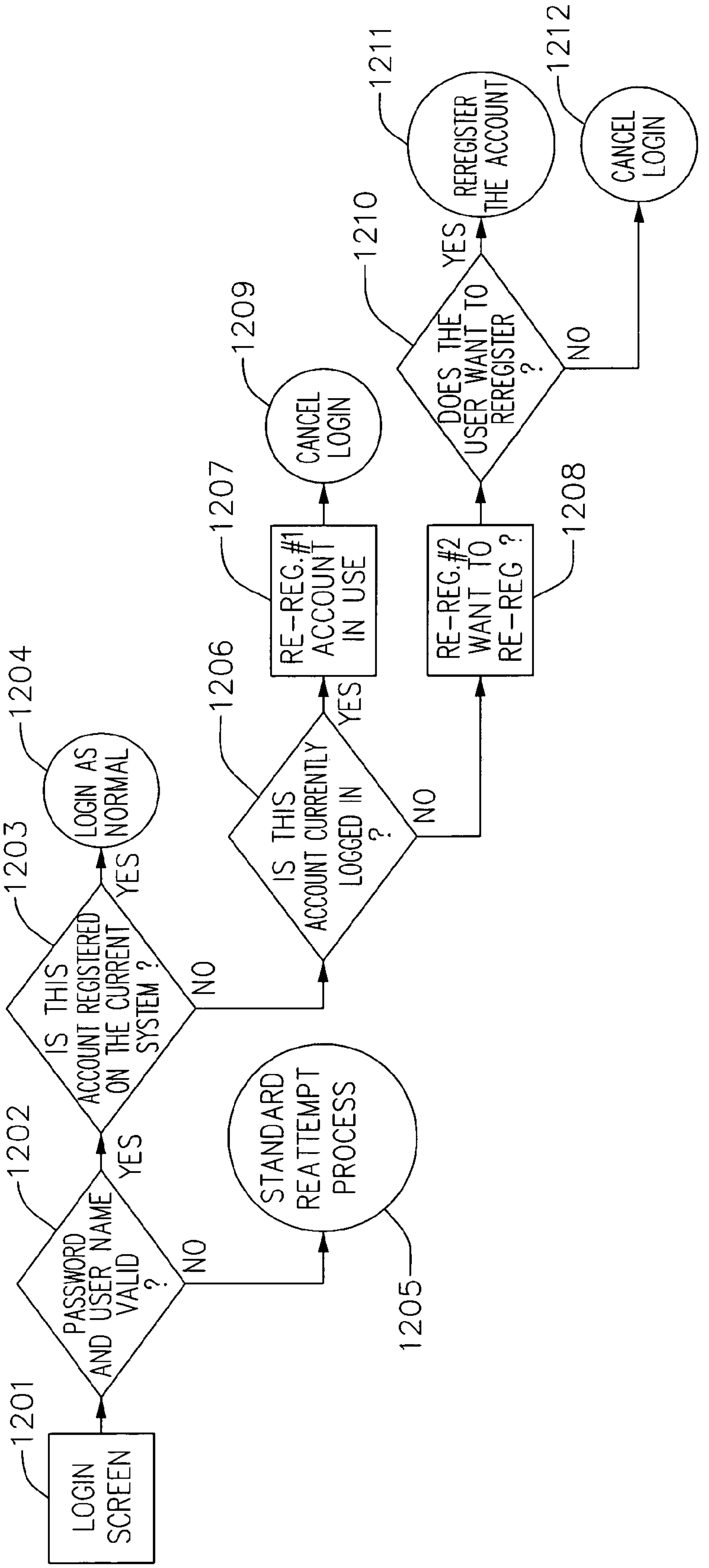
FIG. 12A is an exemplary process flow diagram for a re-registration process.
Figure 12B:
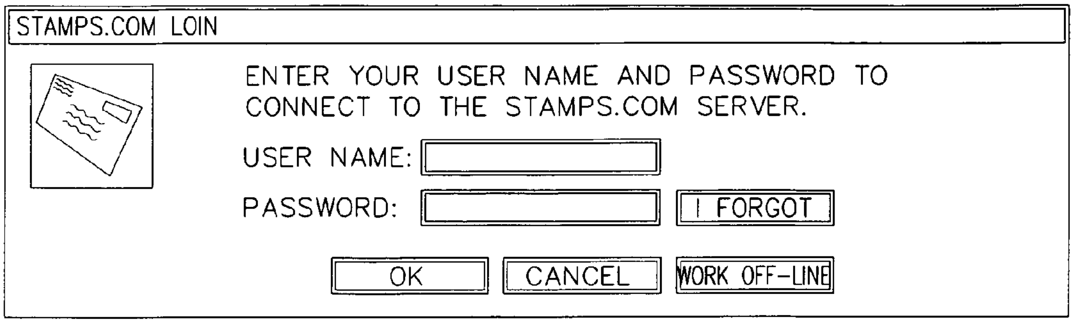
FIGS. 12B–12D are exemplary interfaces for a re-registration wizard.
Figure 12C:
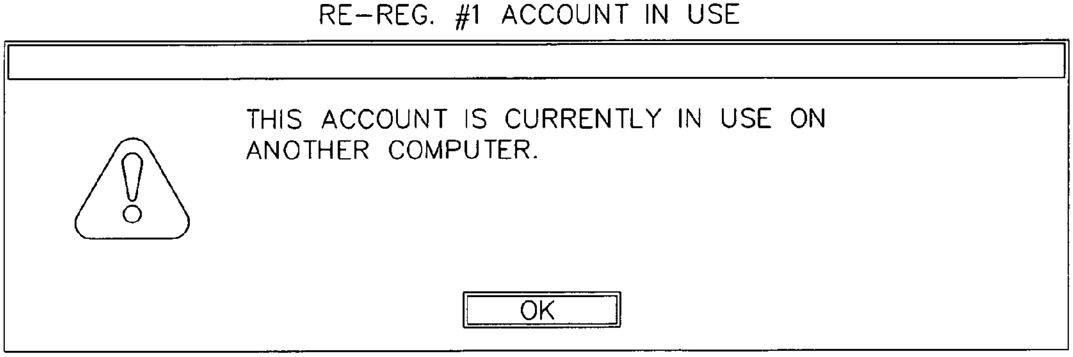

A re-registration process allows users to re-register across systems. An exemplary flow for the re-registration process is shown in FIG. 12A. To begin the re-registration process, the user logs in as normal via the login dialog box shown in FIG. 12B. The client sends the User Name, Password, and system identification information to the server. After checking for the validity of the user name and password, the server checks if the user is currently registered on the current system, or on another system. In block 1203, if the user is registered on the current system, login continues as normal, as shown in block 1204. If the user is currently registered on another system, in block 1206, another check is made to determine if the user is currently logged into the provider's service. In block 1207, if the user is already logged in, the message in FIG. 12C appears. In block 1209, when the user selects "OK" the login attempt is aborted.

Figure 12D:
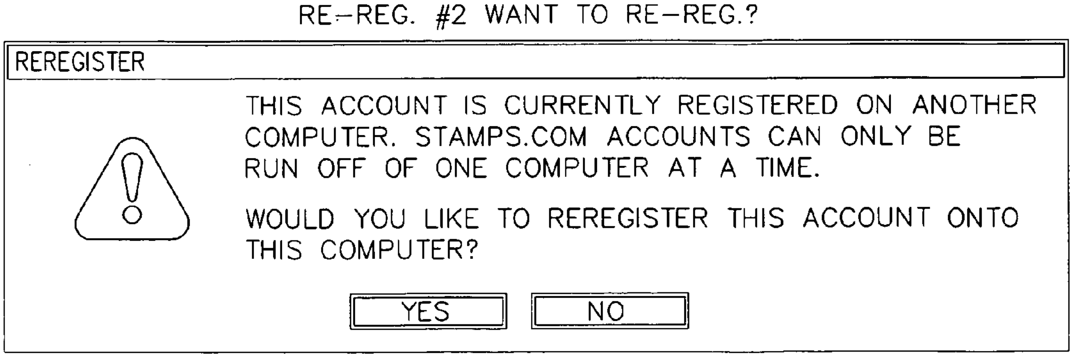

In block 1208, if the user is currently registered on another system, and is not currently logged in, then the dialog box of FIG. 12D appears. This dialog box prompts the user as to whether the user wants to re-register is/her account on the current machine. In block 1210, if the user selects "Yes", the account is re-registered (block 1211). If the user selects "No", the login attempt is aborted (block 1212).

Figure 13A:
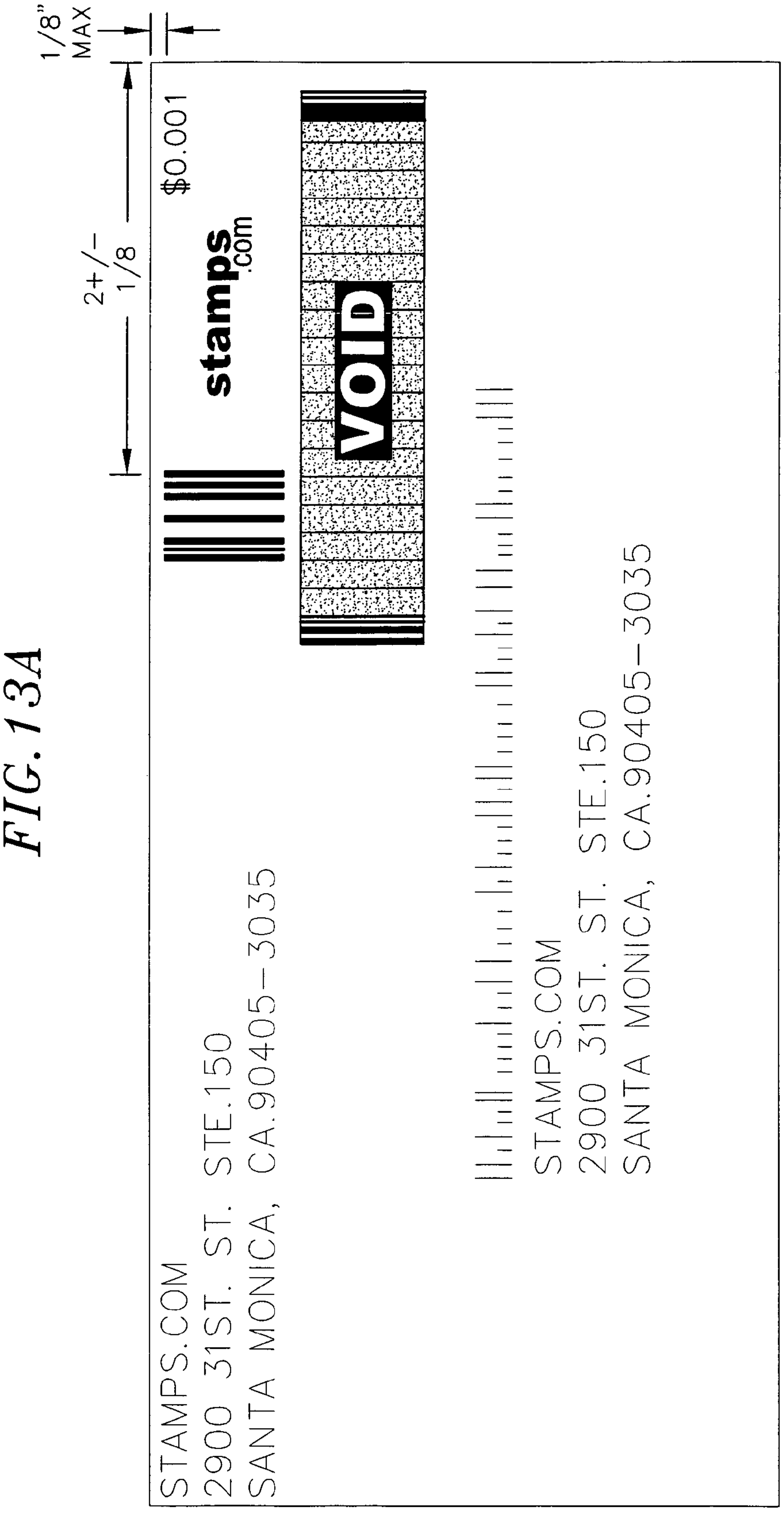
FIGS. 13A–13N are exemplary interfaces for a print wizard.
Figure 13B:
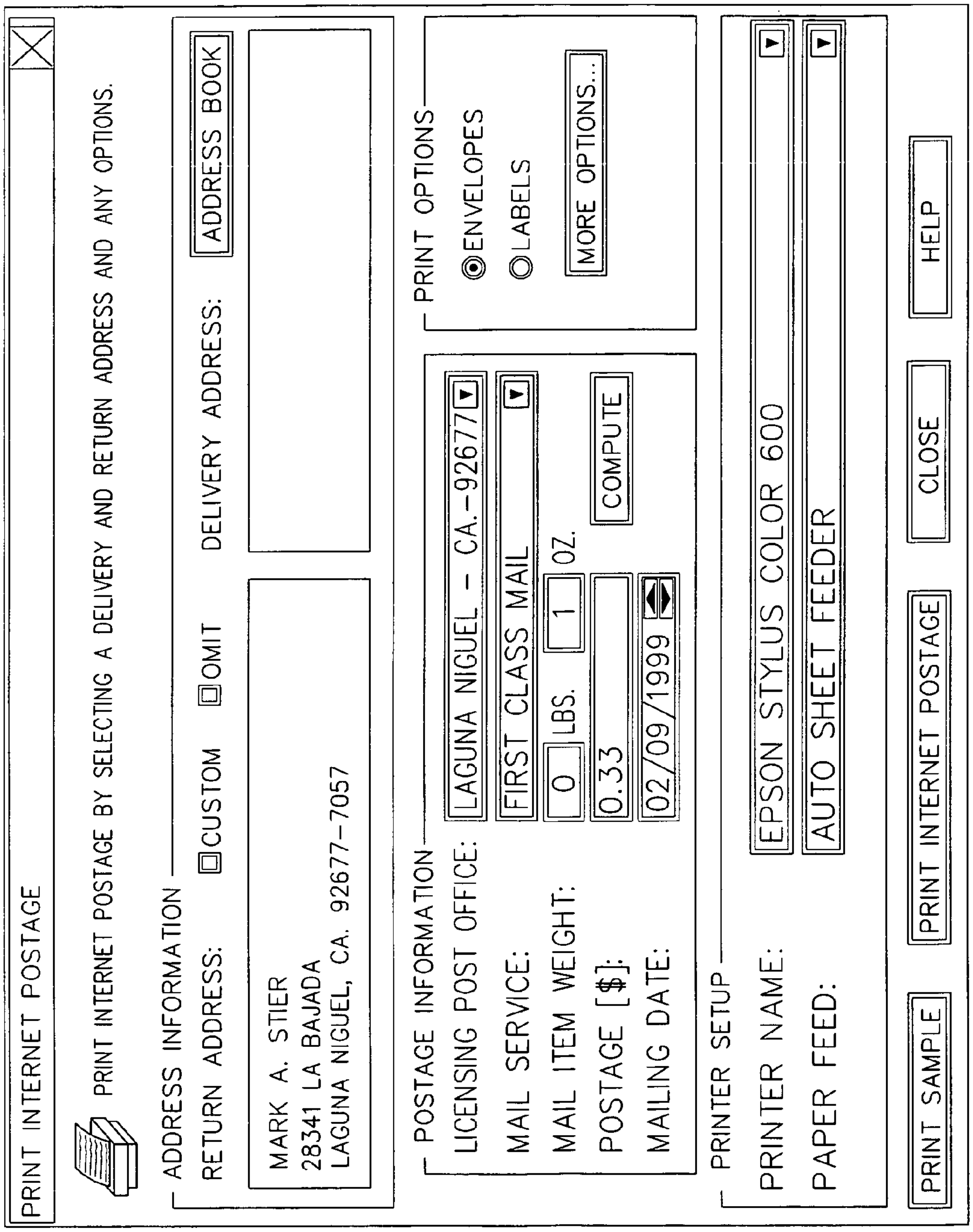
Figure 13C:
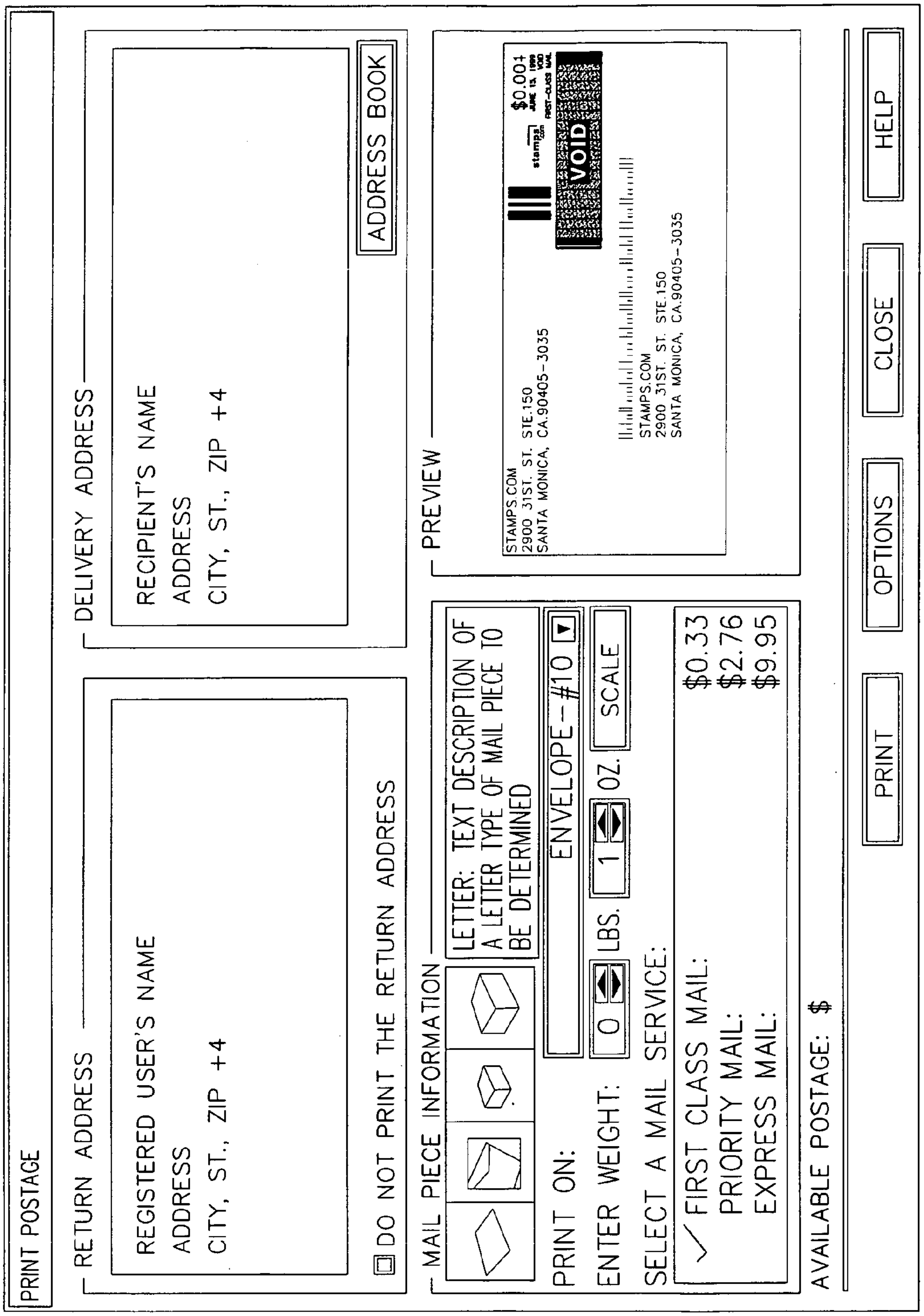
Figure 13D:
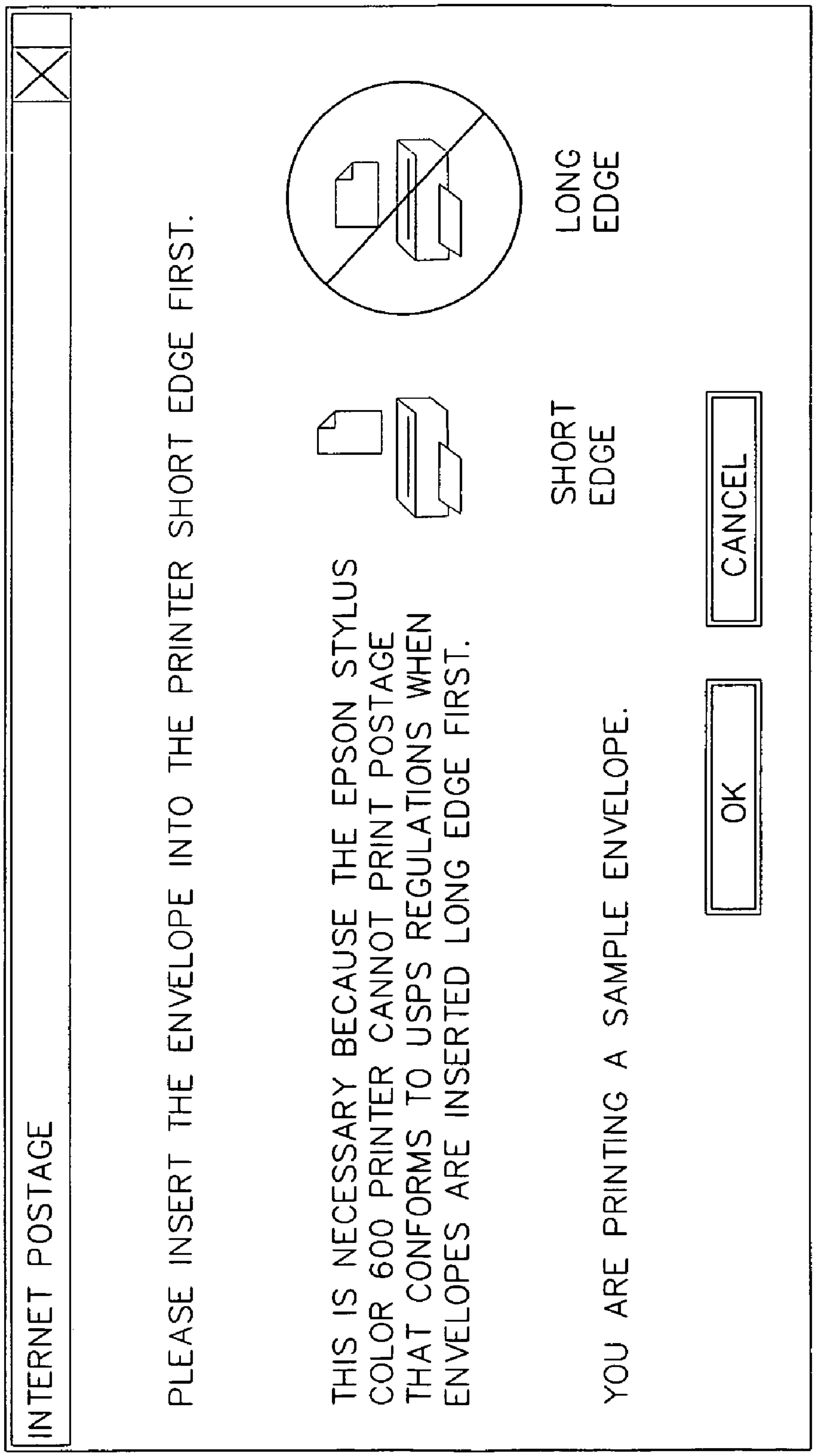
Figure 13E:
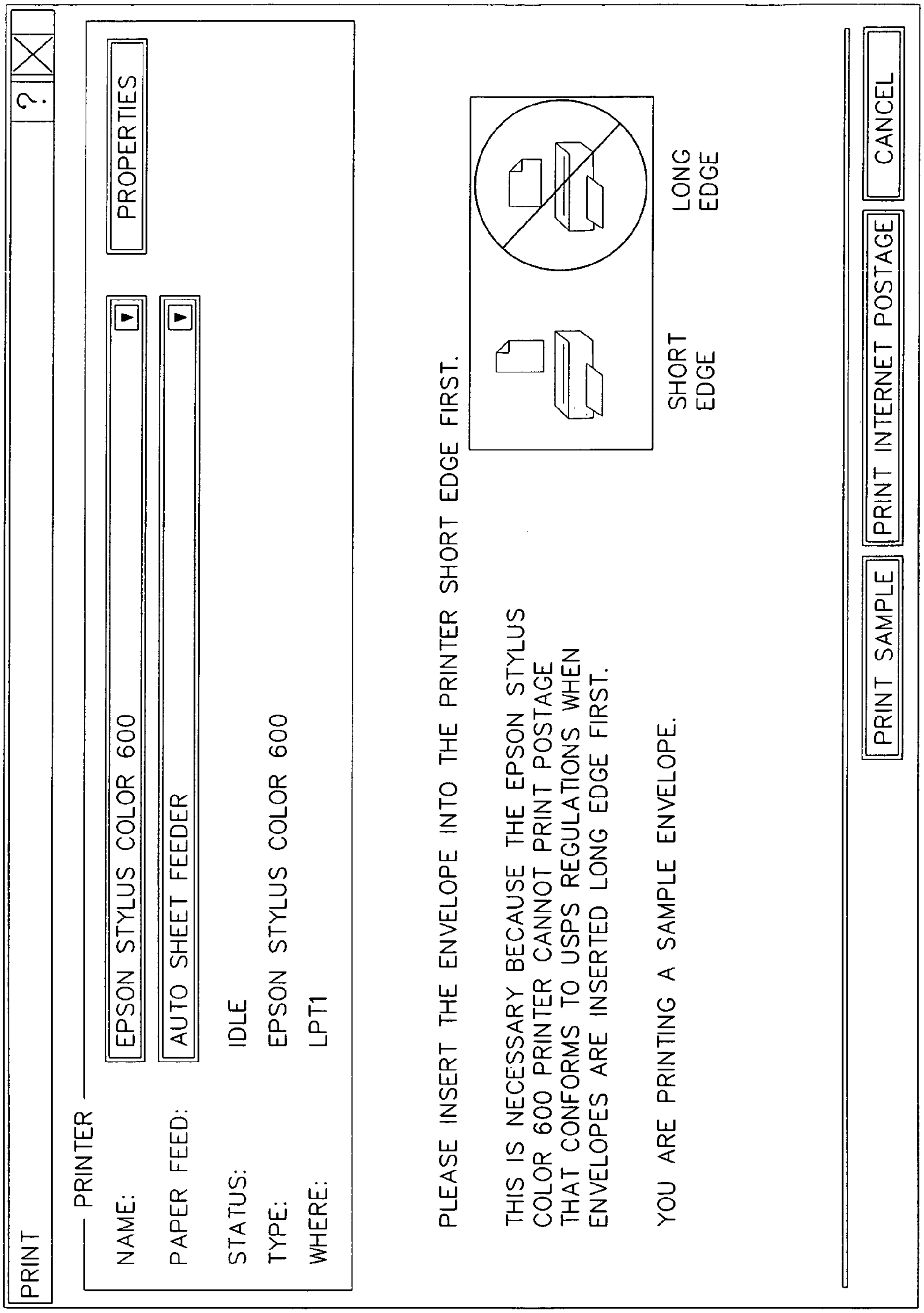
Figure 13F:
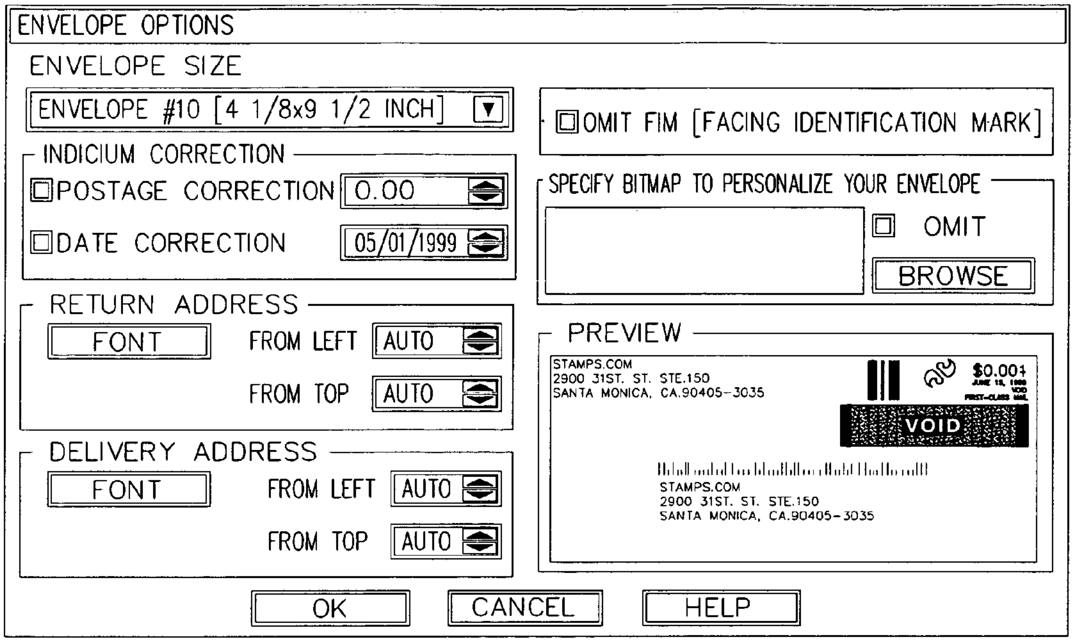
Figure 13G:
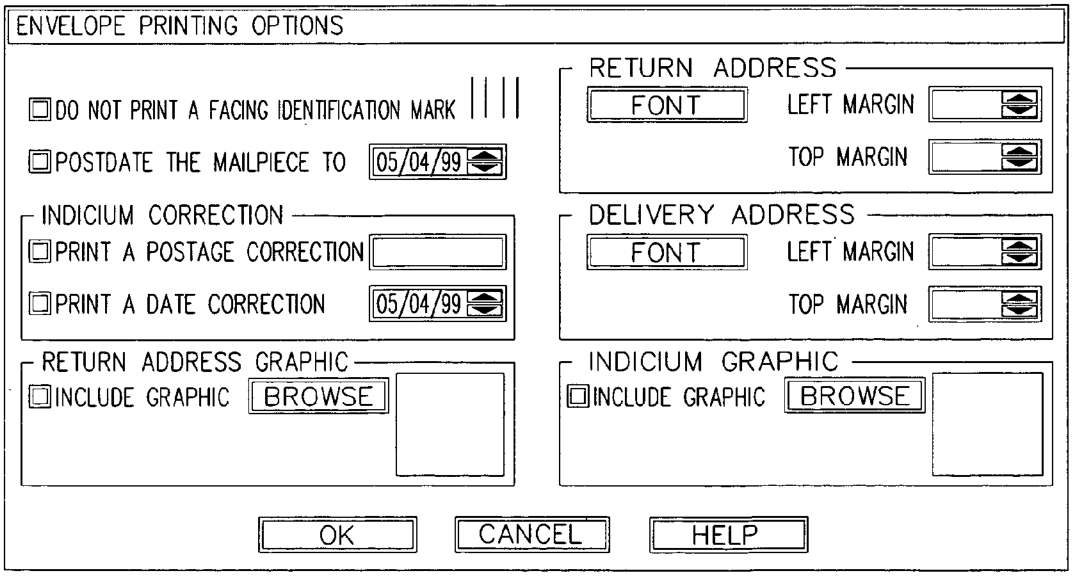
Figure 13H:
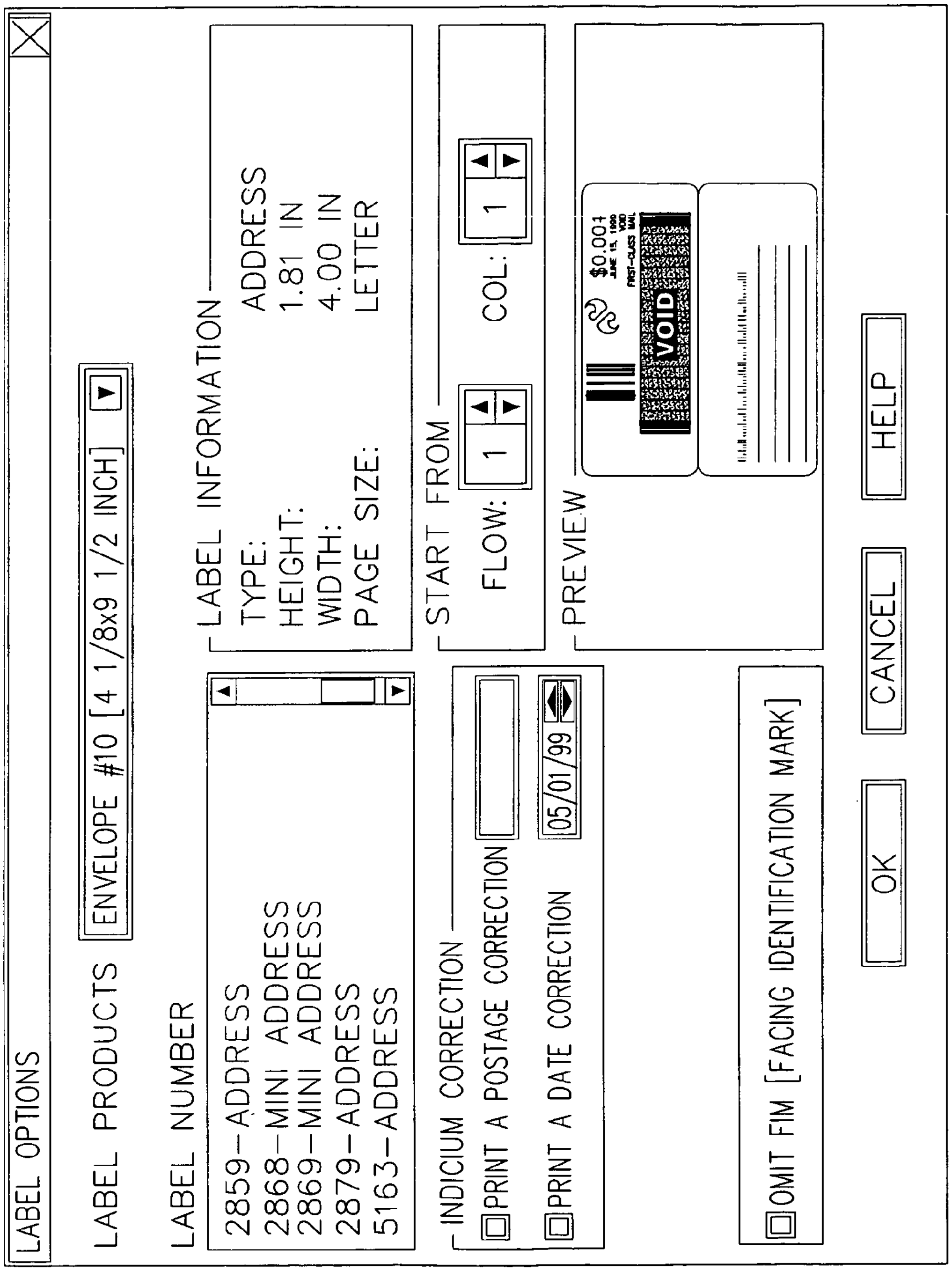
Figure 13I:
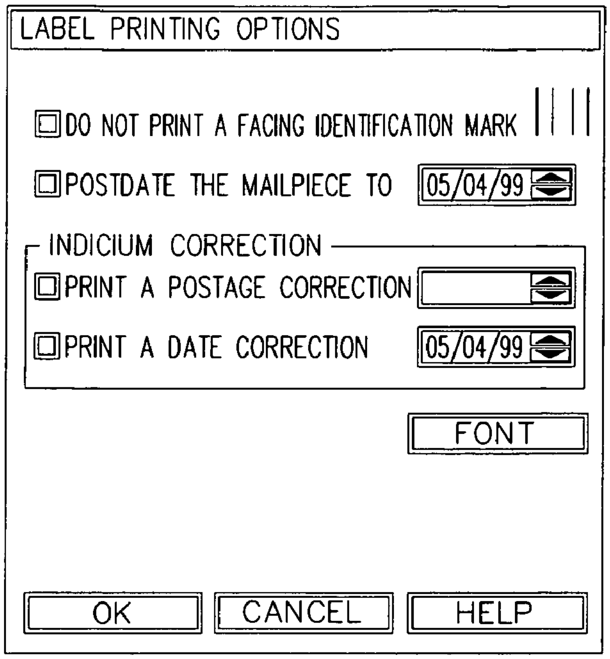

The client print engine prints a Facing Identification Mark (FIM) in accordance with USPS specifications. Preferably, the FIM is printed within ⅛" from the top of the envelope, and no more than 2⅛" from the right hand edge, as shown in FIG. 13A. A print engine supports as broad of a range of printers as possible, utilizing whatever specialized techniques that are deemed appropriate for proper printing of the postage indicia (i.e. rotation and virtualization). Before rotation is applied to an individual client, a verification is performed to verify that the user's printer and print driver are know to work with this technique. This is accomplished using a check against a database of printers and printer drivers that are know to work with rotation within the client software. This database is preferably created through hands on testing. Some examples of print dialog boxes for the Print Postage dialog box, Print Prompt dialog box, and Printing Options dialog boxe are shown in FIGS. 13B–13I.

Figure 13J:
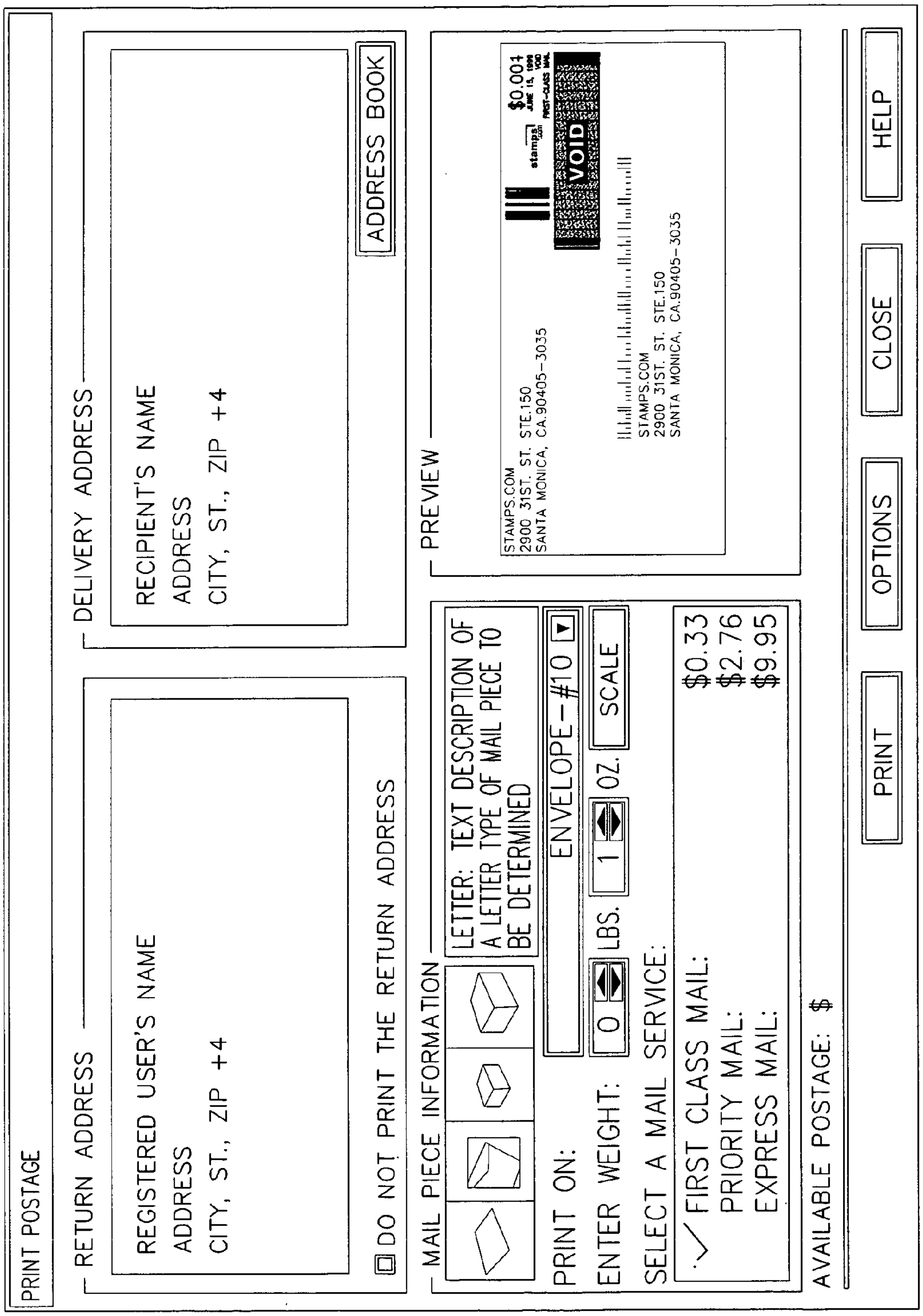

A Print Postage dialog box is the main interface from which a user defines the postage to be printed. An exemplary interface for this dialog box is illustrated in FIG. 13J. Return Address items are grouped within their own frame. The Return Address box is editable, allowing users to customize the return address by simply typing into the box. Delivery Address items are grouped within their own frame. The Delivery Address box is editable, allowing users to insert a delivery address by simply typing into the box. If a user adds an address which is not in the address book, the user is prompted whether or not the address is added. In the event that only a single recipient is chosen, the address is displayed in the same format that it is in the return address window. If multiple recipients are selected, the view is that of a list box displaying the names of all of the recipients that have been chosen. If multiple recipients are selected and different recipients require mailing to different zones, then the cost of postage is displayed next to that recipient.

"Do not print the Return Address" is unchecked by default. Mail Type toggle buttons enable the user to select whether the mail to be sent is a letter, flat, box or oversized box. This information is used to determine what labels and/or envelopes are available to the user, as well as what the postage rate will be. The letter toggle is selected by default. Mail type description field provides a brief description of the mail type that is currently selected with the Mail Type toggle buttons. Print On list box allows user to select from all Envelopes and Labels. The items displayed in this list box are determined by the type of mail that was selected in the previous list box. If a letter is selected, only envelopes and labels approved by the USPS are available. If a flat or box is selected, only labels approved by the USPS are available. No values are selected by default.

The Enter Weight fields allow users to type in values or select them using spinner controls. If the user has set up a digital scale, clicking on the scale button automatically pulls the value from the scale and display the value in these fields. After the initial use, the fields remember the last value. The "Select a Service" control is a list box, which shows the various services that are available and also displays the cost of each type of service for the mail piece that has been defined. The prices update as the user inputs information into the Enter Weight fields. If the user is typing a value, the display immediately updates as the user types. If zone based postage is used, and if multiple users are selected, the range of costs is displayed. Once a user has selected a mail service, a graphic of a check mark should appear immediately to the left of the item as shown. None of the items are selected by default. Available Postage display displays the available postage amount. Total Mailing Cost displays the cost of the total mailing when multiple recipients are selected.

Preview Window is dynamic, depending upon the selection from the "Print Onto" list Box. Print button decides whether to print a sample or real postage. This single print button advances the user to the Print Prompt screen. Options button launches the appropriate options dialog box, depending upon the selection type into the "Print Onto" list Box. If an envelope is selected, the Envelope Options dialog box will be launched. If a label is selected, the Label Options dialog box appears. In the event that multiple recipients and/or zone based postage rates are selected, portions of the Print Postage dialog changes slightly in their functionality, as shown in FIG. 13K.

Figure 13K:
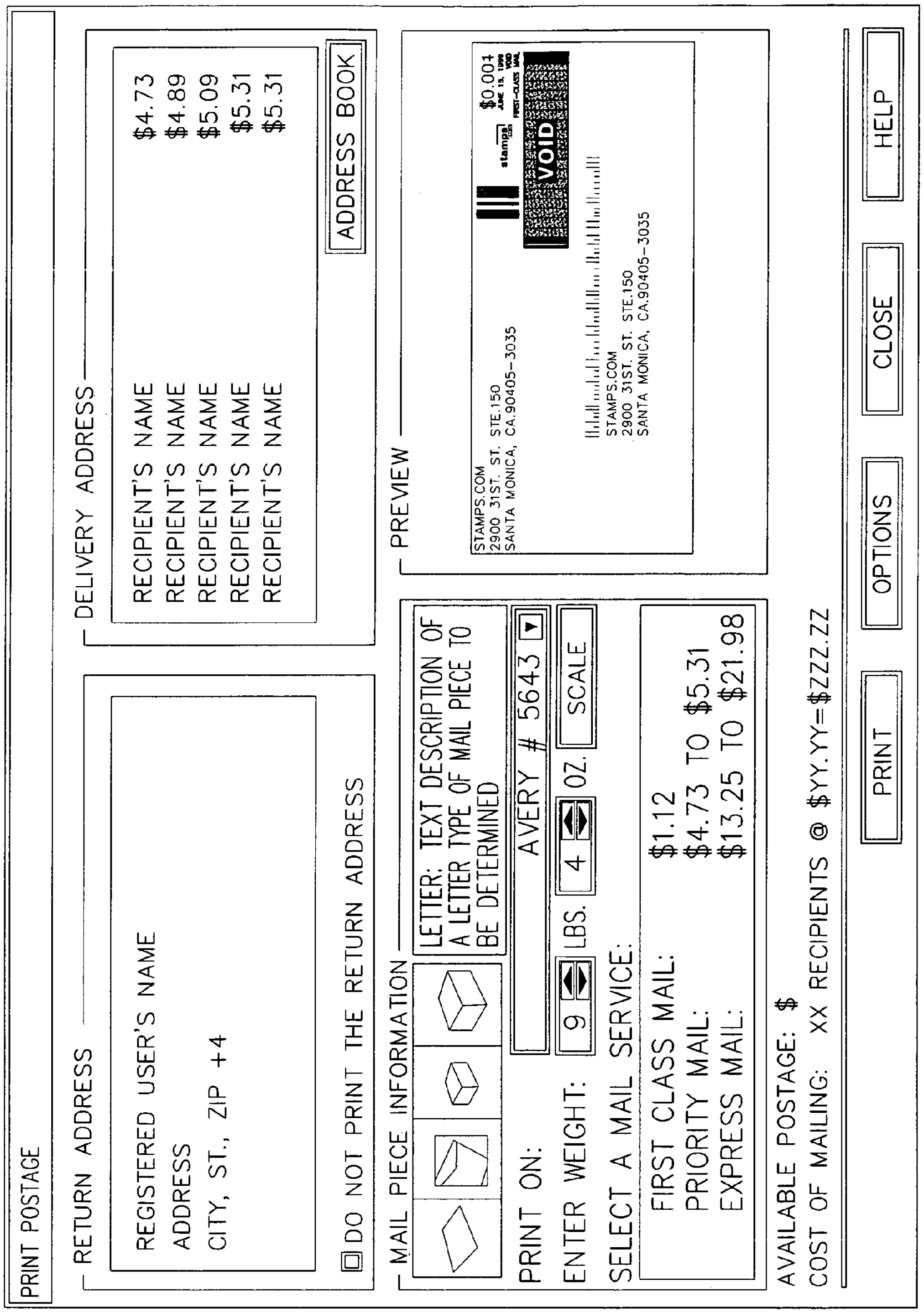

In the exemplary screen of FIG. 13K, when multiple recipients are selected, they are displayed as a list with only the recipient name showing. When multiple recipients are selected which span multiple zones, the price of the mail piece going to an individual recipient is displayed next to the recipient's name. This display only appears after a weight value that warrants zone based postage has been entered. The Select a Service list box shows a range of prices for the mailings. The Cost of Mailing display appears when multiple recipients are selected, and provides the user with a total cost for the mailing.

Figure 13L:
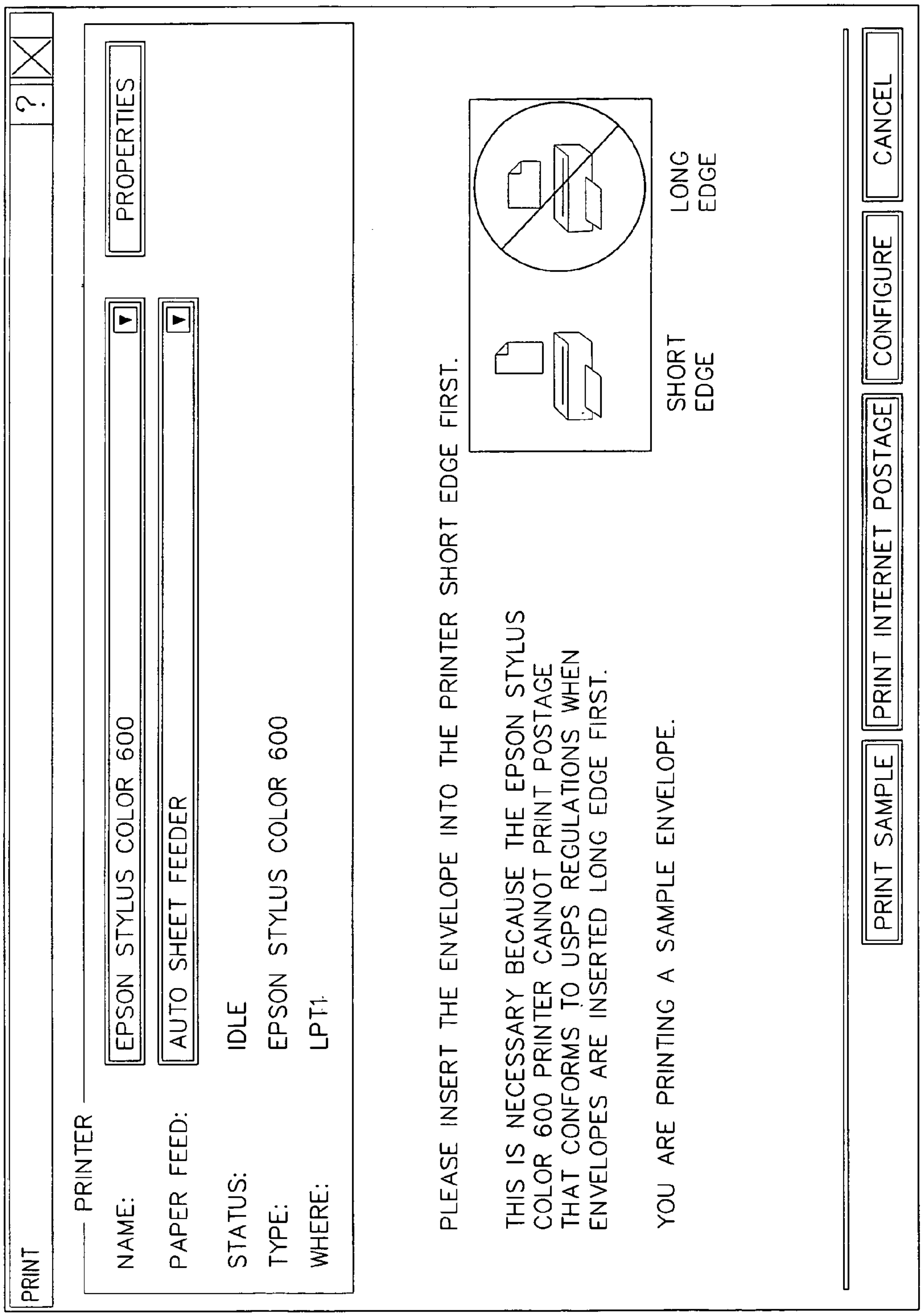

After the user has selected "Print" from the Print Postage dialog box, the Print Prompt dialog box of FIG. 13L appears. The Print Prompt dialog box takes on several functions, including selection of the printer, printer paper feed, and determination of whether a sample or real piece of postage is being printed. The printer list boxes provide a selection of available printers. Standard Windows displays (optional) display the selected printer. Existing printer feed information displays relevant information about the selected printer. Print Internet Postage and Print Sample buttons print postage, and the Configure button launches the Print Configuration wizard.

Figure 13M:
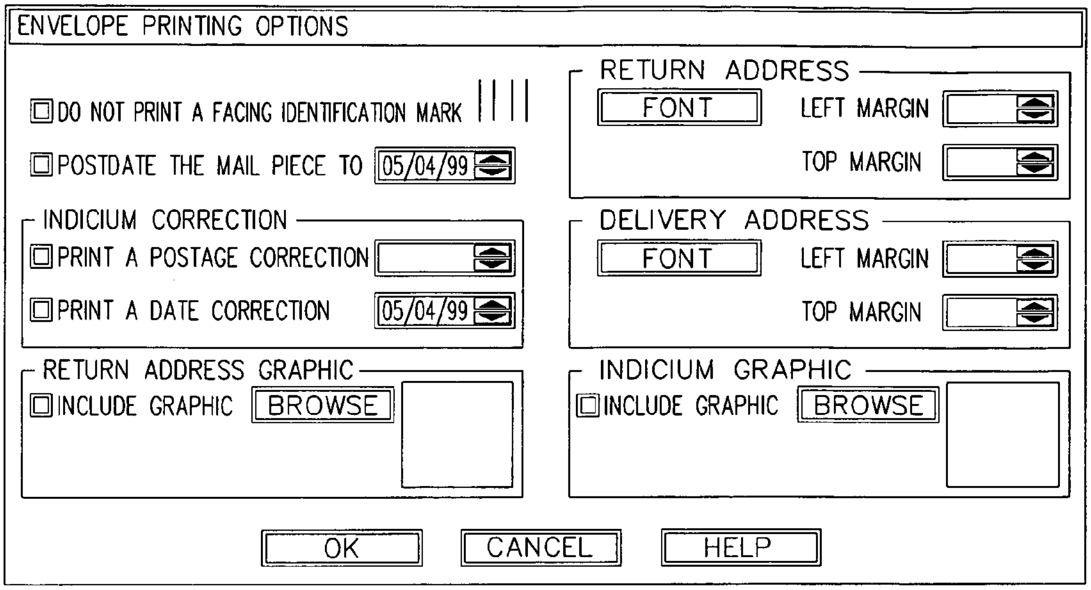

Envelope Options dialog box, depicted in FIG. 13M, is launched from the Print Postage dialog box when two conditions are met: 1) the user selects the "Options" button, and 2) an envelope is selected in the "Print Onto" drop down box. Do not print a FIM check box has a small graphic icon to let the user know what the FIM barcode is. Postdate Mail piece control has a text description as shown. If the user selects the check box, the edit box becomes available to allow editing. Indicium correction items allow the user to print two forms of special Indicia: postage correction and date correction. Return Address Graphic control allows the user to select a graphic to be printed with the return address. Return Address adjustments and Delivery Address adjustments controls provide margin adjustments for the return address and delivery address, respectively. Indicium graphics that can be displayed within the Indicium are preferably controlled by the provider. To accomplish this, the system provides graphics for the Indicium in a digitally signed format, embedded within a DLL. At a minimum, this graphic is used for OEM partners. The system also provides clip art for the Indicium graphics. The system therefore makes sure that this DLL can be downloaded on its own, so that a clip art library can be updated without forcing a complete download of the client. If the DLL is not present, this control is unavailable.

Figure 13N:
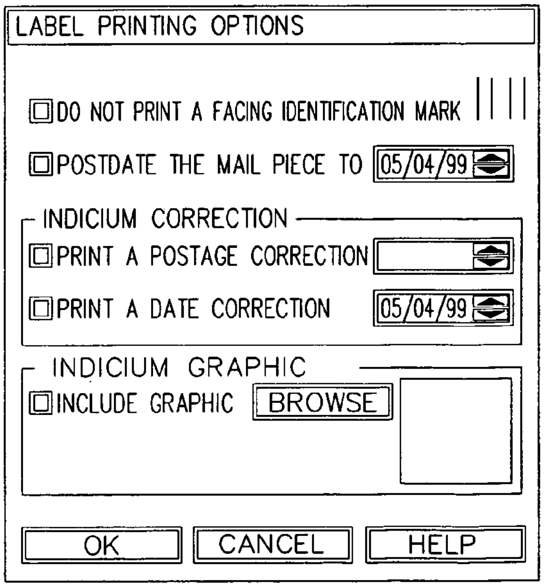

FIG. 13N is an exemplary interface for a Label Options dialog box. This dialog box is launched from the Print Postage dialog box when the user selects the "Options" button, and a label is selected in the "Print Onto" drop down box. Do not print a FIM check box control has a small graphic icon to let the user know what a FIM barcode is. Postdate Mail piece control has a text description as shown. If the user selects the check box, the edit box becomes available. Indicium correction items allow the user to print two forms of special Indicia: postage correction and date correction. Indicium graphics that can be displayed within the Indicium are preferably controlled by the provider. To accomplish this, the system provides graphics for the Indicium in a digitally signed format, embedded within a DLL. At a minimum, this graphic is used for OEM partners. The system also provides clip art for the Indicium graphics. The system therefore makes sure that this DLL can be downloaded on its own, so that a clip art library can be updated without forcing a complete download of the client. If the DLL is not present, this control is unavailable. Delivery Address font control allows the user to change the font of the Delivery Address by launching a secondary dialog box.

Figure 14A:
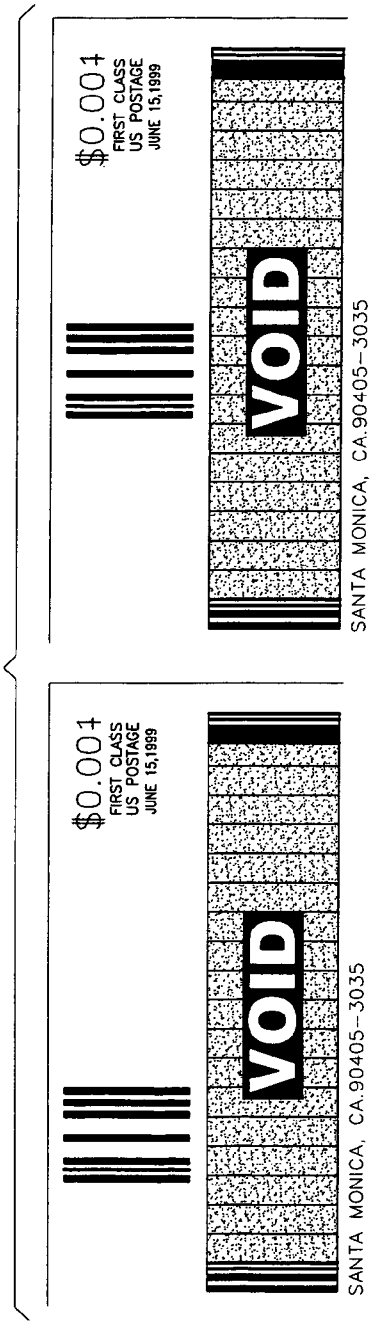
FIGS. 14A–14B are exemplary diagrams showing an indicium printed on an envelop.
Figure 14B:
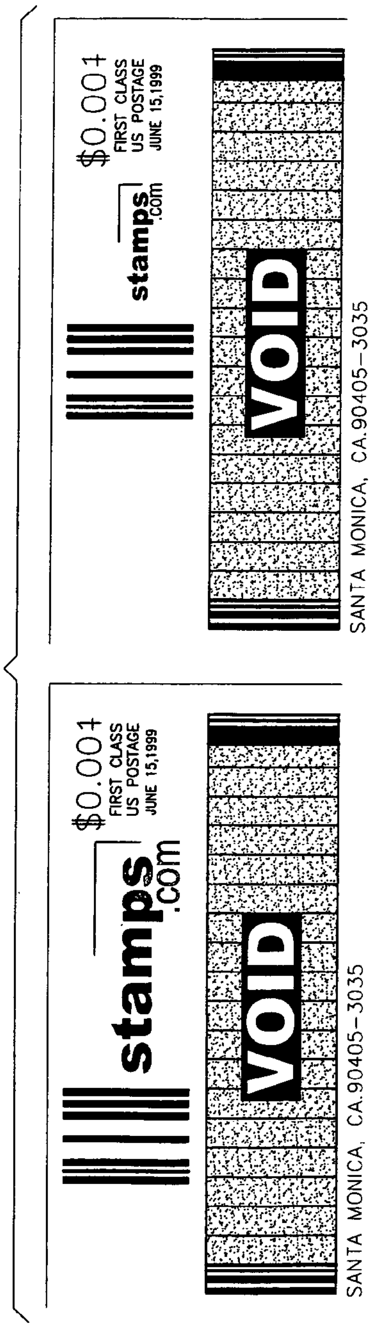

A Print Configuration wizard helps the user undergo three major processes: determining top, center, or bottom offset (if needed), providing print verification, and Printing a QA envelope. The print engine preferably incorporates the provider's logo into the Indicium. Rather than integrating a single static logo graphic, the print engine accommodates a scalable graphic. The reasoning behind this is as follows. In order to conform to the FIM placement standards which requires that the FIM consistently be printed 2"+/−⅛" from the right hand edge of the envelope, the space available between the FIM and the human readable portion of the Indicium will change depending upon the right hand margin of the printer used, as shown in FIG. 14A. The logo is scaled to the maximum size available given the space constraints which arise from the individual printer margin. This approach ensures that the maximum log size is always used, as shown in FIG. 14B.

Figure 15A:
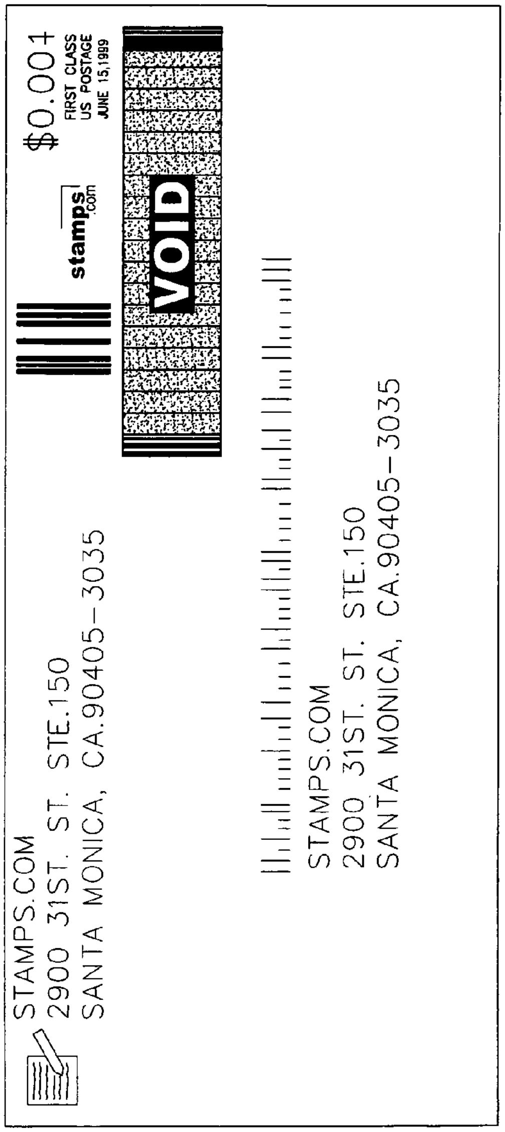
FIGS. 15A–15B are exemplary diagrams of an envelop with and without a graphic paced in the area to the left of the return address, respectively.
Figure 15B:
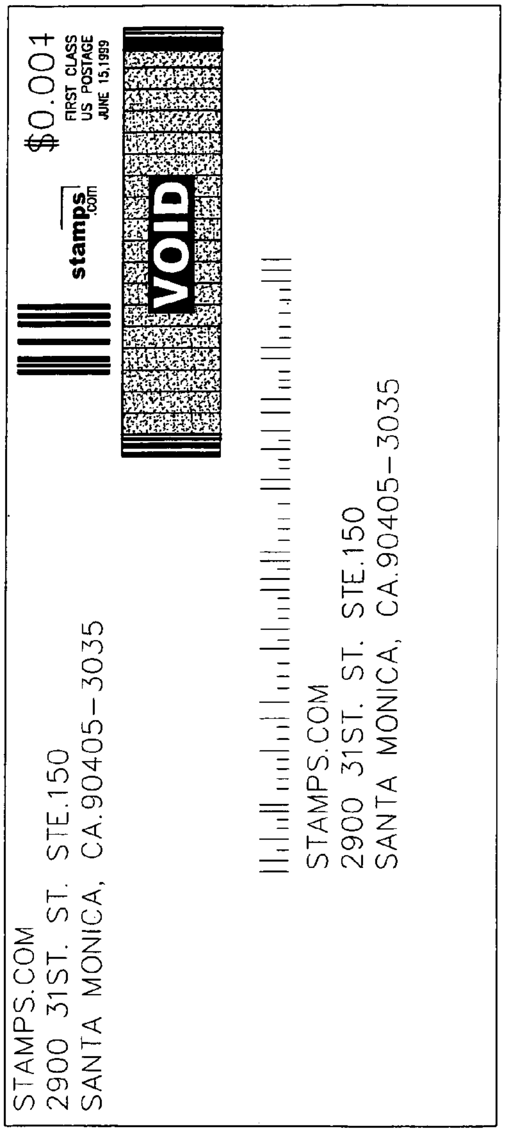
Figure 15C:
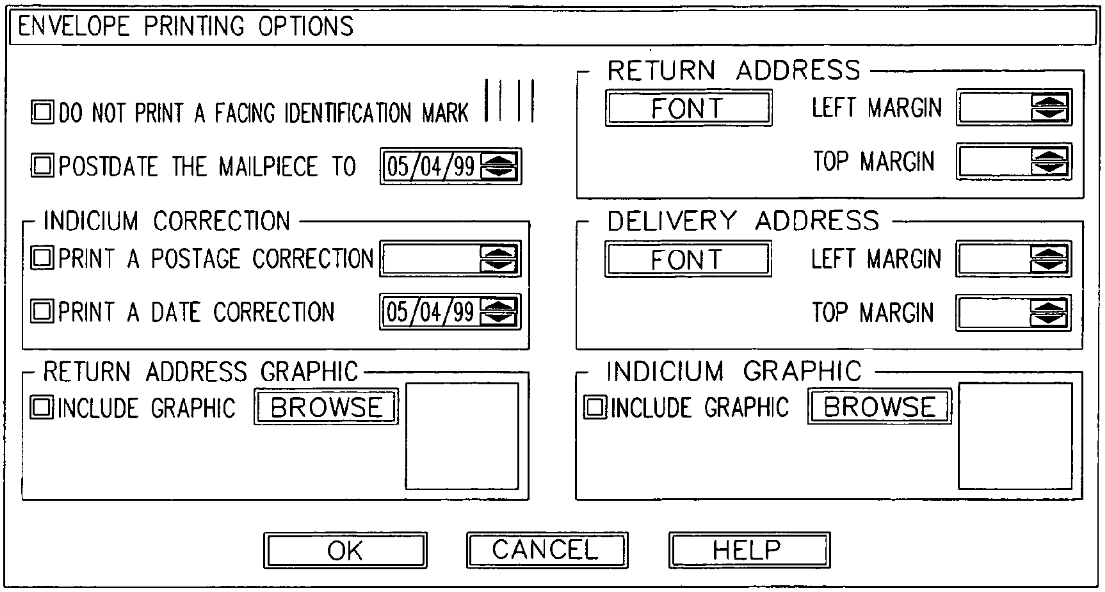
FIG. 15C is an exemplary interface for an envelop printing option.

A means by which users can customize their mail piece with a graphic file of their choosing is provided by the system. The system provides users with the ability to incorporate a graphic into the return address space. Specifically, the client software allows the user to incorporate a standard graphic into the area to the left of the return address, as shown in FIG. 15A. The default state is that no logo is selected for this position. In the event that no logo is selected, the layout is as shown in FIG. 15B. The controls for the determination of the image to occupy this space are found in the Print Postage Options (Envelope Printing Options) dialog box of FIG. 15C. When Include Graphic check box is selected, it indicates that the print engine should print a graphic file. When this check box is not selected, the print engine should not print a graphic. The default for this check box is unselected. Selecting the Browse button opens a standard file browse dialog box, which allows the user to browse for and select a file. Preview Window provides a preview of the selected graphic once it has been selected.

A personal address book may be used by the user to print addresses on the mail pieces. The client's native address book is functional even when the user is offline. Specifically, the user is able to add addresses, edit addresses, import addresses, and remove addresses without requiring the user to login online. In order to ensure that every address that is entered, modified, or imported undergoes an AMS check, addresses undergo an AMS check at the time the postage is printed to an address (see Printing description). In addition to the native address book, the system provides support for a variety of external address books. Examples of some of the address books supported include Microsoft Outlook™, Schedule +™, Symantec ACT!™, Lotus Organizer™, Lotus Notes™, GoldMine™, Microsoft Windows Address book, and the like.

Figure 16A:
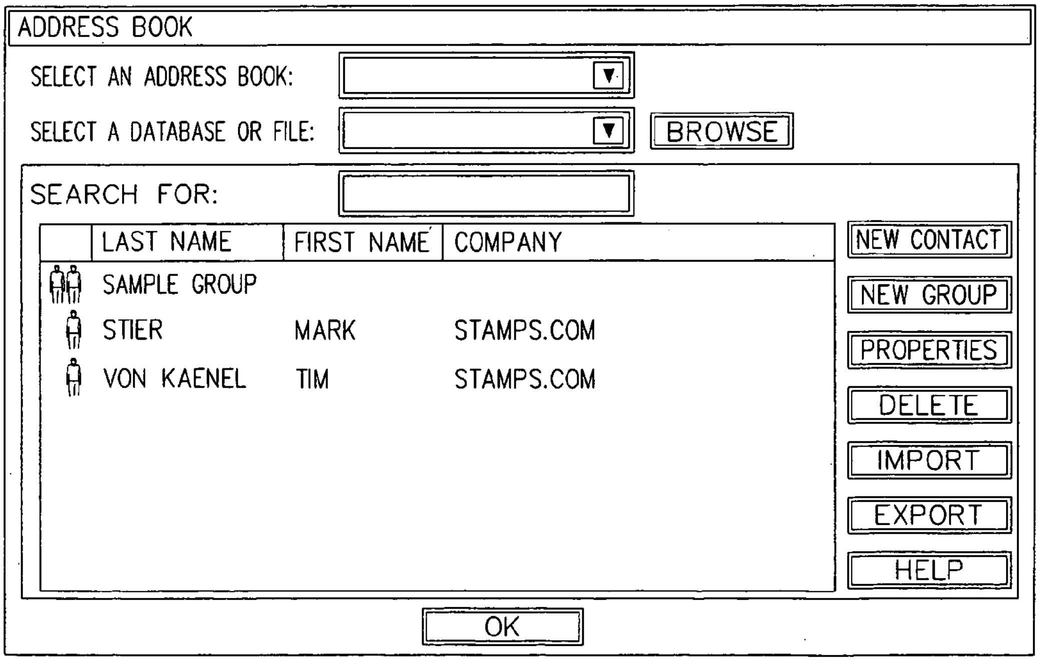
FIGS. 16A–16B are exemplary interfaces for addition of an address book.

The client's support for the external address books is such that the user can read data from any of these address books from within the standard client address book interface. The data is able to be read in real time. In addition, the user is able to make changes to addresses and write these changes back to the external address book. In order to allow the user to select which address book to use (either the native or any of the third party address books), several controls are added to the client Address Book interface, as shown in FIG. 16A. Select an Address Book combo box contains a list of all address books that are supported by the client, and have been installed by the user. The default is set to the system's Address Book. Preferably, this drop down box remembers the last selection. Select a database or file combo box control displays a list, which includes the default file or database (depending upon the provider), and any other file that the user has previously opened using the browse button. Browse button allows the user to open additional files or databases for the Address Book selected by launching the appropriate "open" dialog for the provider. Preferably, when possible, the only controls on the Address Book provider's open screen is the bare minimum that are required to open a file. The user can modify addresses using the "properties" button. Based upon which Address Book is selected, a different set of fields is displayed within the edit properties dialog box. The fields map to the format of the Address Book that is selected. The user has the ability thereafter to switch Address Books on-the-fly, by selecting the appropriate Address Book from the selection box as shown in FIG. 16A.

Figure 16B:
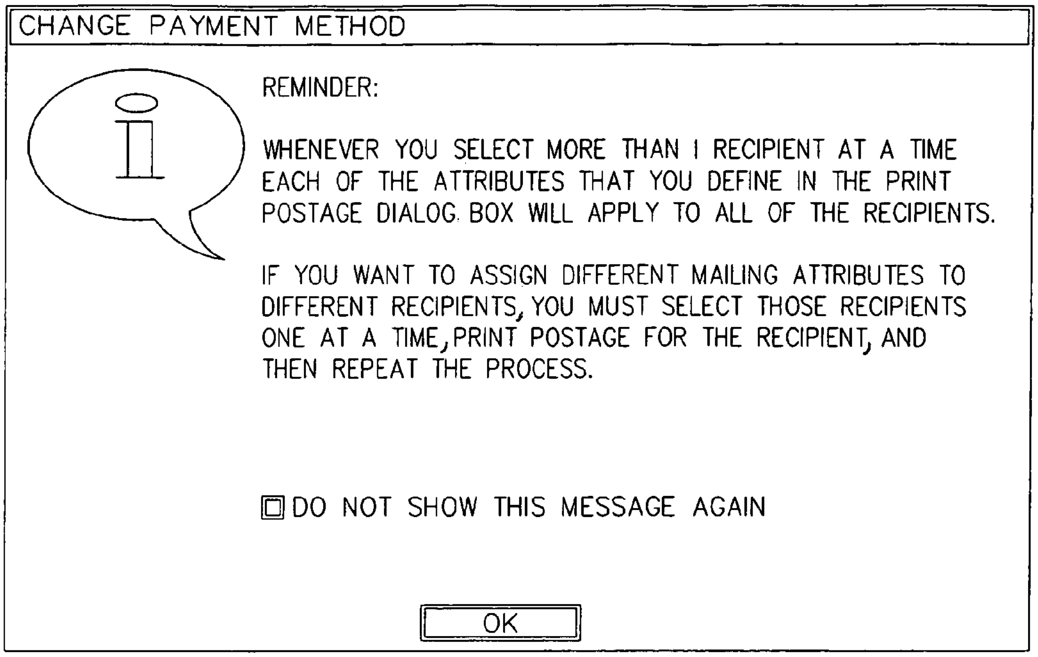

In one embodiment, the code that provides support for each Address Book is created as a plugin, allowing users to only download the Address Books that they want support for. The install routine provides a means by which users can select which Address Books are downloaded, and automate the installation of the plugin. Support is provided for importing other address data. For example, the system provides import filters for the following: Daytimers, The Learning Channel products, MYOB, and the like. Also, Address Books support standard group capabilities. The system is capable of providing support for foreign addresses, and is able to pass AMS matching checks. Furthermore, the system provides the capability to print addresses that have been returned by AMS in a format that includes both upper and lower cased alpha characters. In other words, the address that is printed should preferably have the same formatting of upper and lower case characters as the user originally entered. When multiple recipients are selected from the Address Book, the dialog box shown in FIG. 16B appears to educate the user about multiple recipient selection. Selecting Ok closes the dialog box and returns the user to the Print Postage dialog box. If the user selects the check box (which is unselected by default), this dialog box will not appear again in the future.

The Address Book within the client provides a utility to import text files that have been exported from other Address Books. Typically, when a user imports a text file, the user need to "map" the fields from the original file into the fields of the destination file. This is very cumbersome for the user, and often prevents users from successfully importing files. To avoid forcing the user to map fields, the system provides import "filters," that are unique filters written for each Address Book. Since each filter is unique to an individual source file, the filter knows the data field structure of the source file (and it knows the data structure of the destination system Address Book). With this knowledge, the import filter is able to import files from other Address Books without requiring any data structure input from the customer. To meet the brandability needs, the system accommodates an easy addition of import filters.

The system also provides a flexible messaging system, which includes a communication channel between the provider and its users through the client software. Messages may be created by various departments within the provider's organization and are pushed by the server to one of several types of messaging dialog boxes. Some examples of messaging dialog boxes are described in detail below.

Figure 17A:
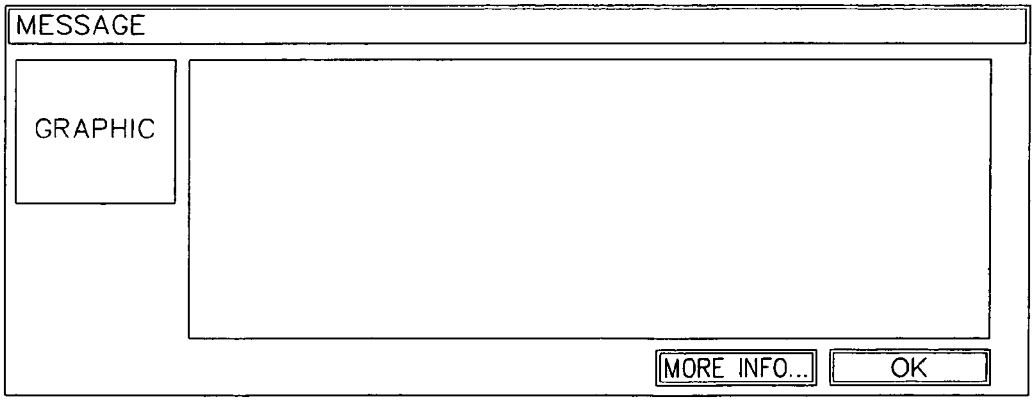
FIGS. 17A–17G are exemplary interfaces for messages.

FIG. 17A is an exemplary message dialog box. The graphic indicates the message category, the Text box displays characters of text in a non-editable text box, the URL Link button is dynamic and is available only when a URL address is included with the messages, and the OK button closes the dialog box. If applicable, selection of the OK button also executes a function (see specific cases, below). For client/server communications, the server is able to assign a message to any of the following: Individual users, all users, and a group of users (defined by any attribute that system stores). The client checks the server for messages awaiting the individual user at login. If a message is found for the individual user, the server sends the following information down to the client: Message type, Message Text, and URL link. In addition, if the message type is "payment" the following information are also sent: date of payment rejection, type of payment for payment rejection, account for payment rejection, and amount of payment rejection.

Figure 17B:
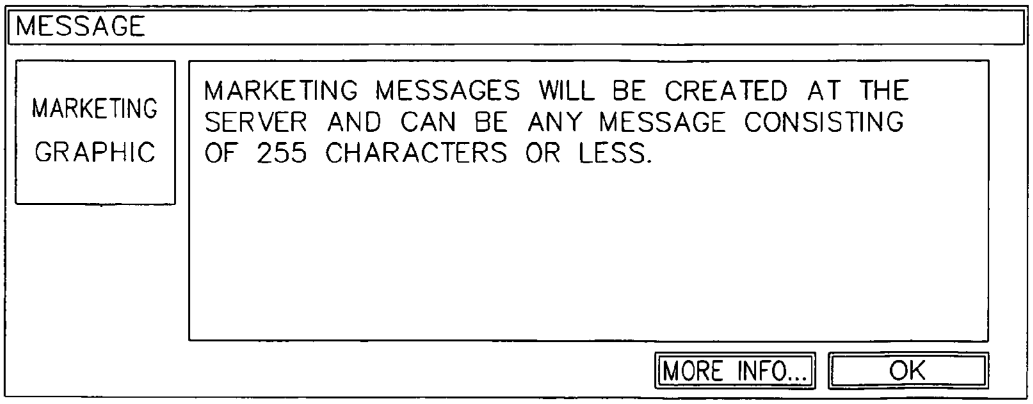

In the event that a message is awaiting a user at the time of login, the client displays one of several types of messaging dialog boxes. The specifics of the dialog box that is displayed is dependent upon the "Message Type" that awaits the user. Generally speaking, the types of messages available fall into one of two categories: generic or template. The generic message type includes marketing messages, customer support messages, etc, where the intent of the messaging is simply to communicate with the user and perhaps provide a URL link. The template message types include payment resubmission, email resubmission, and plan change notifications, where in addition to sending a message to the user the messaging dialog box allows the user to take action on the message. In one embodiment, template dialogs are hard coded into the client system to accommodate the special actions that are taken. Marketing Messages allow the provider to communicate with the user base. For example, the Marketing Message dialog box allows the provider to promote an item that is sold on their web site, and provide a URL link to that item. An example of the specific components of a marketing message are shown in FIG. 17B. In the Icon graphic, a generic Marketing Message icon appears. The text for Text box is customizable at the server. If the provider wants to associate a URL with the message, a URL link button named "More Info . . . " appears. The OK button closes the dialog box.

Figure 17C:
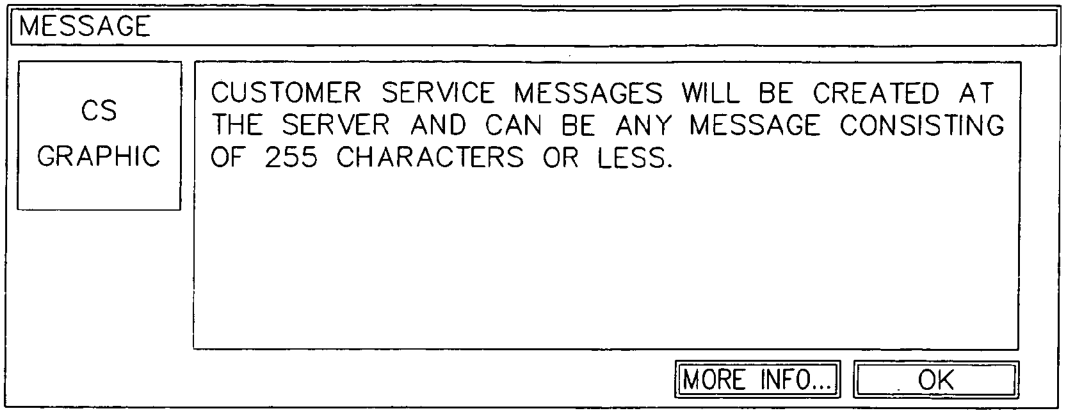
Figure 17D:
Figure 17E:
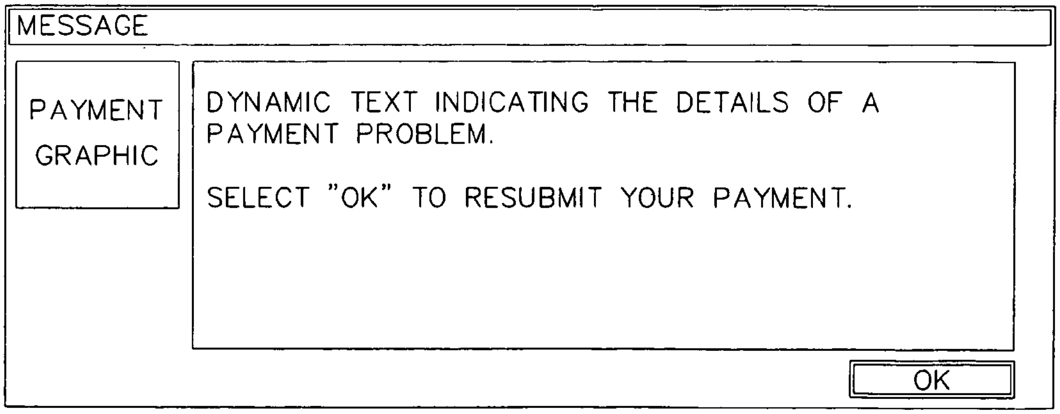

A Customer Service Message is preferably the same in functionality as the Marketing Message dialog box, except that the graphic icon is different. The different graphic communicates to the user that this message is a different type of message than a Marketing Message. The Customer Service dialog is designed to communicate customer support issues, as shown in FIG. 17C. A Credit Card Promotion message type, as shown in FIG. 17D allows the provider to broadcast credit card promotions to the users. The graphic icon communicates the message type to the user. In one embodiment, this graphic includes the MasterCard logo. The text on the URL link button reads "Apply Now". FIG. 17E is an exemplary dialog box for Payment Resubmission Message. The Payment Resubmission Message is a template type of message. The purpose of this template message box is to convey to a user that a payment has been rejected, and facilitate a payment resubmission by the user. As illustrated in FIG. 17E, a Payment Message icon appears in the icon graphic. The Text box is dynamic, explaining the details of the failed transaction. The end of the message typically reads "Select OK to resubmit your payment," and the OK button closes the dialog box and launches the purchase postage screen.

Figure 17F:
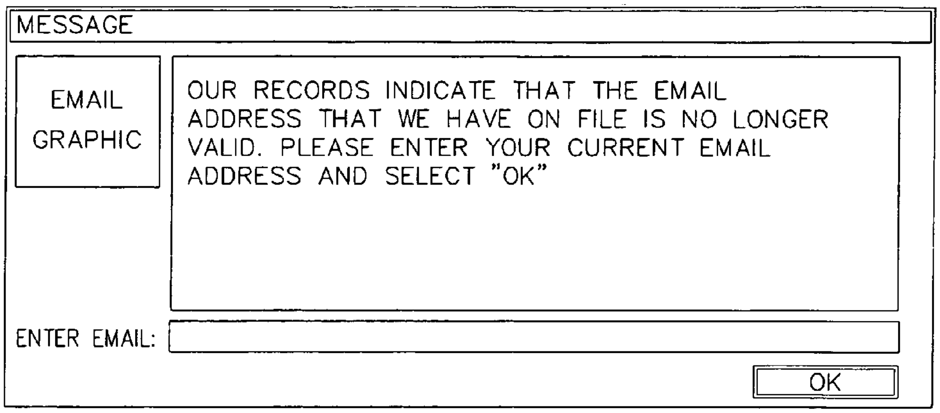

Email Resubmission Message is a template type message, whose purpose is to notify a user when the system does not have a valid email address for him/her, and enable the user to provide this information. Exemplary elements of this type of message dialog are shown in FIG. 17F. An Email Message icon appears in the icon graphic. The text for the Text box is static and the contents of the text box are shown in the graphic. An Email edit box allows the user to enter an email address, and the OK button closes the dialog box, and sends the user's email address to the server.

Figure 17G:
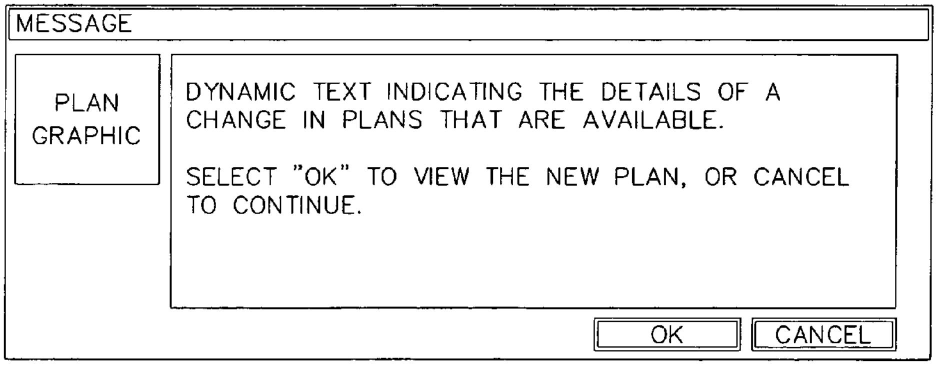

A Change in Service Plans Message (also a template type message), indicates when new plans are available to a user, or if the user's current plan is going to be grandfathered. This, message dialog basically indicates the change to the user and links the user to the change plans dialog and to more information about change plans, if desired. Exemplary elements of this dialog are shown in FIG. 17G. As shown, a Service Plans Message icon appears in the icon graphic. The text for the Text box is dynamic, and displays the plan changes. This text ends with the text string "Select 'OK' to view the new plan, or cancel to continue. The OK button closes the dialog box, and opens the Change Service Plans dialog box. The Cancel button closes the dialog box without opening the Change Service Plans dialog box. A Message Log is created to list a history of the messages that a user has received. This log is accessible from the "Accounts" screen, and have the standard layout and capabilities of the other logs within the client.

The client software checks for available updates at the beginning of the installation routine, before any files have been installed, and at each login. At each of these times, the client checks for an available update. If an update is available, a dialog box appears. This dialog box provides a message which communicates the details of the available update, and provides a URL link to a website where the update file can be downloaded. The update file may be classified as either mandatory or optional. If the update is mandatory, the update is installed by the user. If the update is optional, the user can choose whether or not to install the file. There are no restrictions regarding how many update messages can be sent out, and the update message is not tied into the standard messaging described earlier in this document. The auto update feature is able to copy individual files so that a version can be updated without requiring a complete update.

In one embodiment, the system includes OEM branding capabilities. The system allows for the customization of the installation script in several ways, including the option of running a silent install, defining a default installation directory, and defining a default installation group. The default behavior of the installation routine is to run as an application that is visible to the user, and requires user input on multiple screens during the installation process. The system provides the option of a "silent install", which installs the program files to the user's system without being visible, and without requiring user intervention. The installer is told where to install the product's files. While the user may choose to install the product in any directory location they want, the installer offers them a choice consistent with the product identity. Every product is placed in a sub-directory within the master directory. The OEM partner has the ability to provide a name for both the master directory and sub-directory into which the product is installed. Program group, or "folder", is the location in which the installer displays the product if the user does not manually choose a different one. The system allows the OEM partner to customize the Default Program Group name. The OEM partner does not have the ability, however, to change the name or associated icons of the items within the group.

Figure 18:
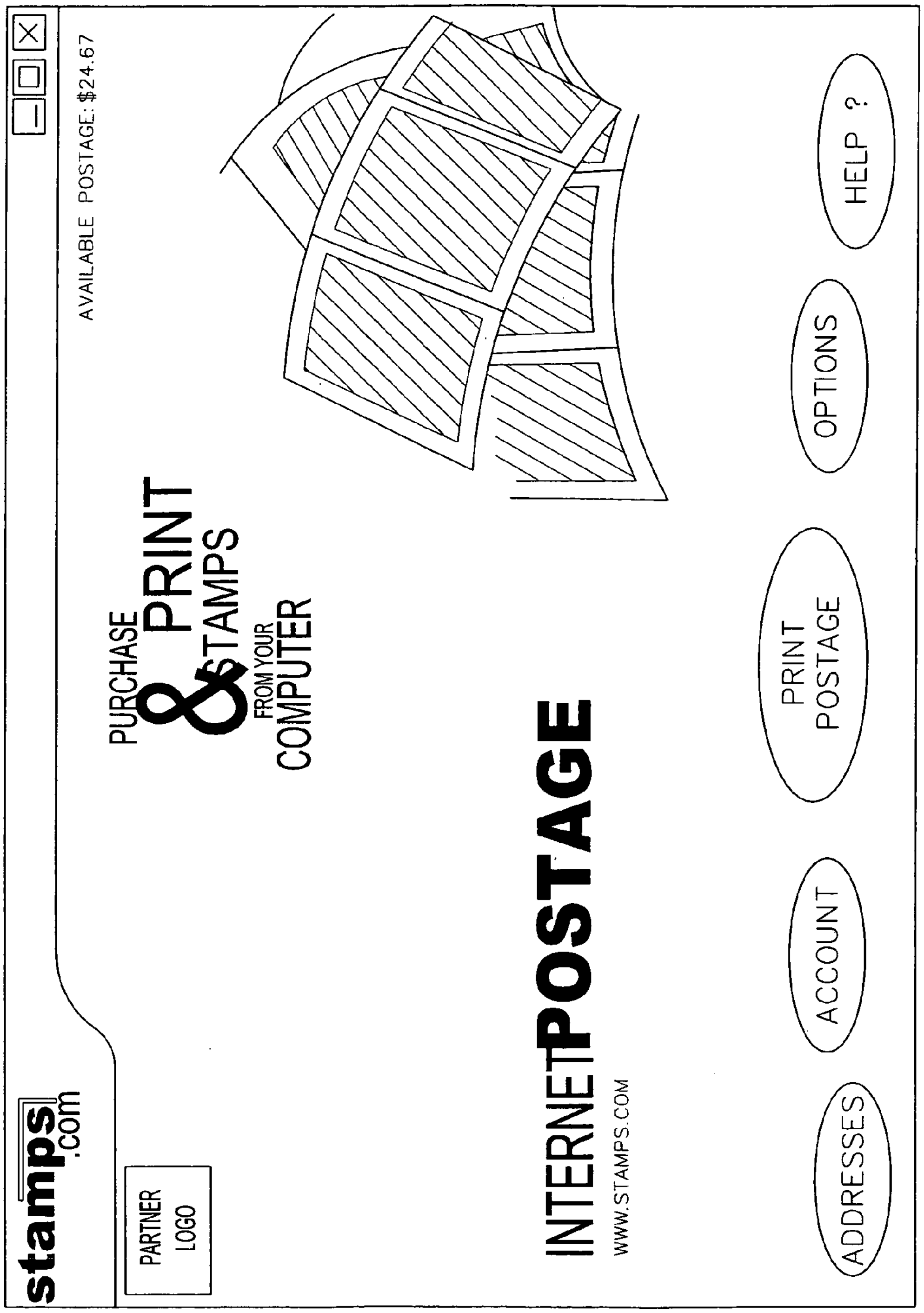
FIG. 18 is an exemplary interface for a main menu.

The system provides the ability to co-brand the software by providing prominent partner logo placement on the main screen within the software. In one embodiment, the logo placement is in the upper left hand corner of the main screen, below the provider's logo. An example of the layout of the provider's logo and the partner logo are shown in FIG. 18. The client software provides URL links which can be defined by the OEM partner. Specifically, the client software allows URL links to be embedded within two areas of the main client screen, the provider's logo in the upper left hand corner of the main screen, and the partner logo on the main screen. The system also provides a space within the postal indicium that is designated to display a logo or slogan of the OEM partner.

The system incorporates client server technology which enables the provider to provide OEM partners with data that tracks the postage usage of customers who are using that OEM's version of the client software. The client software embeds a unique OEM identifier within each OEM version of the client software. Once a user has registered with the provider, that user is thereafter associated with the OEM that is identified within their client software. This association, as well as all tracking activities, are transparent to the user and require no additional intervention by the user. In the event that a user gets the client software through an Affiliate Partner's web site, the account number that a user is assigned will embed in it information that identifies the source Affiliate Partner. Therefore, this account number is uploaded to the Postal Server, which occurs at the end of the Registration wizard. In the case of an affiliate partnership, the tracking number is extracted from a cookie that has been downloaded onto the users computer. The details concerning formatting and requirements of the cookies are covered in a separate document.

Figure 19A:
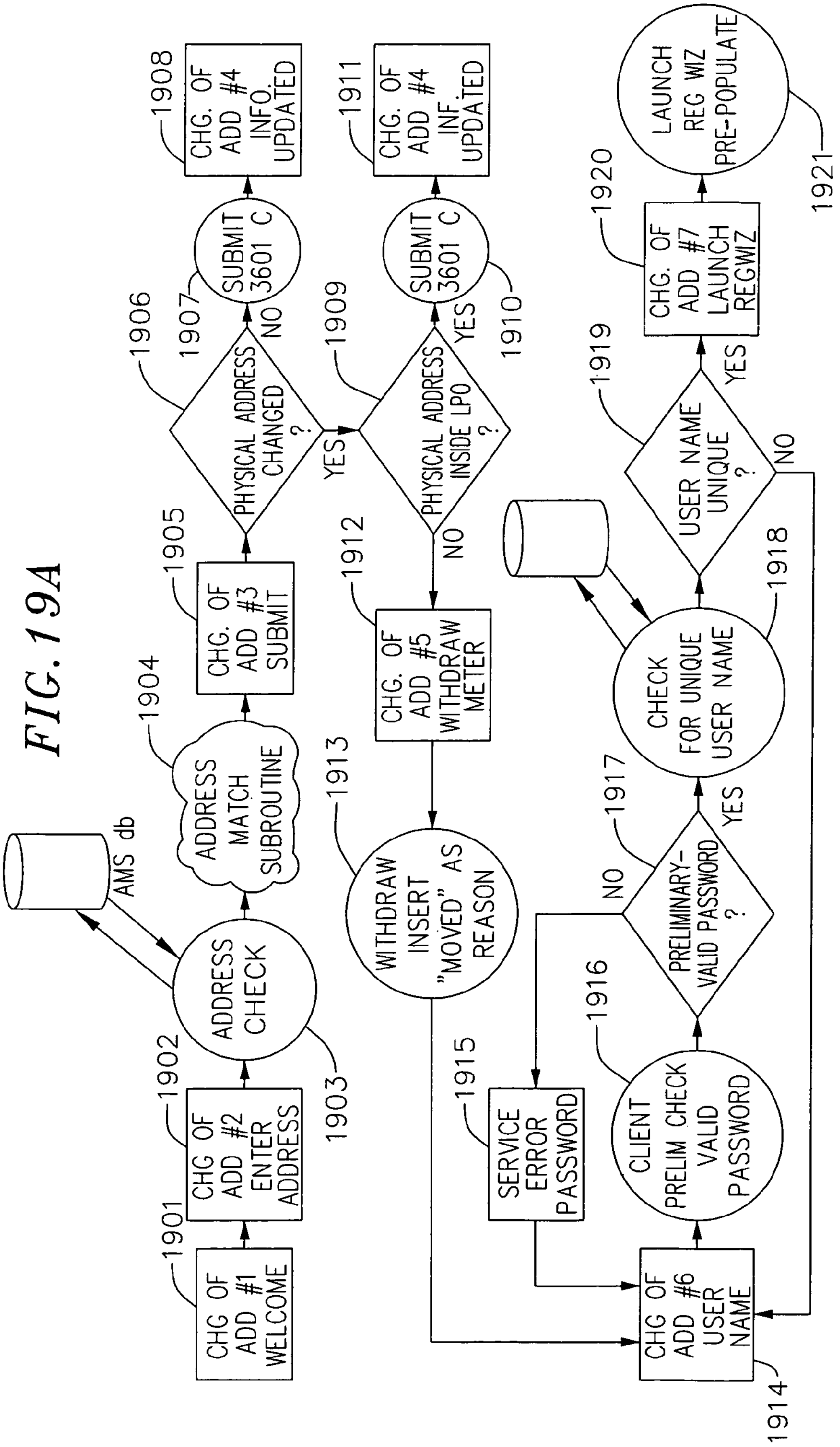
FIG. 19A is an exemplary process flow diagram for a change of address process.
Figure 19B:
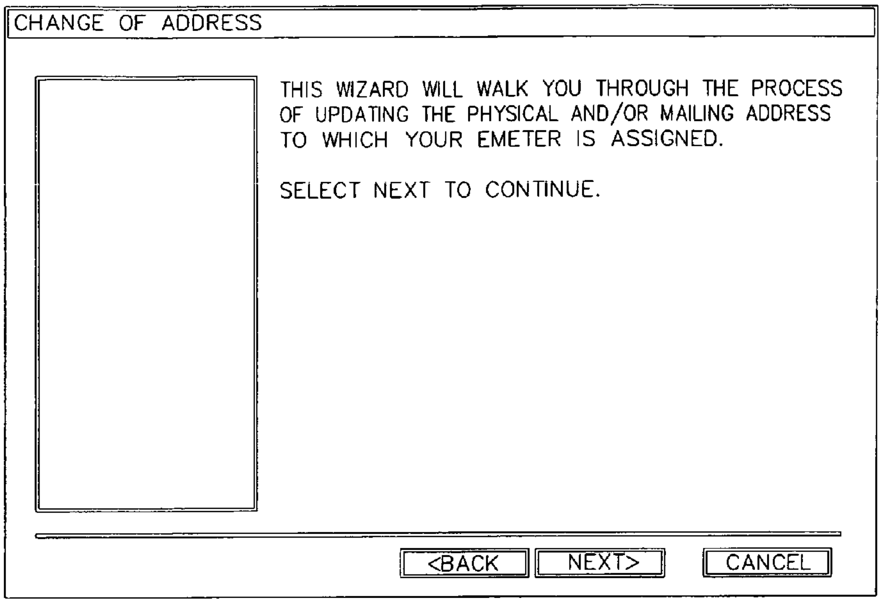
FIGS. 19B–19I are exemplary interfaces for change of address.
Figure 19C:
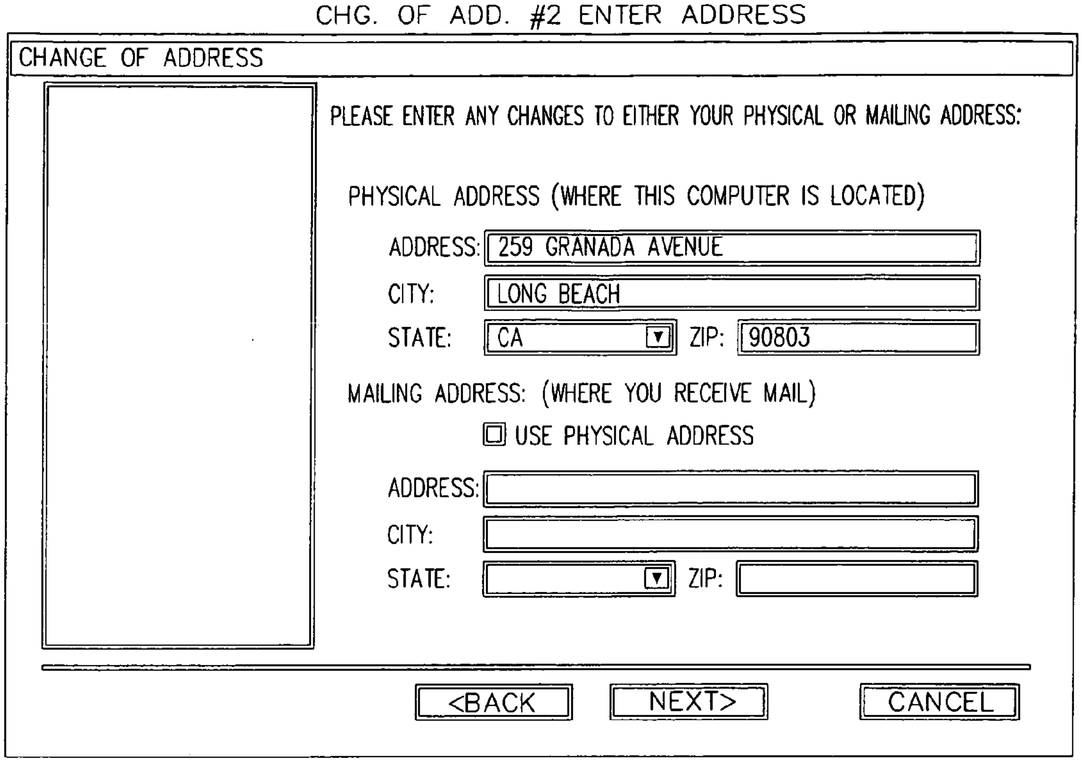
Figure 19D:
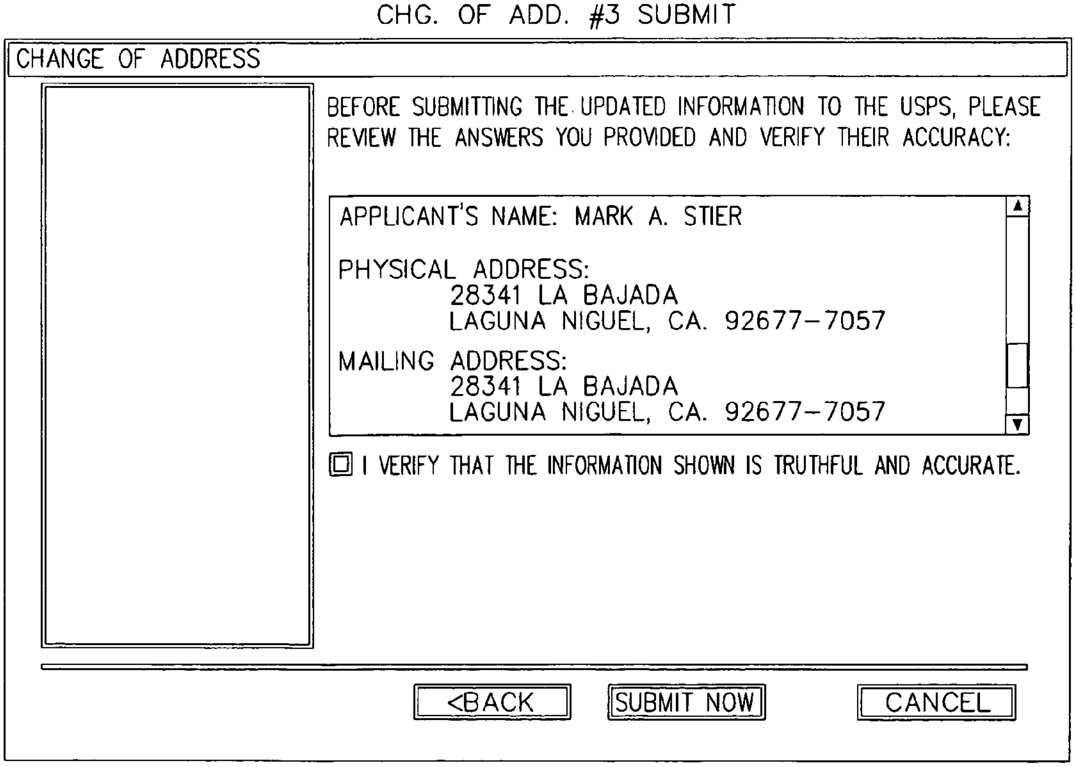

A change of Address wizard is designed to help a user through the process of changing either a physical or mailing address, and the meter license ramifications that may result. An exemplary process flow of the Change of Address wizard is shown in FIG. 19A. In block 1901, the Change of Address Screen #1 serves the purpose of welcoming the user to the wizard using the text as shown in FIG. 19B. Selecting "Next>" advances the user to the next screen of the wizard. In block 1902, the Change of Address Screen #2 allows the user to enter a new mailing address and/or physical address. As shown in FIG. 19C, the controls used are the same as are used in the Addresses screen of the Getting Started wizard. The only difference is in the introductory text. The client checks for a PO Box in the physical address fields. If a PO Box is provided, the error message indicates that a PO Box is not acceptable. These fields are preferably pre populated by default. In blocks 1903 and 1904, addresses are checked and in block 1905, the Change of Address Screen #23, shown in FIG. 19D, appears. This screen preferably serves the same purpose as the Submit screen of the Registration Wizard, and preferably uses the same controls. One difference is that in this case, the only information that is populated is the address information that is provided in screen #2.

Figure 19E:
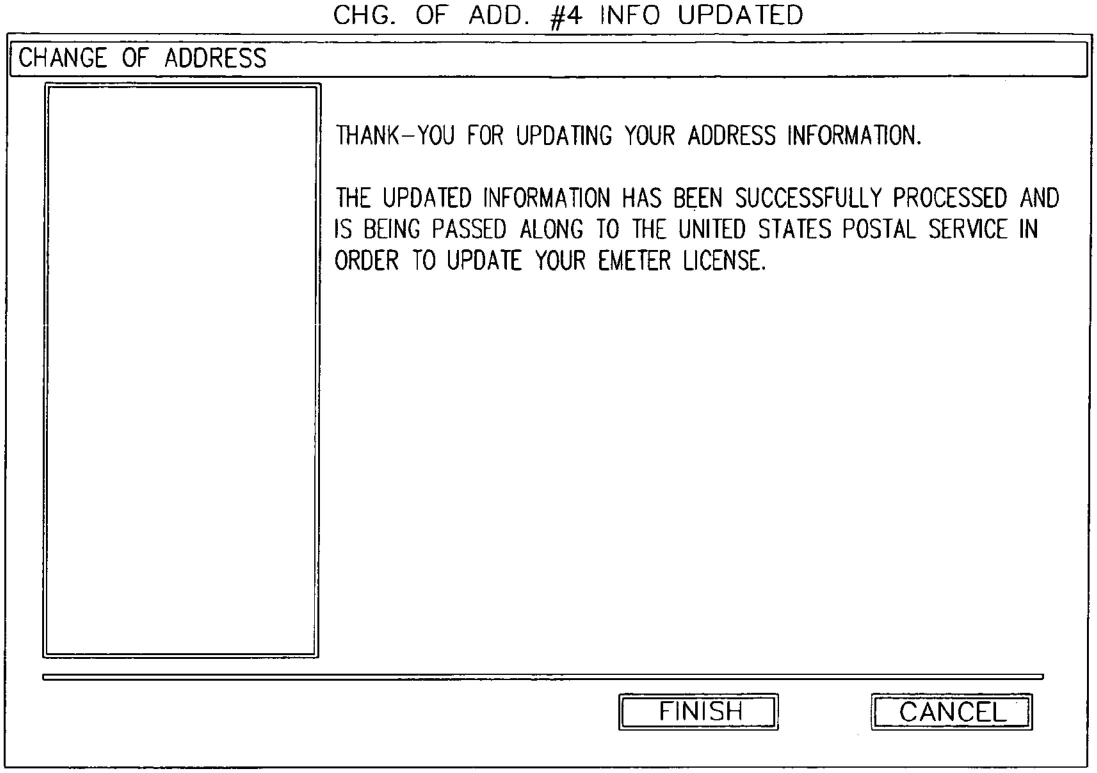
Figure 19F:
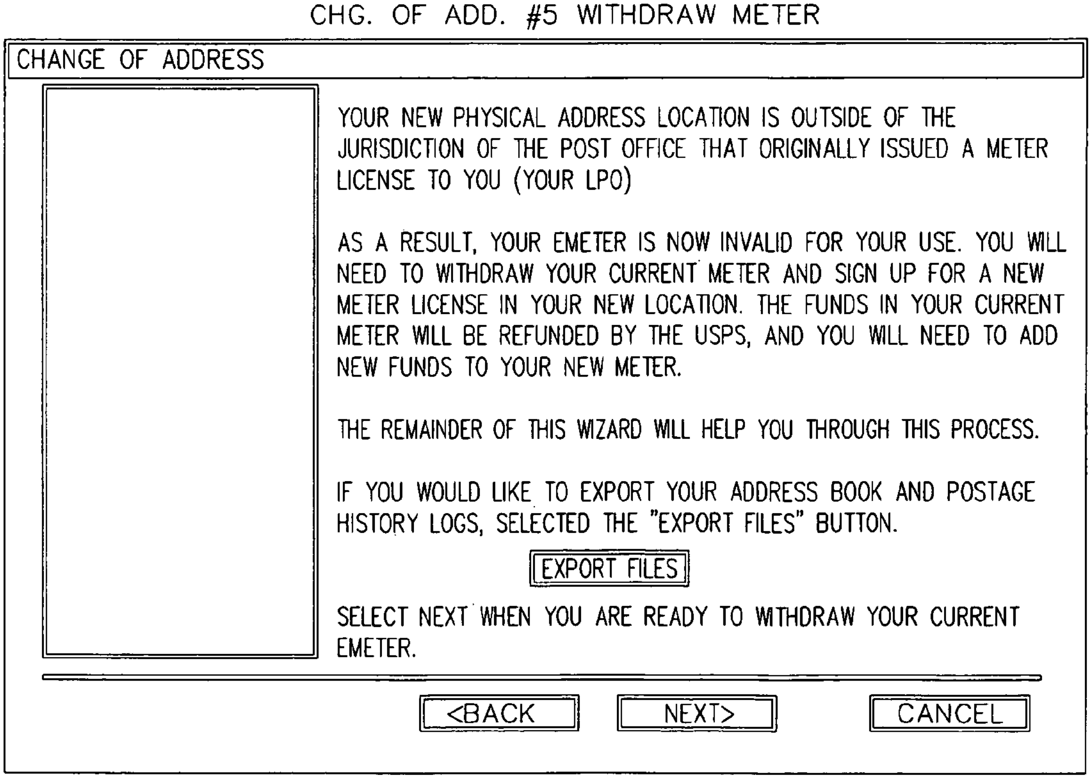
Figure 19G:
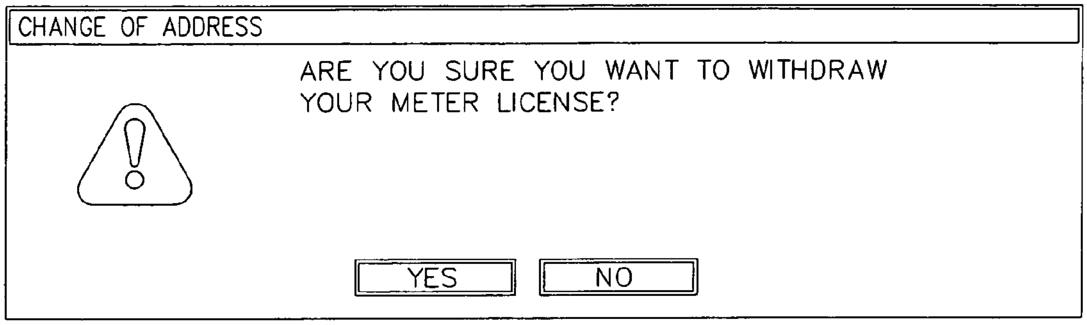

Change of Address Screen #4, shown in FIG. 19E appears when a change in the meter license is not required (i.e. if the physical address hasn't changed or if the physical address hasn't resulted in a changed LPO), as shown in blocks 1906 and 1907. In this event, in block 1910, the server submits a 3601C form, and this screen appears to let the user know that the address has been successfully changed. The Change of Address Screen #5 (shown in FIG. 19F) educates the user about the process that needs to be undertaken in order to withdraw and reapply for a meter license. Selecting "Next>" prompts the user with a warning dialog box, as shown in FIG. 19G. If the user responses "Yes" to the warning, the meter is withdrawn, and "moved" is inserted into the reason for withdrawal on the 3601 C form (see block 1913), and the mailing address that is provided at the beginning of this wizard is used for the mailing of the refund check. This withdrawal should not result in a "slot" becoming available for a brand new user, as this user will re-register momentarily and take the "slot" again. If the user enters "no", the wizard is canceled.

Figure 19H:
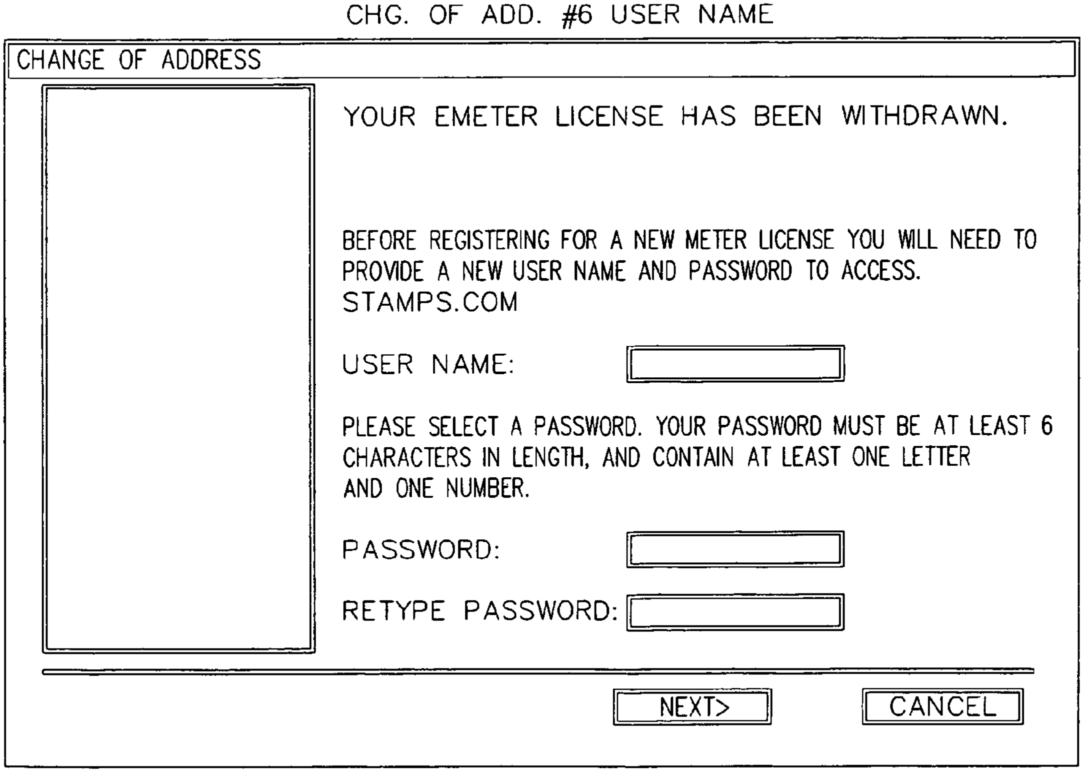
Figure 19I:
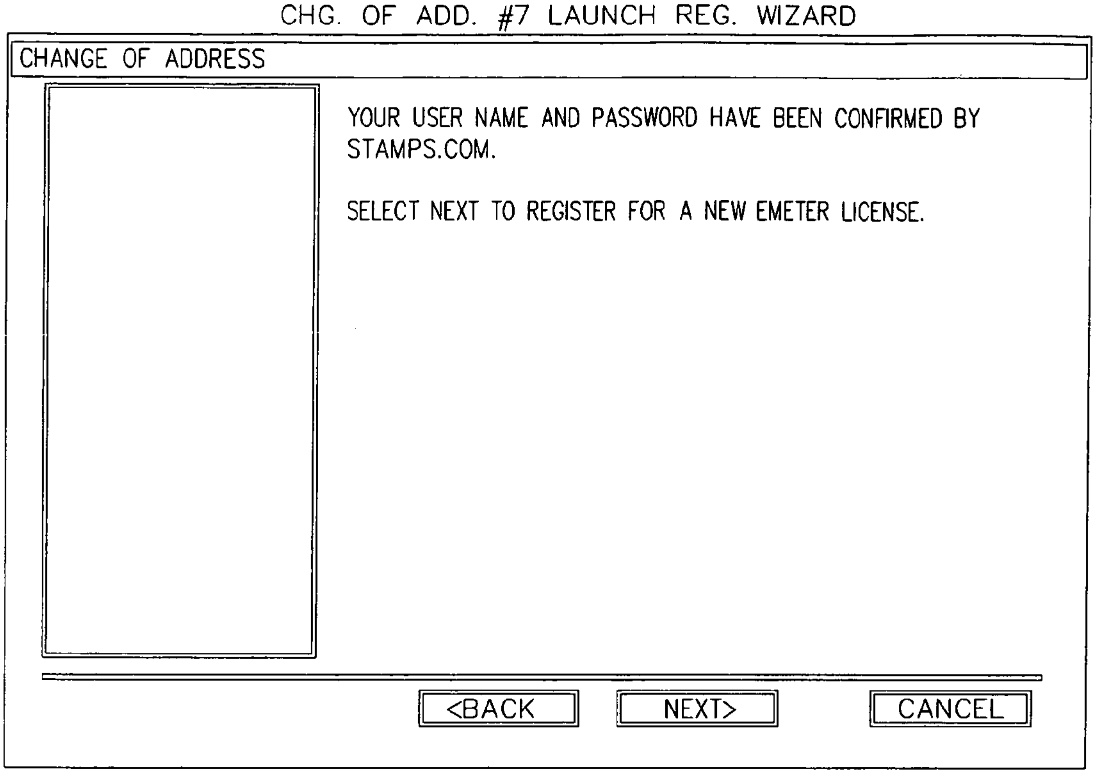

Change of Address Screen #6 notifies the user that their meter license has been withdrawn. In addition, it prompts the user for a new user name and password. The controls used for this screen, shown in FIG. 19H, are the same as those used in the user name screen of the Getting Started wizard. The client verifies with the server that the user name is unique. The client also verifies that the password meets the preferred basic criterion for example, of 6 characters minimum, with at least 1 alphabetic character and 1 numeric character. Change of Address Screen #7 (shown in FIG. 19I) lets the user know that the final step is to go through the Registration Wizard. Selecting "Next>" launches the Registration wizard with all known fields being pre populated. In addition, the wizard preferably should not check for an available "slot", since the users are just using their existing "slot".

Figure 20A:
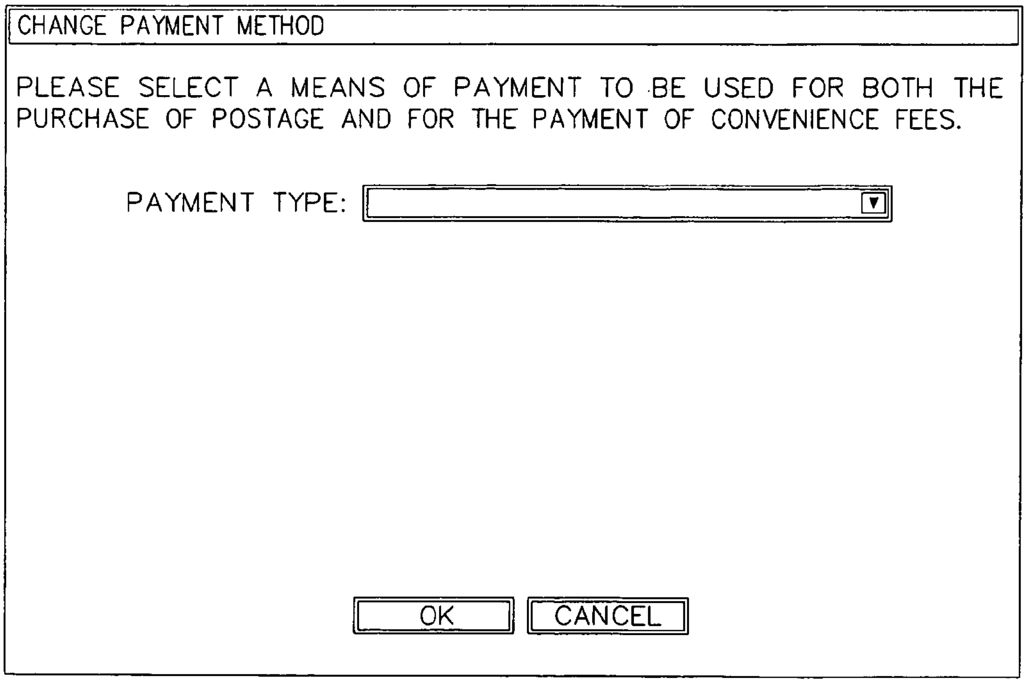
FIGS. 20A–20C are exemplary interfaces for change payment method.
Figure 20B:
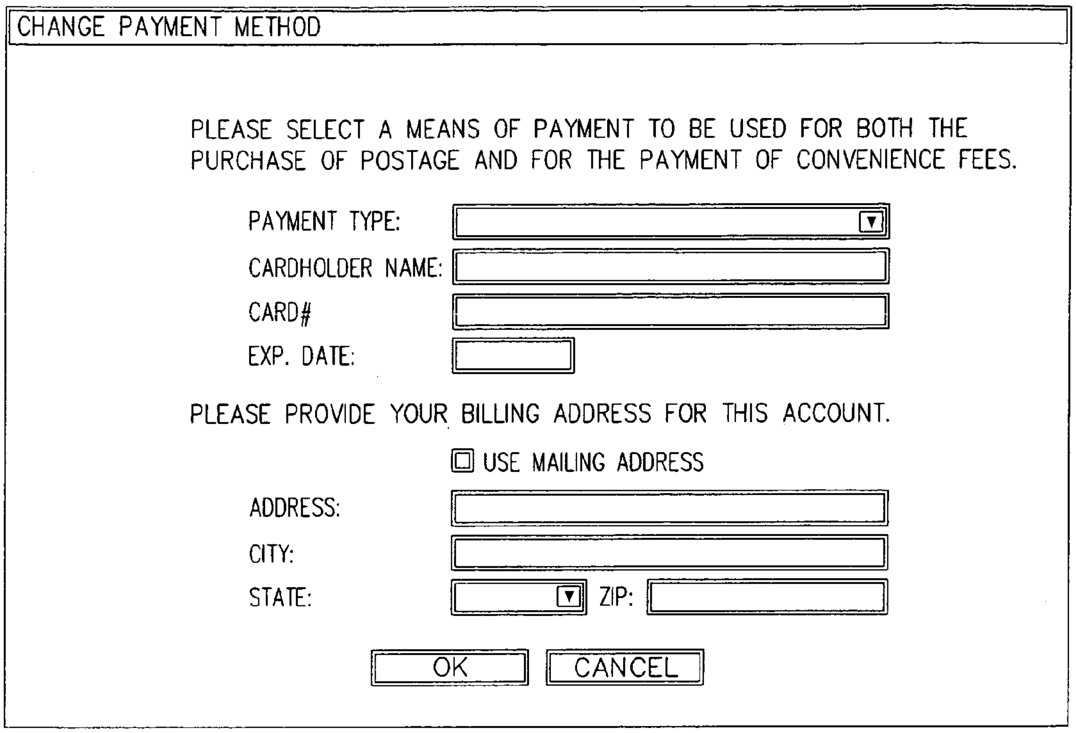
Figure 20C:
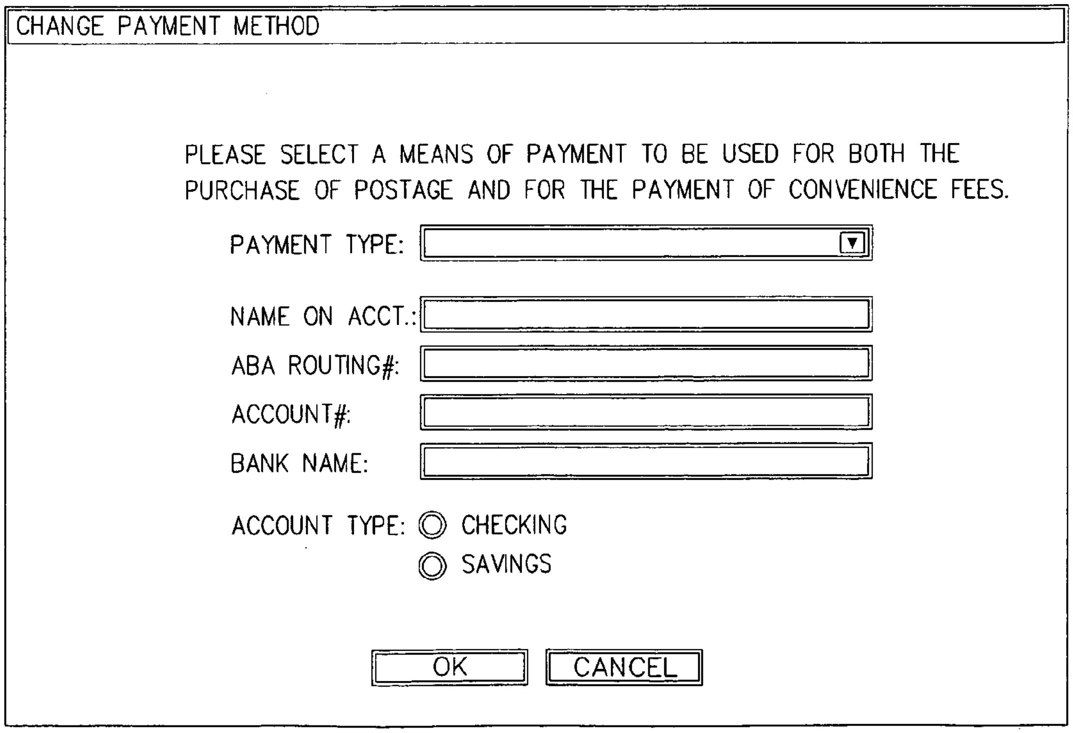

In one embodiment, the system includes a dialog box, which can change payment methods and be accessed from the Account screen. An exemplary interface for this screen is illustrated in FIG. 20A. This screen preferably has the same functionality as the Select Payment Method screen of the Getting Started wizard, but formatted into a dialog box format. This dialog box is dynamic. The Select Payment Method screen of the Getting Started wizard is also dynamic. When the user first sees the dialog box, the only control that is available prompts the user for a Payment Type (i.e. Visa, MasterCard, American Express, ACH). If the user selects any of the credit card types, the screen dynamically builds to add the additional controls that are required to extract credit card information, as shown in FIG. 20B. These controls are described in the Getting Started wizard above. If the user selects ACH, then the screen builds dynamically to contain controls that extract the ACH information that is necessary in order for the provider to bill an account. The specifics on these controls are discussed within the Getting Started wizard above, and are integrated into the dialog box setting, as shown in FIG. 20C.

Figure 21A:
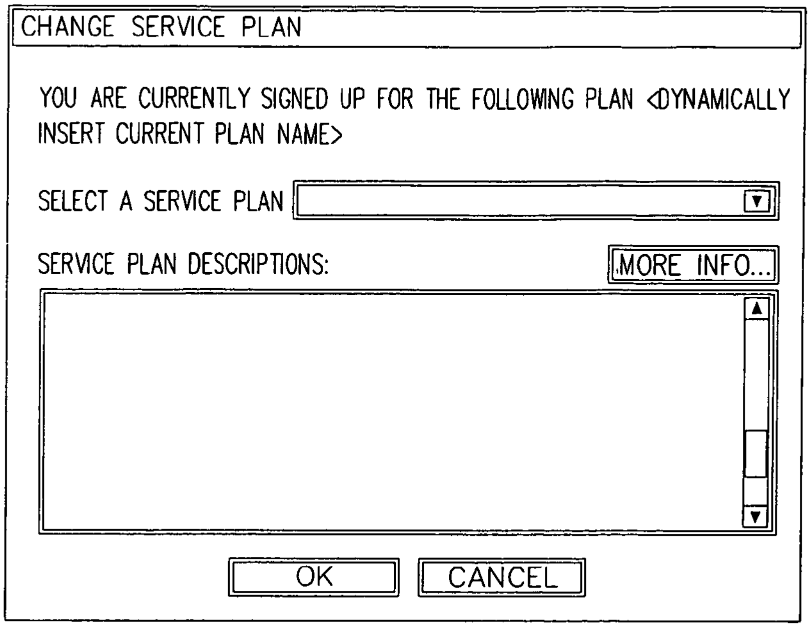
FIGS. 21A–21D are exemplary interfaces for change service plan.
Figure 21B:
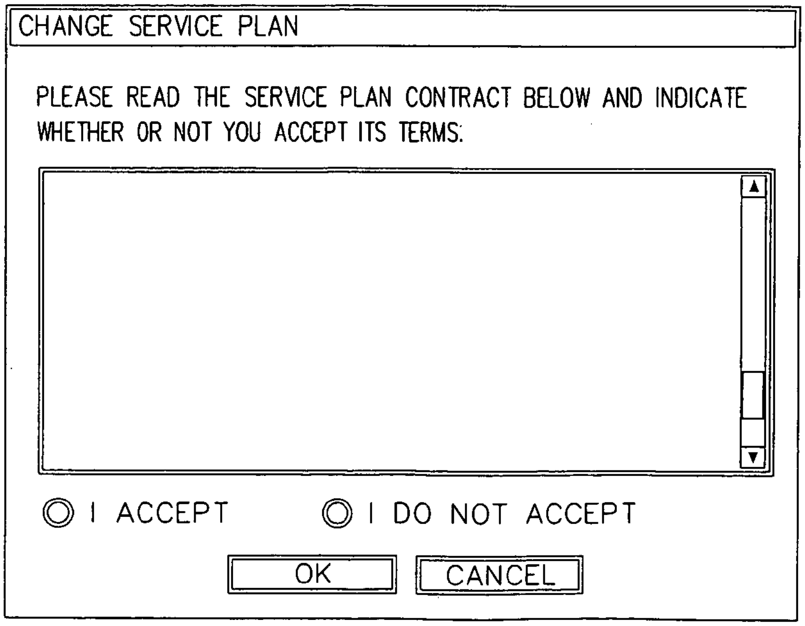

In one embodiment, the system allows the user to change the service plan in which the customer is participating. This is accomplished through several screens which have many of the attributes of the Service Plan screens within the Getting Started wizard. This functionality is accessed when the user selects "Change Service Plan" from the Accounts screen. Once the user selects "Change Service Plan" from the Accounts screen, the Change Plan dialog box (shown in FIG. 21A) appears which has controls that are similar to those found on Service Screen #7 in the Getting Started wizard with one addition. Specifically, a line of text is added at the top of the screen that displays the name of the Service Plan that the user is currently signed up for. Once the user has selected "Ok" in the Change Plan dialog box, the Change Plan Contract dialog box, shown in FIG. 21B, appears. This dialog box preferably uses the same controls as screen #8 in the Getting Started wizard (described above), and displays the contract for the new service plan that the user has selected.

Figure 21C:
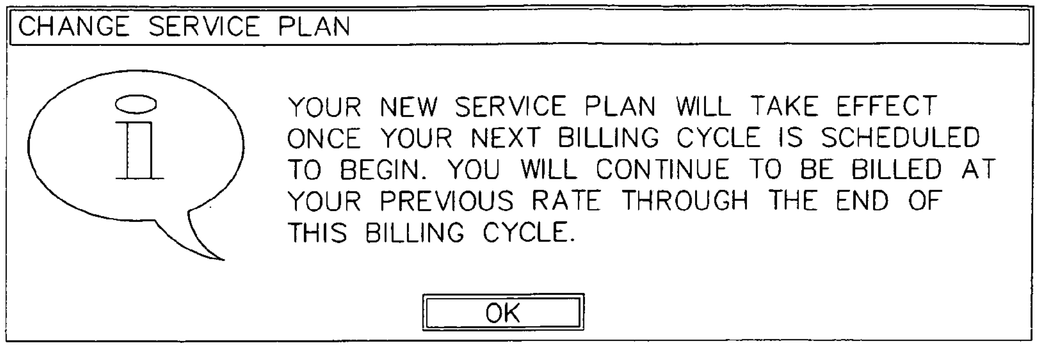
Figure 21D:
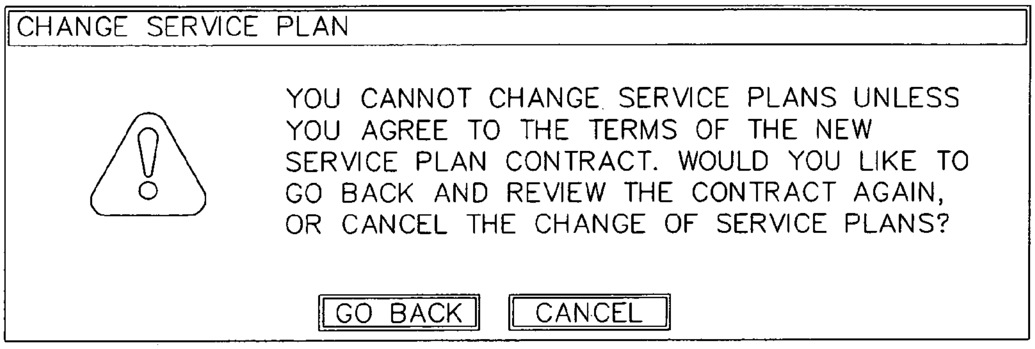

If the user selects the "I Accept" radio button on the Change Plan Contract dialog box, and then selects "Ok", the dialog box shown in FIG. 21C appears. The purpose of this dialog box is to communicate to the user when the change will come into effect. Selecting "Ok" completes the Change of Service Plan process. If the user selects the "I do NOT Accept" radio button on the Change Plan Contract dialog box, and then selects "Ok", the dialog box of FIG. 21D appears. This dialog box provides a warning to the user that unless the contract is accepted, the service plan will not be changed. If the user selects the "Go Back" button, this dialog preferably closes and the Change Plan Contract dialog should appear again. If the user selects the "Cancel" button, the change of plans process is canceled.

Figure 21E:
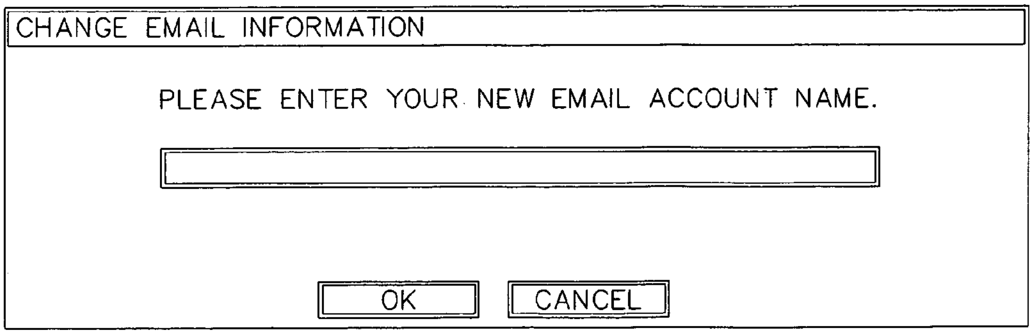
FIG. 21E is an exemplary interface for change e-mail information.

FIG. 21E depicts a dialog box that allows users to inform the provider when their email account names have been changed. This dialog box is accessible from the Account screen. The edit box control on this screen allows the user to enter a new email address. If the user enters an address and selects OK, the client uploads the new email address to the server. If the user selects Cancel, the operation is canceled. A Change Password option in the Account Screen is provided. The dialog box that is launched from this option is updated to reflect the password functionality as defined in the Getting Started wizard. In one embodiment, the password screen requires a new password type. The preferred requirements for the new password type are that the password be at least 6 characters in length, have at least 1 alpha character, and at least 1 numeric character. A password recovery function allows a user to get a new password in the event that it is forgotten. This process does not require the user to interface with Customer Service. This process relies upon the secret code or key word phrase that the user provided in Service Screen #4 of the Getting Started (at the end of the Getting Started wizard, this keyword is uploaded to the server and stored as part of the user's personal profile).

Figure 22A:
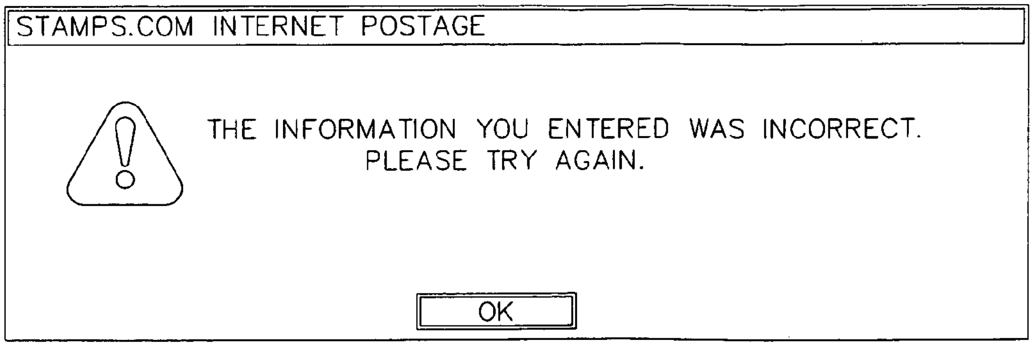
FIGS. 22A–22B are exemplary interfaces for password entry & verification.
Figure 22B:

The initial login screen provides the interface whereby the users typically inputs their passwords. If a user enters incorrect information, a message such as the one shown in FIG. 22A appears. As an added measure of security, if the user enters incorrect information ten times, the system keeps showing the user the above message even if the user enters the correct information. The user is forced to close and re-open the client to try again (although they won't know this) or contact Customer Support. If the user enters the information correctly, the confirmation message shown in FIG. 22B is displayed. The "OK" button closes the client. If the user never receives the email or the letter, they preferably have to repeat the process to have a new password sent out. The Customer Support (CS) Manager is able to modify the text of the Reset Sample email by going through normal operational email update procedures.

Once the user gets the temporary password, the user uses it to log in as normal. Once the server verifies that the password is valid, an additional check is made to determine whether the password that is provided is a temporary or long term password. If the password is a temporary password, then the client software launches the change password dialog box, and does not allow the box to be closed until the user enters the old password and a new one. A Message Log lists a history of the messages that a user has received from the provider. This log is accessible from the "Accounts" screen, and have the standard layout and capabilities of the other logs within the client.

Figure 23:
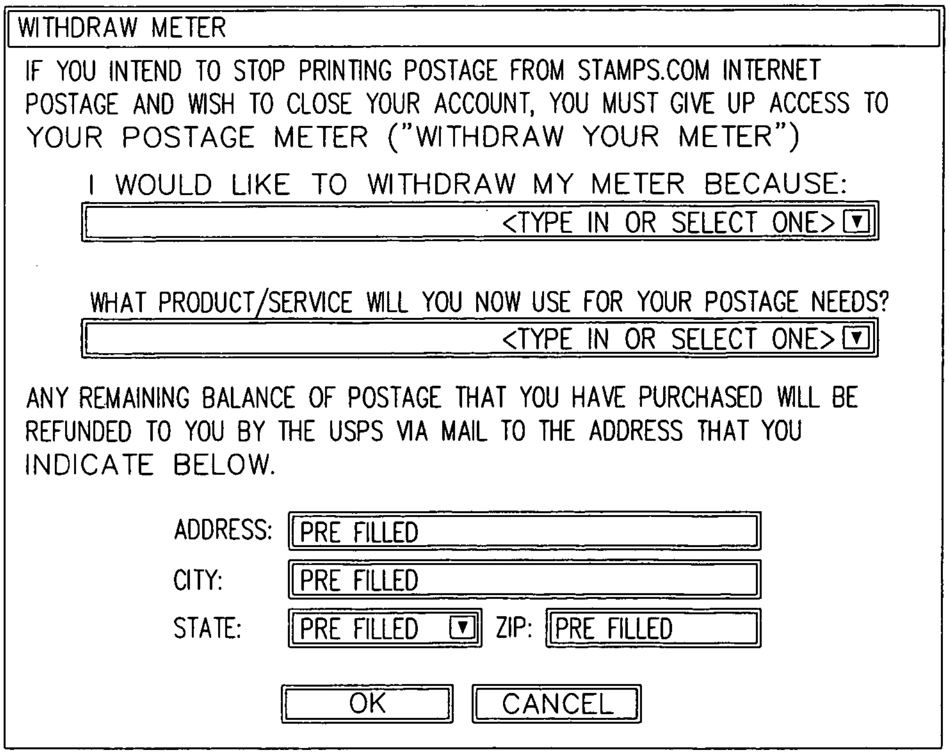
FIG. 23 is an exemplary interface for a meter withdrawal.

FIG. 23 is an exemplary interface for a Withdraw Meter dialog box. Reason for withdrawal combo box allows the user to select a reason why he/she is withdrawing the meter. The user can type in their own response or select from any of the following standard responses; too expensive, difficulty connecting, too much lost postage due to printing mistake, no support for windowed or pre-addressed envelope, incompatibility with other software, requires printing of address and 'stamp' together, no longer have significant mail volume, poor customer support, and the like. Future Products used combo box helps better understand why customers are terminating the provider's service. Specifically, this control allows the user to indicate what postal solution he/she will use in the future. The user can type in a response or select from the following: regular stamps, postage meter, or alternative Internet Postage product. A prompt appears in the combo box that reads "<type in or select one>", if the user chooses to type in a response. Address fields define where the refund check will go. These fields are pre-populated with the user's mailing address, but the user can make any desired changes to the address. Once all of these fields are filled in, selecting the OK button submits a request to withdraw a meter to the server. The server processes the appropriate withdrawal forms to the USPS on the user's behalf.

Figure 24:
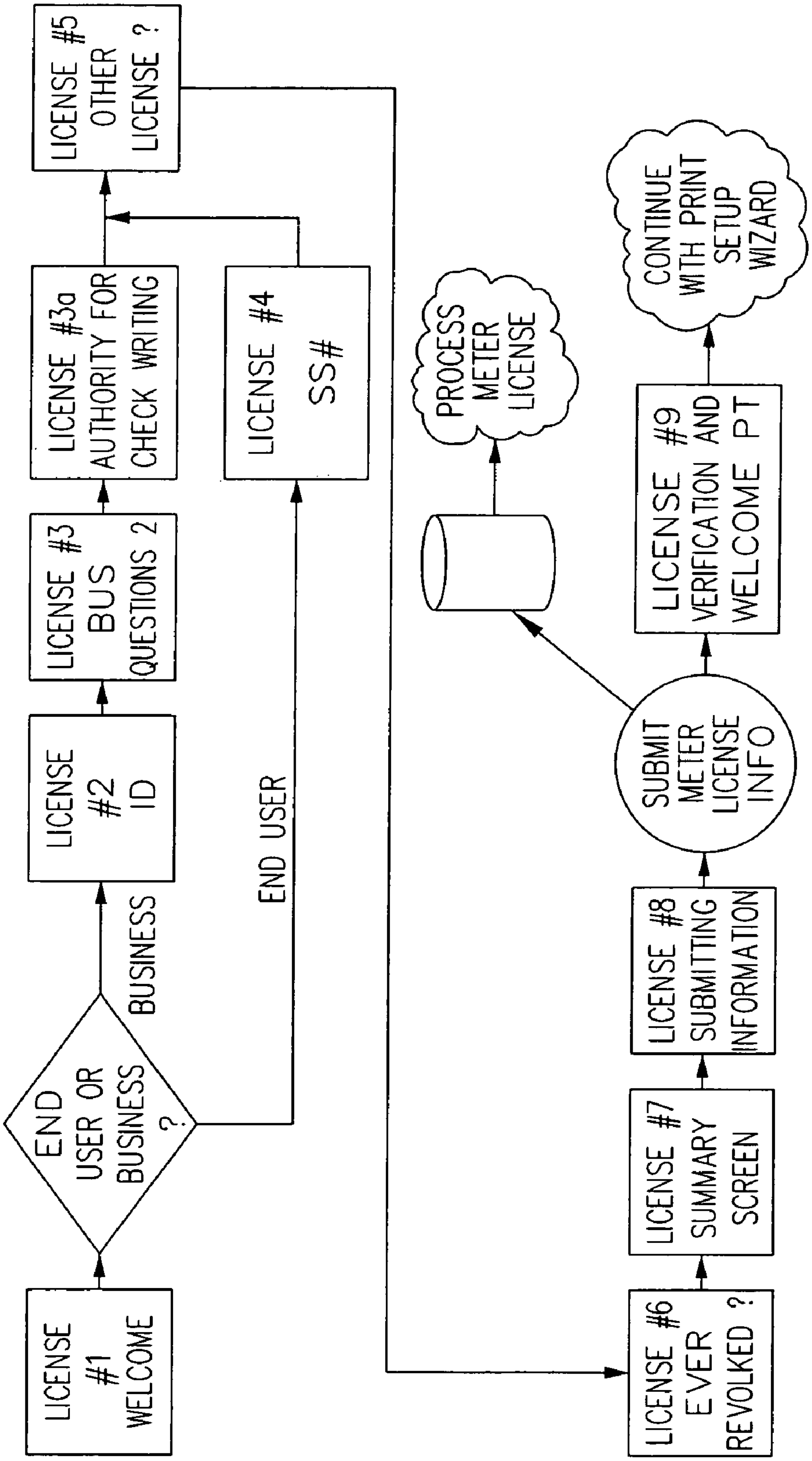
FIG. 24 is an exemplary process flow diagram for a registration wizard.

A Postal Meter License wizard is also provided. This option within the Options screen launches the new Registration wizard (which is a subset of the Getting Started wizard). The specific screens that make up the Registration wizard are shown in the process flow of FIG. 24. The screens numbers in the process flow of FIG. 24 refer to screens of FIGS. 10B-100 of the Getting Started wizard portion of this document. In order to change an address, the user selects the Change of Address wizard.

Figure 25A:
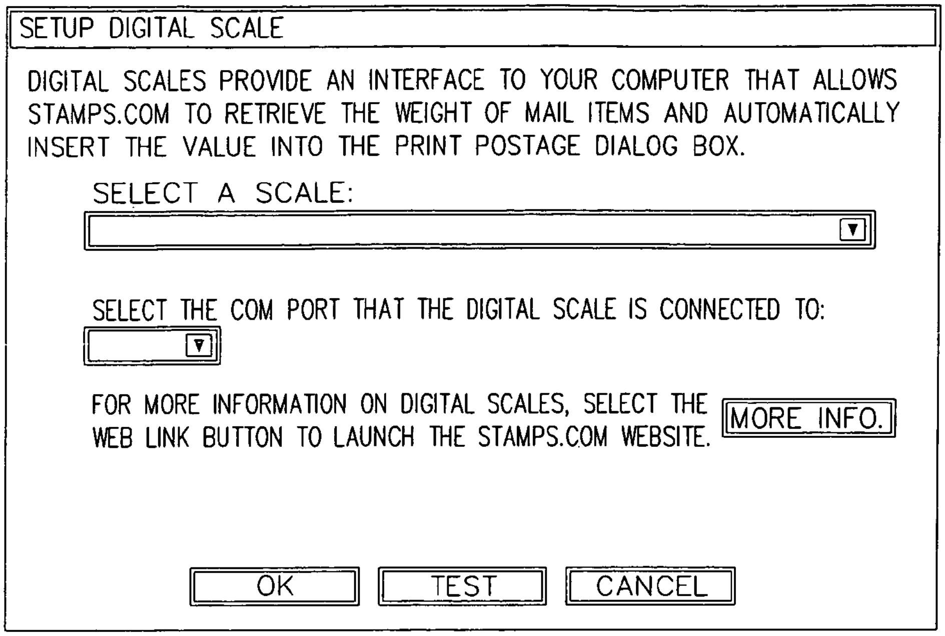
FIGS. 25A–25C are exemplary interfaces for setting up a digital scale.
Figure 25B:
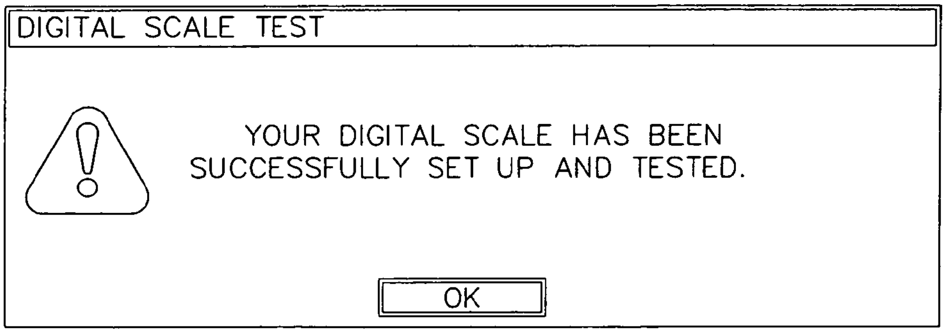
Figure 25C:
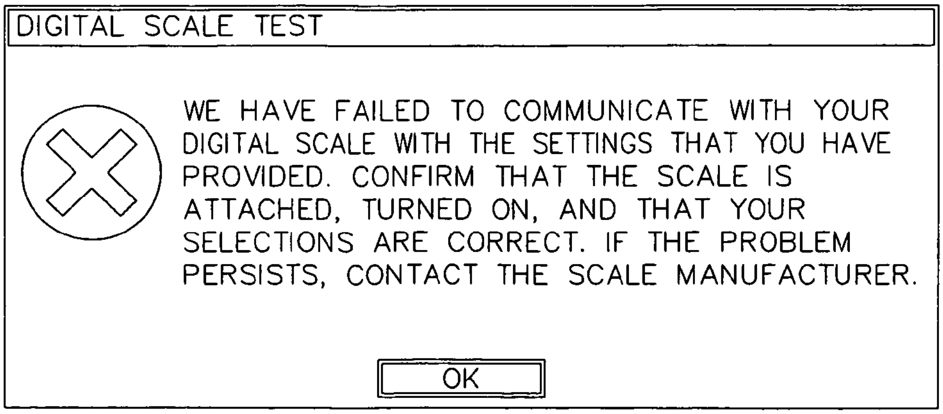

A Setup Digital Scales option is also provided. This new option launches the Setup Digital Scale dialog box shown in FIG. 25A. This dialog box is used to select and configure digital scales. In this dialog box, Select a Scale combo box allows the user to select from a list of supported digital scales. This list checks for all scales that are supported, such as the Weightronics™ digital scale. Select COM port combo box allows the user to select which COM port the digital scale is attached to. The list includes all of COM ports on the user's system. Web Link button links the user to provider's site. The test button runs a test to make sure that the communication to the selected scale on the selected COM port is functional. If the test successfully communicates with the scale, the dialog shown in FIG. 25B appears. If the test is unsuccessful, the dialog box shown in FIG. 25C appears. The system supports the calculation of postal rates based upon zones. As a result, the system is able to support Express and Priority mailings. The implications of zone based postage are discussed in the printing section of this document.

Every "View History" dialog box adds print functionality, so that historical reports can be printed. Specifically, the View Postage Purchase History, View Postage Printed History, and View Messages History all add a Print button at the bottom of the screen. The number of events that are printed is defined by the purge control, which also controls the number of items that are displayed.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. An on-line system for printing a value bearing item (VBI) comprising:

a user printer for printing the VBI;

a client subsystem for interfacing with a user comprising;

a display monitor for displaying a graphical user interface (GUI);

a printers database including top, center, or bottom feed information of a plurality of printers; and a controller for activating a printing wizard for managing the printing of the VBI by the user printer, the controller is configured to access the printers database and when feed information of the user printer is in the printers database, the controller is further configured to control the user printer to print a first quality assurance indicium, and to display on the display monitor a second quality assurance indicium, wherein the printing wizard includes a user interface and the controller is further configured to accept user feedback from the user interface about whether the printed first quality assurance indicium compares correctly to the displayed second quality assurance indicium, and when the user feedback input from the user interface indicates that the first quality assurance indicium compares correctly, the controller is further configured to upload the feed information for the user printer from the printers database and to control the user printer to print the VBI; and a server subsystem for communicating an authorization to the client subsystem over a computer network for authorizing the client subsystem to print the VBI.

2. The system of claim 1, wherein the VBI bears postage value.

3. The system of claim 1, wherein the VBI is a ticket.

4. The system of claim 1, wherein the VBI is one or more of a coupon, a voucher, and a check.

5. The system of claim 1, wherein the client subsystem further comprises a GUI for specifying a payment method.

6. The system of claim 1, wherein the client subsystem further comprises a GUI for making changes to the user's information.

7. The system of claim 1, wherein the client subsystem further comprises a GUI for displaying the user information including an account information.

8. The system of claim 7, wherein the account information includes an amount of credit left in the account.

9. The system of claim 1, wherein the client subsystem further comprises a GUI for specifying an address book from a plurality of address books so that the system can use the address book to print addresses.

10. The system of claim 1, wherein the client subsystem further comprises a GUI for entering a password so that the server subsystem can store the entered password and verify the password.

11. The system of claim 1, wherein the server subsystem includes an address matching module for verifying an address entered by the user.

12. The system of claim 1, wherein the GUI comprises of a second GUI for the user to specify the type of connection to the computer network.

13. The system of claim 1, wherein the GUI comprises of a second GUI for reporting error messages to the user.

14. The system of claim 1, wherein the GUI comprises of a second GUI for canceling an installation process.

15. The system of claim 1, further comprising a second GUI for registering the user comprises of a GUI for entering user information.

16. The system of claim 15, wherein the GUI comprises of a second GUI for offering the user a plurality of service plans and for selecting by the user a service plan of choice.

17. The system of claim 15, wherein the GUI comprises a second GUI for reporting error messages to the user.

18. The system of claim 1, wherein the GUI comprises a second GUI for canceling a registration process.

19. The system of claim 1, wherein the GUI comprises a second GUI for displaying a graphical image of the VBI.

20. The system of claim 1, wherein the user printer prints the quality assurance indicium on an envelope.

21. The system of claim 1, wherein the printing wizard for managing the printing comprises of a GUI for troubleshooting selected printing options.

22. The system of claim 1, wherein the printing wizard for managing the printing comprises of a GUI for providing envelope options.

23. The system of claim 1, wherein the printing wizard for managing the printing comprises a GUI for providing label options.

24. The system of claim 1, wherein the printing wizard for managing the printing comprises a GUI for providing postage options.

25. The system of claim 1, wherein the printing wizard for managing the printing comprises a GUI for reporting error messages to the user.

26. The system of claim 1, wherein the printing wizard for managing the printing comprises a GUI for canceling a print process.

27. The system of claim 5 further comprising a second GUI for displaying credit card information fields to be filed by the user when the user specifies a credit card for the payment method.

28. A method for printing online postage comprising:

displaying a first graphical user interface (GUI);

inputting by a user a command to print a sample print including a predetermined indicator using the first GUI;

printing the sample print with the predetermined indicator using a user printer;

displaying a plurality of selectable predetermined indicators for a user to select one of the displayed plurality of predetermined indicators;

selecting by the user a predetermined indicator from the plurality of displayed selectable predetermined indicators that matches the predetermined indicator printed with the sample print;

establishing the user printer as a top feed printer, center a feed printer, or a bottom feed printer, based on the matched predetermined indicator selected by the user; and printing the online postage according to the established feed configuration of the user printer.

29. The method of claim 28, further comprising specifying a payment method.

30. The method of claim 29 further comprising displaying credit card information fields to be filled by the user.

31. The method of claim 30 further comprising making changes to the user's information.

32. The method of claim 29, further comprising displaying the user information including an account information.

33. The method of claim 32, wherein the account information includes an account balance.

34. The method of claim 28, wherein the first GUI includes a GUI for specifying an address book so that the system can use the address book to print addresses.

35. The method of claim 29, wherein the first GUI includes a GUI for entering a password so that the server can store the entered password and verify the password.

36. The method of claim 28, wherein the server includes an address matching database for verifying an address entered by the user.

37. The method of claim 28, wherein the first GUI includes a GUI for the user to specify the type of connection to the computer network.

38. The method of claim 28, wherein the first GUI includes a GUI for reporting error messages to the user.

39. The method of claim 28, wherein the first GUI includes a GUI for canceling an installation process.

40. The method of claim 29, wherein the first GUI includes a GUI for entering user information.

41. The method of claim 29, wherein the first GUI includes a GUI for offering the user a plurality of service plans and selecting by the user a service plan of choice.

42. The method of claim 29, wherein the first GUI includes a GUI for reporting error messages to the user.

43. The method of claim 28, wherein first GUI includes a third GUI for displaying a graphical image of a sample postage on an envelope.

44. The method of claim 28, wherein the first GUI includes a third GUI for printing a quality assurance VBI.

45. The method of claim 28, wherein the first GUI includes a GUI for troubleshooting selected printing options.

46. The method of claim 28, wherein the first GUI includes a GUI for providing envelope options.

47. The method of claim 28, wherein the first GUI includes a GUI for providing label options.

48. The method of claim 28, wherein the first GUI includes a GUI for providing postage options.

49. The method of claim 28, wherein the first GUI includes a GUI for reporting error messages to the user.

* * * * *